US012780517B2

(12) United States Patent
Wu

(10) Patent No.: US 12,780,517 B2
(45) **Date of Patent: *Nov. 3, 2026**

(54) DIVIDER CONSTRUCT FOR CARTONS, RELATED SYSTEMS AND METHODS

(71) Applicant: Graphic Packaging International, LLC, Atlanta, GA (US)

(72) Inventor: Meng-Chuan Wu, Norcross, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,051

(22) Filed: Nov. 14, 2024

(65) Prior Publication Data

US 2025/0066090 A1 Feb. 27, 2025

Related U.S. Application Data

(63) Continuation-in-part of application No. 18/237,674, filed on Aug. 24, 2023.

(Continued)

(51) Int. Cl.
*B65D 71/38* (2006.01)
*B31B 50/26* (2017.01)

(Continued)

(52) U.S. Cl.
CPC .............. *B65D 71/38* (2013.01); *B31B 50/26* (2017.08); *B65D 71/0077* (2013.01);

(Continued)

(58) Field of Classification Search
CPC .... B65D 5/48028; B65D 5/02; B65D 5/4608; B65D 5/544; B65D 2571/00141;

(Continued)

(56) References Cited

U.S. PATENT DOCUMENTS 3,014,632 A 12/1961 Kuchenbecker
3,721,380 A 3/1973 Meyers (Continued)

FOREIGN PATENT DOCUMENTS

DE 2020 20101091 5/2021
JP 63-021220 U 2/1988

(Continued)

OTHER PUBLICATIONS

International Search Report and Written Opinion for PCT/US2024/055815 dated Mar. 7, 2025.

(Continued)

*Primary Examiner* — Christopher R Demeree
(74) *Attorney, Agent, or Firm* — Andrew N. Claerbout; FisherBroyles, LLP

(57) ABSTRACT

A construct for holding a plurality of containers, the construct having a plurality of panels including a front panel, at least one back panel, and at least one side panel extending at least partially around an interior of the construct, and divider features including at least one divider flap foldably connected to a respective panel of the plurality of panels at least partially forming at least one divider wall of the construct and forming a plurality of container receiving spaces in the interior of the construct.

39 Claims, 41 Drawing Sheets

Related U.S. Application Data

(60) Provisional application No. 63/600,397, filed on Nov. 17, 2023, provisional application No. 63/417,743, filed on Oct. 20, 2022, provisional application No. 63/400,925, filed on Aug. 25, 2022.

(51) Int. Cl.
*B31B 105/00* (2017.01)
*B65D 71/68* (2006.01)

(52) U.S. Cl.
CPC .................. *B31B 2105/002* (2017.08); *B65D 2571/00395* (2013.01); *B65D 2571/00438* (2013.01)

(58) Field of Classification Search
CPC ........... B65D 2571/00376; B65D 2571/00388; B65D 2571/00407; B65D 2571/0045; B65D 2571/00574; B65D 2571/0066; B65D 2571/00728; B65D 71/36; B65D 5/48034; B65D 2571/00487; B65D 71/0022; B65D 5/48044; B65D 71/246
USPC ............ 229/120.38, 120.14, 120.15, 120.18, 229/120.08, 120.05, 120.27, 120.26, 229/120.24, 120.29, 120.28; 206/193, 206/188, 187, 198, 192
See application file for complete search history.

(56) References Cited

U.S. PATENT DOCUMENTS

| | | | | | |
|---|---|---|---|---|---|
| 3,917,061 | A * | 11/1975 | Stout | B65D 71/0022 206/187 |
| 3,980,223 | A | 9/1976 | Curran | |
| 3,982,684 | A | 9/1976 | David | |
| 4,030,660 | A | 6/1977 | Rada et al. | |
| 4,089,457 | A | 5/1978 | Wood et al. | |
| 4,157,156 | A | 6/1979 | Skaggs | |
| 4,226,357 | A | 10/1980 | Martin | |
| 4,227,641 | A | 10/1980 | Gardner | |
| 4,333,600 | A | 6/1982 | Gardner | |
| 4,417,684 | A | 11/1983 | Skaggs | |
| 4,516,717 | A | 5/1985 | Curran | |
| 4,640,417 | A | 2/1987 | Durand | |
| 5,209,393 | A | 5/1993 | Xapelli | |
| 5,476,217 | A | 12/1995 | Moncrief | |
| 5,529,240 | A | 6/1996 | Harris | |
| 5,988,389 | A | 11/1999 | Buscema | |
| 6,112,977 | A | 9/2000 | Sutherland et al. | |
| 6,230,881 | B1 | 5/2001 | Collura | |
| 6,598,739 | B1 * | 7/2003 | Collura | B65D 71/0022 206/185 |
| 7,168,558 | B2 | 1/2007 | Harrelson | |
| 7,240,789 | B2 | 7/2007 | Sutherland | |
| 7,604,115 | B2 * | 10/2009 | Cuomo | B65D 71/0077 206/170 |
| 7,994,456 | B2 | 8/2011 | Ford et al. | |
| 8,152,051 | B2 | 4/2012 | Younger | |
| 8,376,214 | B2 | 2/2013 | Spivey, Sr. | |
| 8,459,535 | B2 | 6/2013 | Brand | |
| 8,628,000 | B2 | 1/2014 | Spivey, Sr. | |
| 8,770,467 | B2 | 7/2014 | Skolik | |
| 8,978,889 | B2 | 3/2015 | Fitzwater et al. | |
| 9,022,217 | B2 | 5/2015 | Holley, Jr. | |
| 9,120,593 | B2 | 9/2015 | Mena | |
| 9,205,939 | B2 | 12/2015 | Disrud et al. | |
| 9,233,769 | B2 | 1/2016 | Disrud et al. | |
| 9,284,084 | B2 | 3/2016 | Schmal et al. | |
| 9,352,890 | B2 | 5/2016 | Alexander | |
| 9,487,320 | B2 | 11/2016 | Holley, Jr. | |
| 9,701,436 | B2 | 7/2017 | Holley, Jr. | |
| 9,708,112 | B2 | 7/2017 | Sutherland et al. | |
| 9,840,358 | B2 | 12/2017 | Oliveira | |
| 10,077,131 | B2 | 9/2018 | Lettre et al. | |
| 10,106,291 | B2 | 10/2018 | Kearns | |
| 10,202,220 | B2 | 2/2019 | Reichenberg | |
| 10,287,073 | B2 * | 5/2019 | Zammit | B65B 43/265 |
| 10,501,226 | B2 | 12/2019 | Spivey, Sr. | |
| 10,543,969 | B2 | 1/2020 | Gonzalez et al. | |
| 11,059,621 | B2 | 7/2021 | Nowak et al. | |
| 11,760,549 | B2 | 9/2023 | Alexander et al. | |
| 12,037,173 | B2 * | 7/2024 | Smalley | B31B 50/262 |
| 12,172,814 | B2 | 12/2024 | Smalley | |
| 2003/0146269 | A1 | 8/2003 | Auclair et al. | |
| 2004/0195116 | A1 | 10/2004 | Leung | |
| 2005/0230273 | A1 * | 10/2005 | Kohler | B65D 71/0081 206/192 |
| 2006/0249413 | A1 | 11/2006 | Auclair | |
| 2008/0290147 | A1 | 11/2008 | Skolik et al. | |
| 2010/0084309 | A1 | 4/2010 | Sielski | |
| 2014/0158694 | A1 | 6/2014 | Martin | |
| 2017/0144829 | A1 | 5/2017 | Muhammad | |
| 2019/0047763 | A1 | 2/2019 | Holley, Jr. | |
| 2023/0365293 | A1 | 11/2023 | Nowak | |

FOREIGN PATENT DOCUMENTS

| | | | |
|---|---|---|---|
| JP | S6321220 | U | 2/1988 |
| JP | 06-156480 | A | 6/1994 |
| JP | 11-227746 | A | 8/1999 |
| JP | 2001-048161 | A | 2/2001 |
| JP | 2005-313911 | A | 11/2005 |
| JP | 2009-078818 | A | 4/2009 |
| JP | 2011-093612 | A | 5/2011 |
| JP | 2015-113158 | A | 6/2015 |
| KR | 20-1990-0015203 | U | 5/1999 |
| KR | 10-0393518 | B1 | 8/2003 |

OTHER PUBLICATIONS

International Search Report and Written Opinion for PCT/US2023/031036 dated Dec. 13, 2023.
Extended European Search Report issued in App. No. EP23858072, dated Jul. 7, 2026 (pp. 1-8).

* cited by examiner

DIVIDER CONSTRUCT FOR CARTONS, RELATED SYSTEMS AND METHODS

CROSS-REFERENCE TO RELATED APPLICATION

The present application is a continuation in part of U.S. patent application Ser. No. 18/237,674, filed on Aug. 24, 2023, which claims the benefit of each of U.S. Provisional Patent Application No. 63/400,925, filed on Aug. 25, 2022, U.S. Provisional Patent Application No. 63/417,743, filed on Oct. 20, 2022. The present application also claims the benefit of U.S. Provisional Patent Application No. 63/600,397, filed on Nov. 17, 2023.

INCORPORATION BY REFERENCE

The disclosures of each of U.S. Provisional Patent Application No. 63/400,925, filed on Aug. 25, 2022, U.S. Provisional Patent Application No. 63/417,743, filed on Oct. 20, 2022, U.S. patent application Ser. No. 18/237,674, filed on Aug. 24, 2023, and U.S. Provisional Patent Application No. 63/600,397, filed on Nov. 17, 2023, are incorporated by reference for all purposes as if presented herein in their entireties.

BACKGROUND OF THE DISCLOSURE

The present disclosure generally relates to containers for holding at least one article. In one embodiment, the present disclosure relates to constructs for providing divider features in the interior of a carton for holding at least one article.

SUMMARY OF THE DISCLOSURE

According to one aspect, the disclosure is generally directed to a construct for holding a plurality of containers, the construct comprising a plurality of panels comprising a front panel, at least one back panel, and at least one side panel extending at least partially around an interior of the construct, and divider features comprising at least one divider flap foldably connected to a respective panel of the plurality of panels at least partially forming at least one divider wall of the construct and forming a plurality of container receiving spaces in the interior of the construct.

According to another aspect, the disclosure is generally directed to a blank for forming a construct for holding a plurality of containers, the blank comprising a plurality of panels for extending at least partially around an interior of the construct and comprising a front panel, at least one back panel, and at least one side panel, and divider features comprising at least one divider flap foldably connected to a respective panel of the plurality of panels for at least partially forming at least one divider wall of the construct formed from the blank to form a plurality of container receiving spaces in the interior of the construct formed from the blank.

According to another aspect, the disclosure is generally directed to a method of forming a construct for holding a plurality of containers, the method comprising obtaining a blank, the blank comprising a plurality of panels comprising a front panel, at least one back panel, and at least one side panel, and divider features comprising at least one divider flap foldably connected to a respective panel of the plurality of panels, positioning the plurality of panels extending at least partially around an interior of the construct, and at least partially forming at least one divider wall from the at least one divider flap to form a plurality of container receiving spaces in the interior of the construct formed from the blank.

According to another aspect, the disclosure is generally directed to a system, the system comprising a plurality of containers and a construct holding the plurality of containers, the construct comprising a plurality of panels comprising a front panel, at least one back panel, and at least one side panel extending at least partially around an interior of the construct, and divider features comprising at least one divider flap foldably connected to a respective panel of the plurality of panels at least partially forming at least one divider wall of the construct forming a plurality of container receiving spaces in the interior of the construct.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Containers and constructs according to the present disclosure can accommodate articles of numerous different shapes. In this specification, the terms “lower,” “bottom,” “upper,” “top,” “front,” and “back” indicate orientations determined in relation to fully erected containers. As described herein, containers may be formed by multiple overlapping panels, portions, and/or end flaps. Such panels, portions, and/or end flaps may be designated in relative terms to one another, e.g., “first”, “second”, “third”, etc., in sequential or non-sequential reference, without departing from the disclosure.

Figure 1:
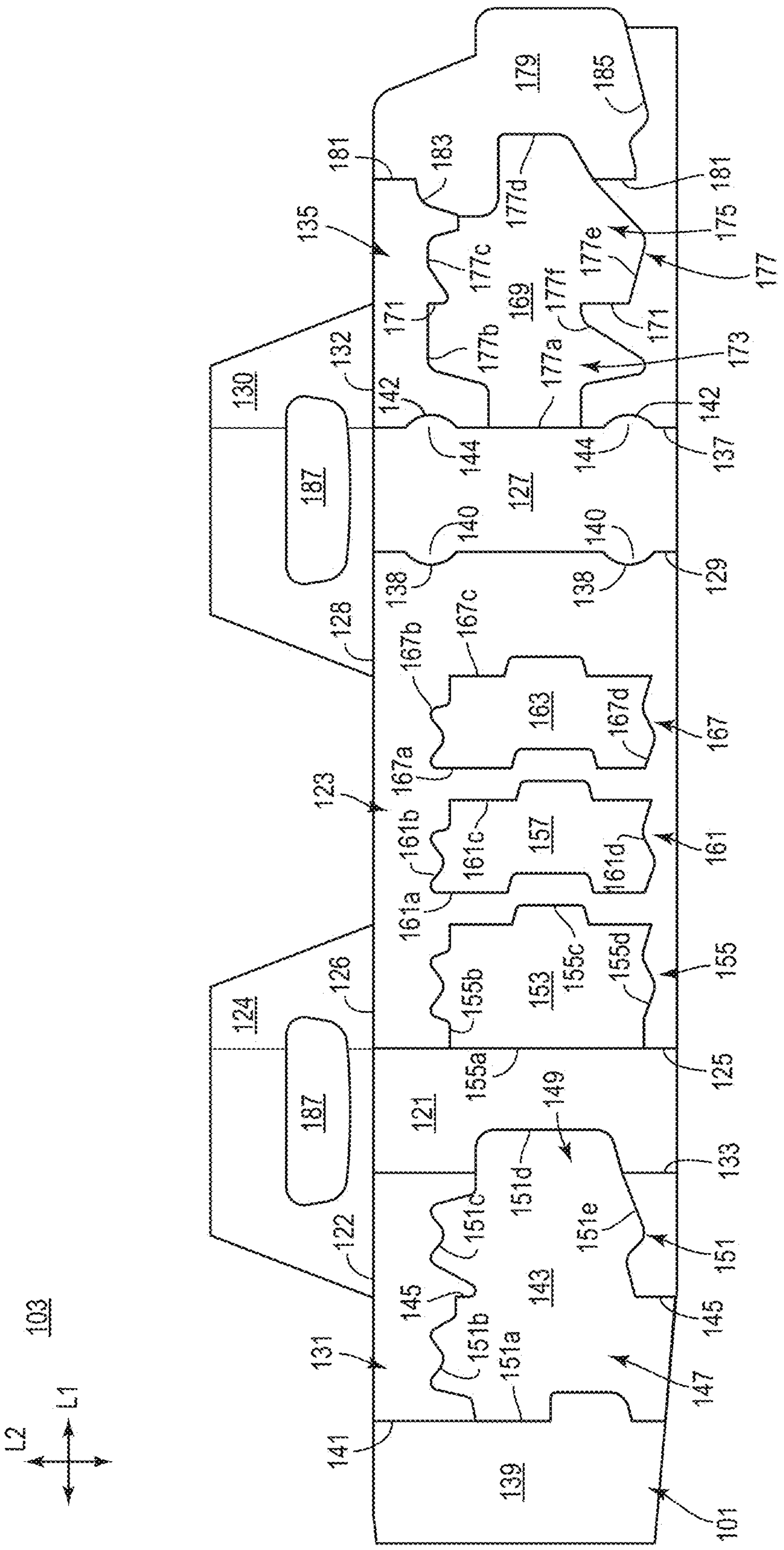
FIG. 1 is a plan view of an exterior surface of a blank for forming a construct according to a first exemplary embodiment of the disclosure.

FIG. 1 illustrates an exterior surface 101 of a blank 103 for forming a construct 105 (FIG. 3) according to a first exemplary embodiment of the disclosure. The construct 105 can be configured to form a divider insert so as to provide divider features in the interior of another container such as carton or other container. In this regard, the construct 105 can be provided together with a carton or other container to form a system 110 (FIG. 4).

Figure 2:
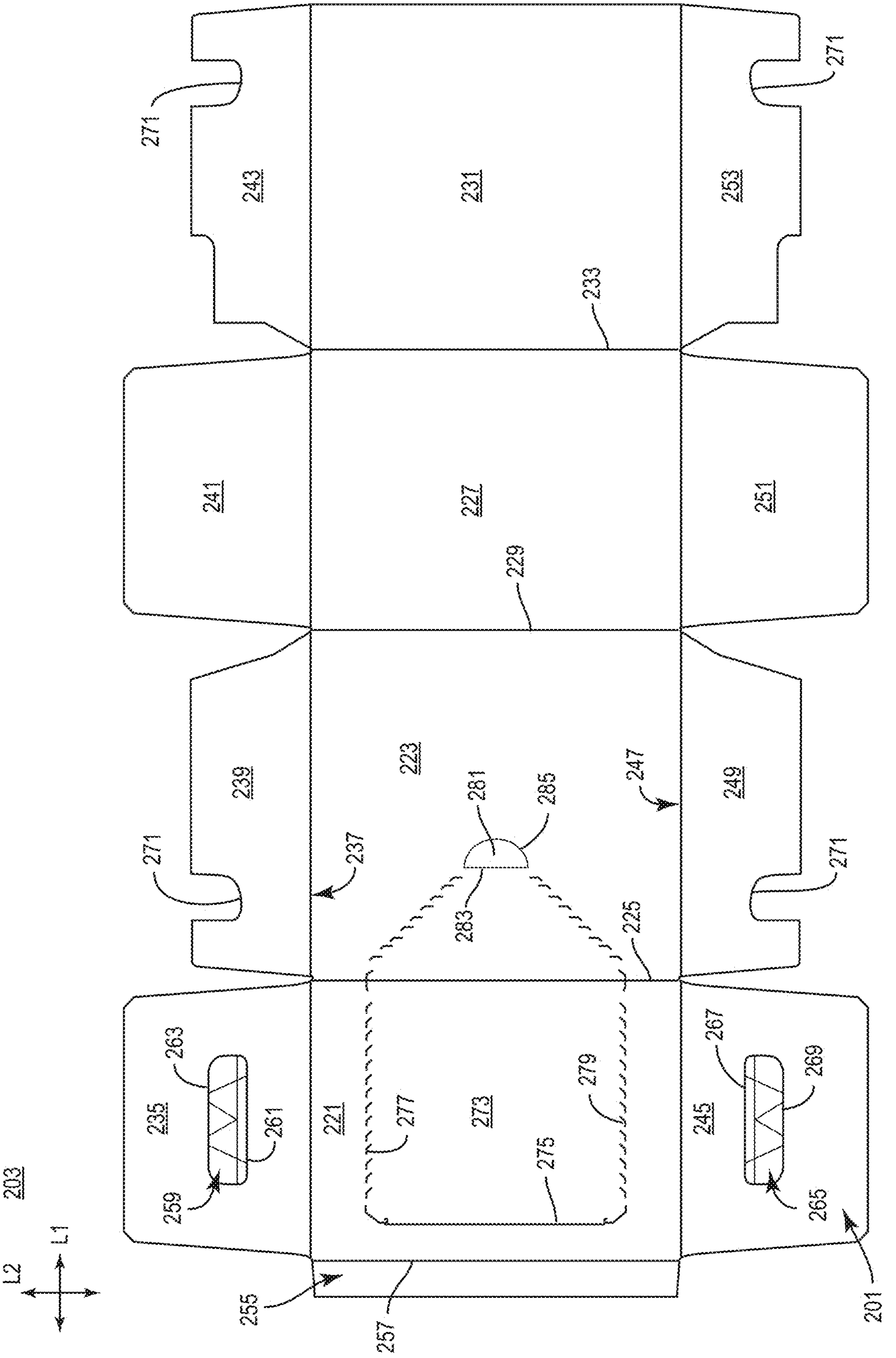
FIG. 2 is a plan view of an exterior surface of a blank for forming a carton according to exemplary embodiments of the disclosure.

With momentary reference to FIG. 2, the exterior surface 201 of a blank 203 for forming a carton 205 (FIG. 4) for use with the construct 105 according to exemplary embodiments of the present disclosure is illustrated.

The blank 203 can have a longitudinal axis L1 and a lateral axis L2. A plurality of panels of the blank 203 are for being folded at least partially around an interior 207 (FIG. 4) of the carton 205 formed from the blank 203, and a plurality of end flaps can be foldably connected to a respective panel of the plurality of panels.

The plurality of panels of the blank 203 and carton 205 formed therefrom can include a top panel 221, a front panel 223 foldably connected to the top panel 221 at a lateral fold line 225, a bottom panel 227 foldably connected to the top panel 221 at a lateral fold line 229, and a back panel 231 foldably connected to the bottom panel 227 at a lateral fold line 233.

The plurality of end flaps of the blank 203 and carton 205 formed therefrom can include a first top side end flap 235 foldably connected to the top panel 221 at a respective portion of a longitudinal fold line 237, a first front side end flap 239 foldably connected to the front panel 223 at a respective portion of the fold line 237, a first bottom side end flap 241 foldably connected to the bottom panel 227 at a respective portion of the fold line 237, and a first back side end flap 243 foldably connected to the back panel 231 at a respective portion of the fold line 237.

Similarly, the plurality of end flaps can include a second top side end flap 245 foldably connected to the top panel 221 at a respective portion of a longitudinal fold line 247, a second front side end flap 249 foldably connected to the front panel 223 at a respective portion of the fold line 247, a second bottom side end flap 251 foldably connected to the bottom panel 227 at a respective portion of the fold line 247, and a second back side end flap 253 foldably connected to the back panel 231 at a respective portion of the fold line 247.

As shown, the end flaps 235, 239, 241, 243 can be foldably connected to a respective panel of the plurality of panels at respective portions of the fold line 237 such that the end flaps 235, 239, 241, 243 extend along a first marginal portion of the blank 203, and the end flaps 245, 249, 251, 253 can be foldably connected to a respective panel of the plurality of panels at respective portions of the fold line 247 such that the end flaps 245, 249, 251, 253 extend along a second marginal portion of the blank 203.

In this regard, the plurality of end flaps 235, 239, 241, 243 can be a first plurality of end flaps for being at least partially overlapped to form a first closed end 209 of the carton 205 formed from the blank 203, and the plurality of end flaps 245, 249, 251, 253 can be a second plurality of end flaps for being at least partially overlapped to form a second closed end 211 of the carton 205 formed from the blank 203.

As also shown, an attachment flap 255 can be foldably connected to the top panel 221 at a lateral fold line 257.

The blank 203 and carton 205 formed therefrom can also include handle features that can include a handle flap 259 foldably connected to the top side end flap 235 at a longitudinal fold line 261 and at least partially separable therefrom at a generally U-shaped cut 263. Similarly, a handle flap 265 can be foldably connected to the top side end flap 245 at a longitudinal fold line 267 and can be at least partially separable therefrom at a generally U-shaped cut 269. As shown, one or both of the handle flaps 259, 265 can have one or more lines of weakening at least partially extending therealong to define respective portions that are foldable/separable relative to each other, e.g., to increase the strength of the respective handle flap, distribute stresses applied to the handle flap, for comfort, etc.

Handle features of the blank 203 and carton 205 formed therefrom can also include handle cutouts/handle recesses 271 defined along respective free edges of the respective end flaps 239, 243, 249, 253. As described further herein, each handle cutout 271 is for being at least partially aligned with at least one other handle cutout 271 and with a respective handle flap 259, 265 when the carton 205 is formed from the blank 203.

The blank 203 and carton 205 formed therefrom can further include dispenser features for forming a dispenser of the carton 205. The dispenser features can include a dispenser panel 273 extending in respective portions of the top panel 221 and the front panel 223 so as to be at least partially interrupted by the fold line 225. The dispenser panel 273 can be at least partially foldably connected to the top panel 221 at a lateral fold line 275, and can be at least partially separable from respective portions of the top panel 221 and the front panel 223 at respective tear lines 277, 279 extending from a respective endpoint of the fold line 275 and each having a respective longitudinal portion intersecting a respective oblique portion.

An access tab 281 can be foldably connected to the dispenser panel 273 at a lateral fold line 283 having respective endpoints intersecting the oblique portions of the respective tear lines 277, 279. The access tab 281 can be at least partially separable from the front panel 223 at a generally curved cut 285 for providing access to the dispenser panel 273/dispenser of the carton 205, as described further herein.

It will be understood that one or more of the panels, end flaps, and features of the blank 203 and carton 205 formed therefrom can have a different configuration and/or arrangement without departing from the disclosure.

Referring again to FIG. 1, the blank 103 for forming the construct 105 can have the longitudinal axis L1 and the lateral axis L2. A plurality of panels of the blank 103 are provided, and a plurality of flaps can be foldably connected to a respective panel of the plurality of panels.

The plurality of panels of the blank 103 and construct 105 formed therefrom can include a first end panel 121, a side panel 123 foldably connected to the first end panel 121 at a lateral fold line 125, and a second end panel 127 foldably connected to the side panel 123 at a lateral fold line 129.

As shown, the lateral fold line 129 can be interrupted by a respective pair of laterally spaced curved cuts 138 to define respective tabs 140 protruding from the end panel 127. Similarly, the lateral fold line 137 can be interrupted by a respective pair of laterally spaced curved cuts 142 to define respective tabs 144 protruding from the end panel 127.

A side panel portion/side panel 131 can also be foldably connected to the end panel 121 at a lateral fold line 133, and a side panel portion/side panel 135 can be foldably connected to the end panel 127 at a lateral fold line 137. As described further herein, the side panels 131, 135 can together form a side panel or side of the construct 105 formed from the blank 103.

As shown, upper portions of the respective end panels 121, 127 can be at least partially separable from the respective side panels 131, 135 at respective longitudinal cuts 122, 128.

As also shown, a divider panel 139 can be foldably connected to the side panel 131 at a lateral fold line 141.

The flaps/end flaps of the blank 103 and construct 105 formed therefrom can include respective end flaps 124, 130 foldably connected to upper portions of the respective end panels 121, 127 at respective portions of the respective fold lines 125, 137. The end flaps 124, 130 can be separable from the respective side panels 123, 135 at respective longitudinal cuts 126, 132 that intersect the respective fold lines 125, 137.

As also shown, a divider flap 143 (broadly, "first divider flap") can be foldably connected to the side panel 131 at a lateral fold line 145 that is interrupted by a portion of the divider flap 143 extending therebetween. As shown, the divider flap 143 can have a first portion 147 and a second portion 149 at least partially interrupting the end panel 121.

The first portion 147 of the divider flap 143 can be at least partially separable from the side panel 131 at a line of weakening 151 having one or more of straight, curved, and angled portions. The line of weakening 151 can include a first generally lateral segment 151*a* extending from an endpoint of the fold line 141 to a lateral free edge of the blank 103, a first upper generally longitudinal segment 151*b* extending from intersecting endpoints of the fold line 141 and the segment 151*a* to an endpoint of the fold line 145, a second upper generally longitudinal portion 151*c* extending from a portion of the fold line 145 into the end panel 121 (so as to interrupt the fold line 133), a second generally lateral segment 151*d* extending from the segment 151*c*, and a lower generally longitudinal segment 151*e* extending from the segment 151*d* to a portion of the fold line 145 so as to interrupt the fold line 133.

A divider flap 153 (broadly, "second divider flap") can be separably connected to the end panel 121/side panel 123 at a line of weakening 155 that includes a first generally lateral segment 155*a* interrupting the fold line 125, a generally longitudinal upper segment 155*a* extending from the segment 155*b*, a second generally lateral segment 155*c* extending from the segment 155*b*, and a generally longitudinal lower segment 155*d* extending from the segment 155*c* to the segment 155*a*.

A divider flap 157 (broadly "second divider flap") can be separably connected to the side panel 123 at a line of weakening 161 that includes a first generally lateral segment 161*a*, a generally longitudinal upper segment 161*b* extending from the segment 161*a*, a second generally lateral segment 161*c* extending from the segment 161*b*, and a generally longitudinal lower segment 161*d* extending from the segment 161*c* to the segment 161*a*.

A divider flap 163 (broadly, "third divider flap") can be foldably connected to the side panel 123 at a line of weakening 167 that includes a first generally lateral segment 167*a*, a generally longitudinal upper segment 167*b* extending from the segment 167*a*, a second generally lateral segment 167*c* extending from the segment 167*b*, and a generally longitudinal lower segment 167*d* extending from the segment 167*c* to the segment 167*a*.

The flaps/end flaps of the blank 103 and construct 105 formed therefrom can also include a divider flap 169 (broadly, "fourth divider flap") foldably connected to the side panel 135 at a lateral fold line 171 that is interrupted by a portion of the divider flap 169 extending therebetween. As shown, the divider flap 169 can have a first portion 173 and a second portion 175.

The first portion 173 of the divider flap 169 can be at least partially separable from the side panel 135 at a line of weakening 177 having one or more of straight, curved, and angled portions. The line of weakening 177 can include a first generally lateral segment 177*a* interrupting the fold line 137, a first upper generally longitudinal segment 177*b* extending from the segment 177*a* to an endpoint of the fold line 171, a second upper generally longitudinal portion 177*c* extending from a portion of the fold line 171 (so as to interrupt the fold line 171) to a second generally lateral segment 177*d*, the segment 177*d* extending to a lower generally longitudinal segment 177*e* that intersects an endpoint of the fold line 171, and another lower generally longitudinal segment 177*e* extending from a portion of the fold line 171 (so as to interrupt the fold line 171) to the segment 177*a*.

A divider flap 179 (broadly, "fourth divider flap") can be foldably connected to the side panel 135 at a lateral fold line 181 that is interrupted by respective portions of the divider flaps 169, 179 extending therebetween. The divider flap 179 can be at least partially separable from the side panel 135 at a generally curved cut 183 that intersects the segments 177*c*, 177*d* of the line of weakening 177, and a generally longitudinal cut 185 that extends from an endpoint of the fold line 181 to a free edge of the blank 103. The divider flap 179 can be at least partially separable from the divider flap 169 at respective portions of the line of weakening 177.

As described herein, one or more of the divider flaps and divider panels can be divider features of the blank 103 and construct 105 formed therefrom for forming at least one divider wall of the construct 105, the divider features further comprising the at least one divider wall.

The blank 103 and construct 105 formed therefrom can also include handle features for facilitating grasping of the construct 105 and/or one or more containers that at least partially receive the construct 105.

In the illustrated embodiment, the end panels 121, 127 can each include a respective handle opening or handle cutout 187 at least partially formed therein. The respective handle cutouts 187 can extend at least partially into the respective end flaps 124, 130 such that the handle cutouts 187 interrupt the respective fold lines 125, 137.

It will be understood that the blank 103 and construct 105/system 110 formed therefrom can include a different number, arrangement, and/or configuration of panels, end flaps, and/or associated features without departing from the disclosure.

With additional reference to FIG. 3, formation of the construct 105 from the blank 103 will be described according to an exemplary embodiment of the disclosure. It will be understood that intermediate configurations between the blank 103 illustrated in FIG. 1 and the construct 105 illustrated in FIG. 3 can optionally be considered a further folded configuration of the blank 103 or a partially erected configuration of the construct 105.

The blank 103 can be positioned with the exterior surface 101 on a supporting surface and with an interior surface thereof facing upwardly. The side panel 135 and end flap 130 can both be folded at respective portions of the fold line 137 such that the end flap 130 is positioned in at least partial face-to-face contact with an upper portion of the end panel 127 and such that the side panel 135 is positioned in at least partial face-to-face contact with respective portions of the end panel 127 and the side panel 123.

Thereafter, the end panel 121 can be folded at the fold line 125 such that the end panel 121 is positioned in at least partial face-to-face contact with respective portions of the end flap 124 and the side panel 123. The side panel 131 and the divider panel 139 can also be carried during such movement of the end panel 121 such that the side panel 131 is positioned in at least partial face-to-face contact with a respective portion of the side panel 123 and such that the divider panel 139 is positioned in at least partial face-to-face contact with respective portions of the divider flap 179/side panel 135.

Such an arrangement can be a collapsed configuration of the construct 105 that has a generally flattened profile, for example, for shipping, storage, stacking, etc., in a minimized or space-saving arrangement. It will be understood that such arrangement can be at least partially maintained with one or more applications of adhesive such as glue.

Accordingly, the divider flap 143 can be at least partially attached to the divider flap 153, the divider flap 179 can be at least partially attached to the divider flap 157, and the divider flap 169 can be at least partially attached to the divider flap 163.

Figure 3:
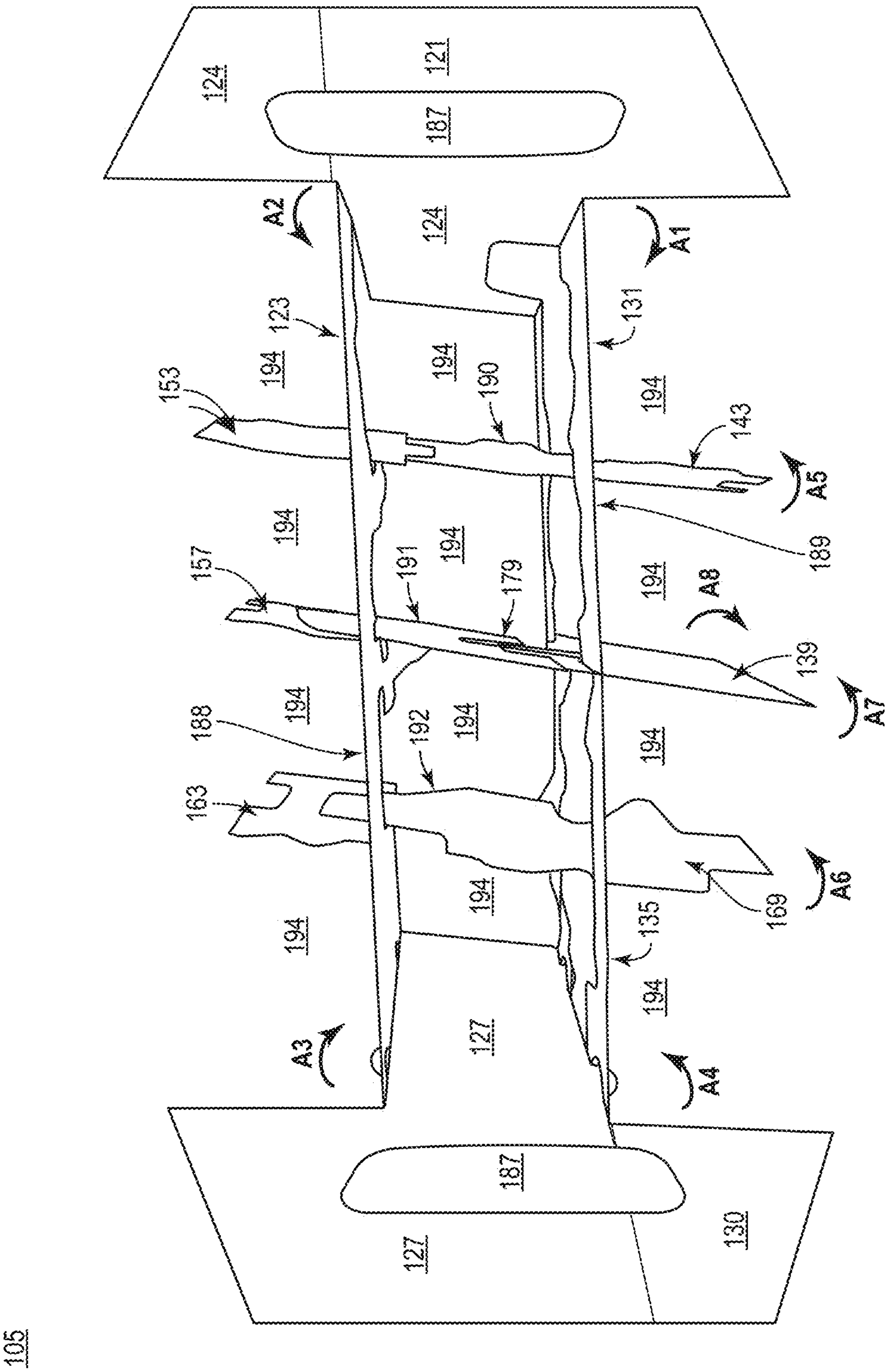
FIG. 3 is a perspective view of a construct formed from the blank of FIG. 1 according to the first exemplary embodiment of the disclosure.
Figure 4:
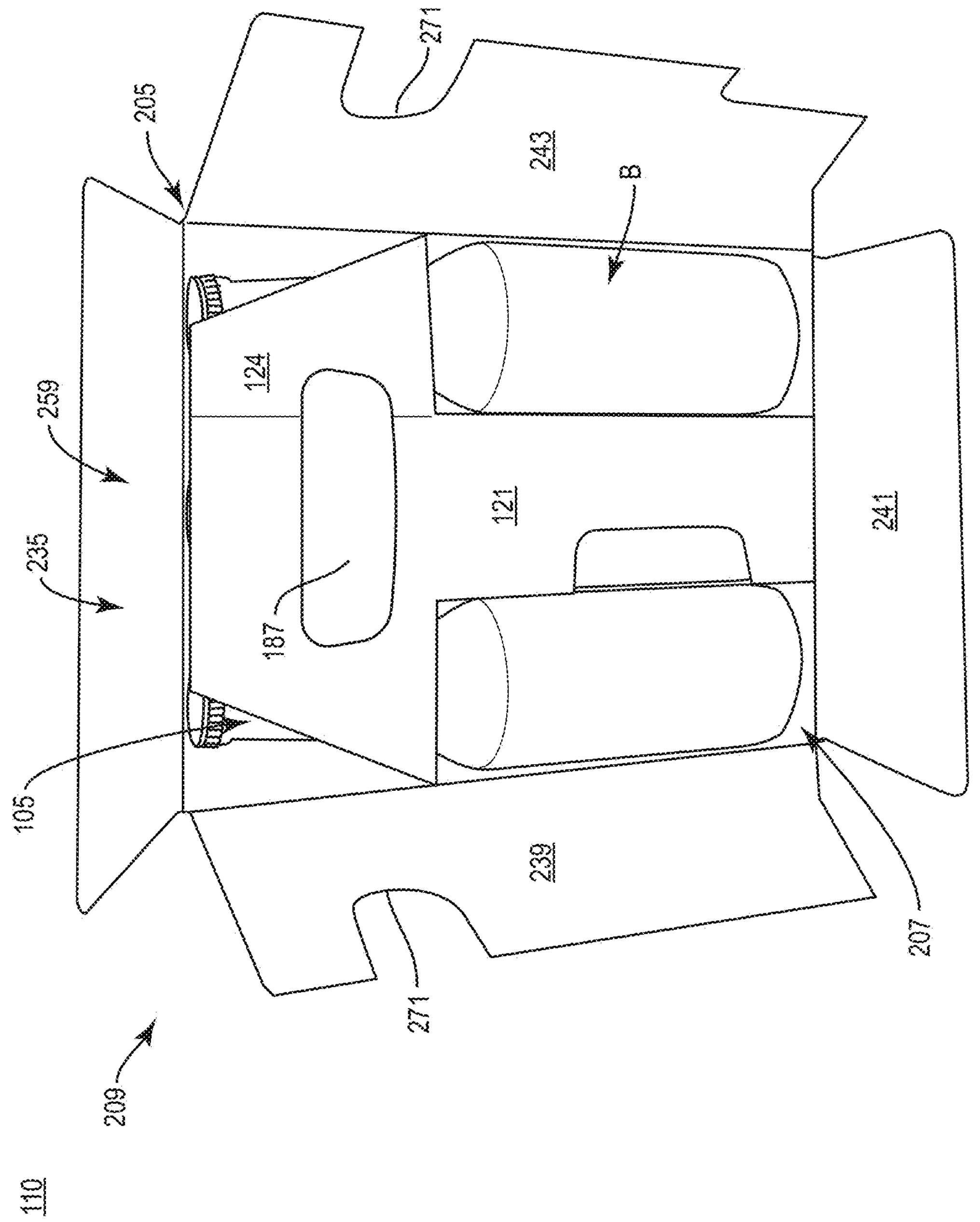
FIG. 4 is a perspective view of the construct of FIG. 3 holding a plurality of containers and at least partially received within a carton formed from the blank of FIG. 2 to form a system according to the first exemplary embodiment of the disclosure.

As shown in FIG. 3, the construct 105 can be arranged such that the end panel 131 is folded at the fold line 133 in the direction of the arrow A1 so as to at least partially separate from the end panel 121 at the cut 122, the side panel 123 can be folded at the fold line 125 in the direction of the arrow A2 so as to at least partially separate from the end flap 124 at the cut 126, the side panel 123 can be folded at the fold line 129 in the direction of the arrow A3 so as to at least partially separate from the end panel 127 at the cut 128, and the side panel 135 can be folded at the fold line 137 in the direction of the arrow A4 so as to at least partially separate from the end flap 130 at the cut 132.

In such arrangement, the end panels 121, 127 can be positioned in generally parallel spaced relation, with the side panels 131, 135 in generally planar relation to one another and in generally parallel spaced relation with the end panel 123. The side panels 131, 135 can extend from the end panel 121 to the end panel 127 in generally perpendicular relation thereto, and the side panel 123 can extend from the end panel 121 to the end panel 127 in generally perpendicular relation thereto.

Such movement of the panels of the blank 103/construct 105 can cause the divider flap 143 to separate from the side panel 131 and the end panel 121 at respective portions of the line of weakening 151 and to fold at the fold line 145 in the direction of the arrow A5 into generally perpendicular relation with the side panels 123, 131. The divider flap 153 attached to the divider flap 143 can also be caused to at least partially separate from the side panel 123 at the line of weakening 155 and move in the direction of the arrow A5 into generally perpendicular relation with the side panels 123, 131.

Similarly, the divider flap 169 can at least partially separate from the side panel 135 and from the divider flap 179 at respective portions of the line of weakening 177 and can fold at the fold line 171 in the direction of the arrow A6 into generally perpendicular relation with the side panels 123, 135. The divider flap 163 attached to the divider flap 169 can at least partially separate from the side panel 123 at respective portions of the line of weakening 167 and can move in the direction of the arrow A6 into generally perpendicular relation with the side panels 123, 135.

The divider flap 179 can also be at least partially separated from the side panel 135 and the divider flap 169 at respective portions of the lines of weakening 183, 185, 177 and can at least partially fold at the fold line 181 in the direction of the arrow A7 into generally perpendicular relation with the side panels 123, 135. The divider flap 157 attached to the divider flap 179 can at least partially separate from the side panel 123 at respective portions of the line of weakening 161 and can move in the direction of the arrow A7 into generally perpendicular relation with the side panels 123, 135.

The divider panel 139 can also be folded at the fold line 141 into generally outward relation with the side panel 131 in the direction of the arrow A8 so as to extend generally away from the divider flap 179 toward and past the side panel 135.

In the illustrated arrangement, the side panel 123 forms a divider wall 188 (broadly, "second divider wall") of the construct 105, the side panels 131, 135 together form a divider wall 189 (broadly, "third divider wall") of the construct 105, the divider flaps 143, 153 together form a divider wall 190 (broadly, "first divider wall") of the construct 105, the divider flaps 179, 157 and the divider panel 139 together form a divider wall 191 (broadly, "fourth divider wall" or "second divider wall") of the construct 105, and the divider flaps 163, 169 together form a divider wall 192 (broadly, "fourth divider wall" or "second divider wall") of the construct 105.

Accordingly, a plurality of compartment spaces or container receiving spaces 194 can be formed between respective portions of the divider walls 188, 189, 190, 191, 192 for receiving respective containers C.

In one embodiment, the containers C are illustrated as beverage containers, e.g., bottles formed of metal, glass, plastic, etc., having a body portion with a top portion generally comprising an upper neck portion and a cap, but containers of other sizes, shapes, and configurations can be used with the construct 105 without departing from the disclosure.

In this regard, containers C can be inserted into respective compartment spaces 194 formed by the divider walls of the construct 105 so as to maintain at least partial separation thereof via portions of the respective divider walls positioned therebetween. In one embodiment, a plurality of containers C can be arranged in a desired row and column arrangement, and the construct 105 can be lowered onto the plurality of containers C such that a respective container C is at least partially received in a respective compartment space 194.

With additional reference to FIG. 4, the construct 105 having one or more of the containers C at least partially received in a respective compartment space 194 can be loaded into the interior 207 of a carton 205 to form a system 110.

In one embodiment, the carton 205 can be formed by arranging the top panel 221 and the bottom panel 227 in generally spaced and parallel relation, with each of the front panel 223 and the back panel 231 extending from the top panel 221 to the bottom panel 227 in generally perpendicular relation thereto and with the panels 223, 231 in generally spaced and parallel relation.

Thereafter, the end flaps 235, 239, 241, 243 can be folded at respective portions of the fold line 237 and at least partially overlapped to form the first closed end 209 of the carton 205 and the end flaps 245, 249, 251, 253 can be folded at respective portions of the fold line 247 and at least partially overlapped to form the second closed end 211 of the carton 205.

Figure 5:
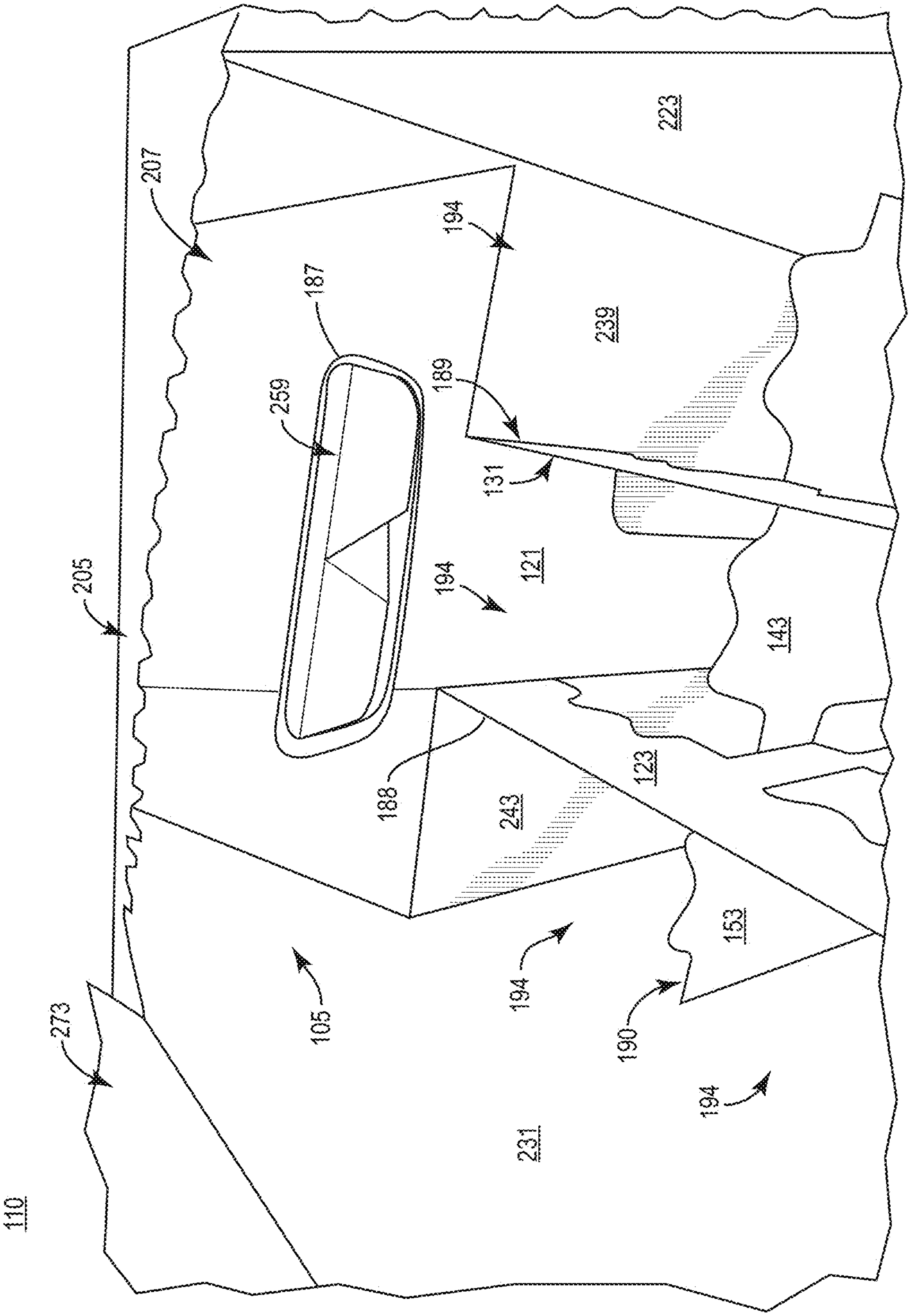
FIG. 5 is a breakaway perspective view of a portion of the construct of FIG. 3 positioned in the carton of FIG. 4 according to the first exemplary embodiment of the disclosure.

As also shown in FIG. 5, upon insertion of the construct 105 into the interior 207 of the carton 205, the end panels 121, 127 and respective end flaps 124, 130 and the respective handle cutouts 187 defined therein can be generally aligned with the respective handle recesses 271 and handle flaps 259, 265 to facilitate a customer or other user grasping a cooperating handle structure for lifting, carrying, and/or otherwise engaging the system 110.

Figure 6:
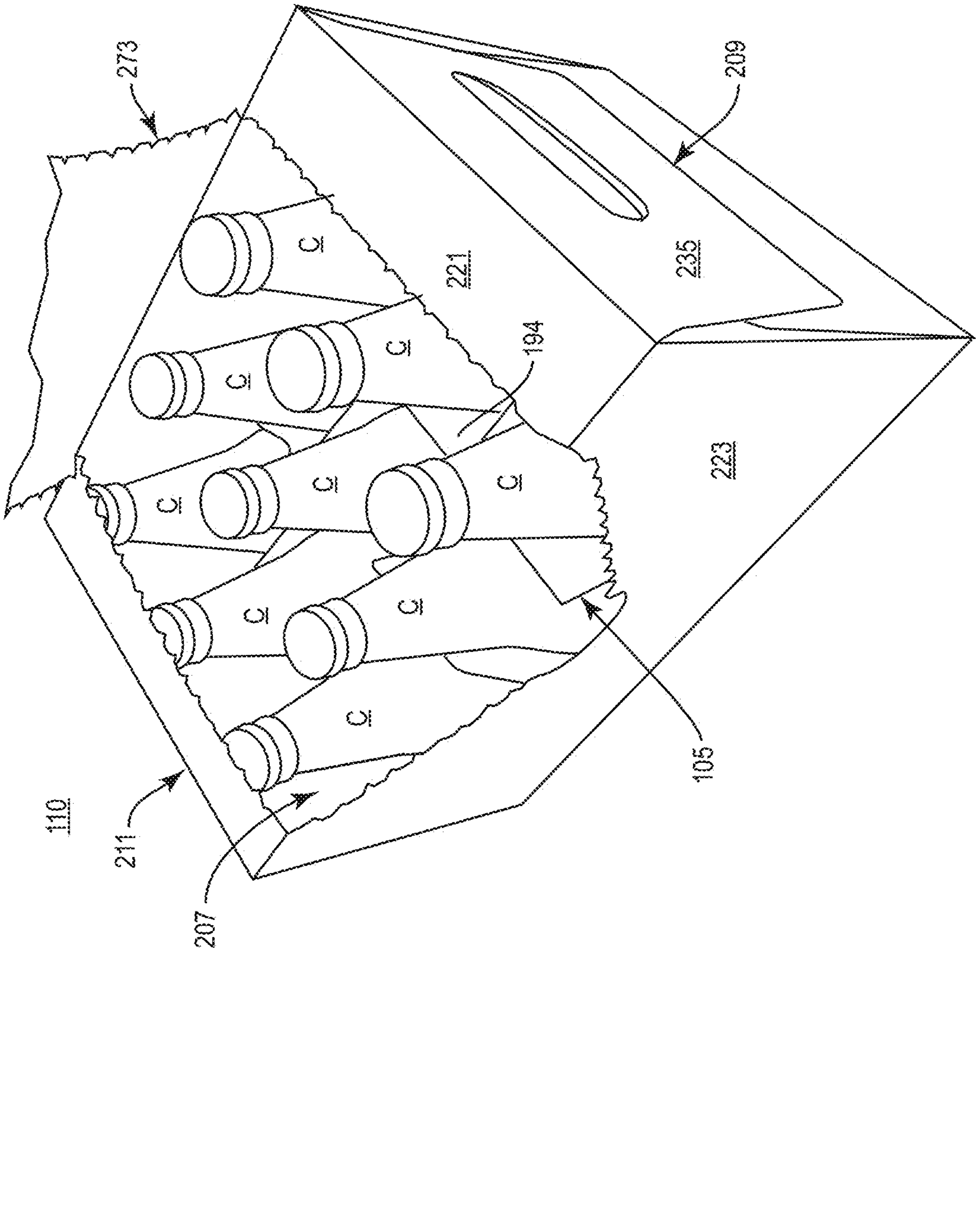
FIG. 6 is a perspective view of the construct of FIG. 3 holding a plurality of containers and received in a carton formed from the blank of FIG. 2 with a dispenser feature thereof activated according to the first exemplary embodiment of the disclosure.

In this regard, the construct 105 can be provided separately from cartons 205 or other containers to provide an optional divider insert for an existing supply of cartons or other containers, e.g., for use in situations in which a compartmented interior for a given carton or container is desired. As shown in the perspective view of FIG. 6, in which the dispenser panel 273 is at least partially separated from the top panel 221 and the front panel 223 of the carton 205 at the respective lines of weakening 277, 279, compartment spaces 194 can be defined between respective divider walls of the construct 105 and respective panels of the carton 205.

In some embodiments, the construct(s) 105 can be provided together with cartons 205 or other systems as a kit or package for forming compartmented cartons (e.g., the system 110).

It will be understood that the construct 105, the carton 205, and/or one or more respective features thereof can have a different arrangement or configuration without departing from the disclosure.

Figure 7:
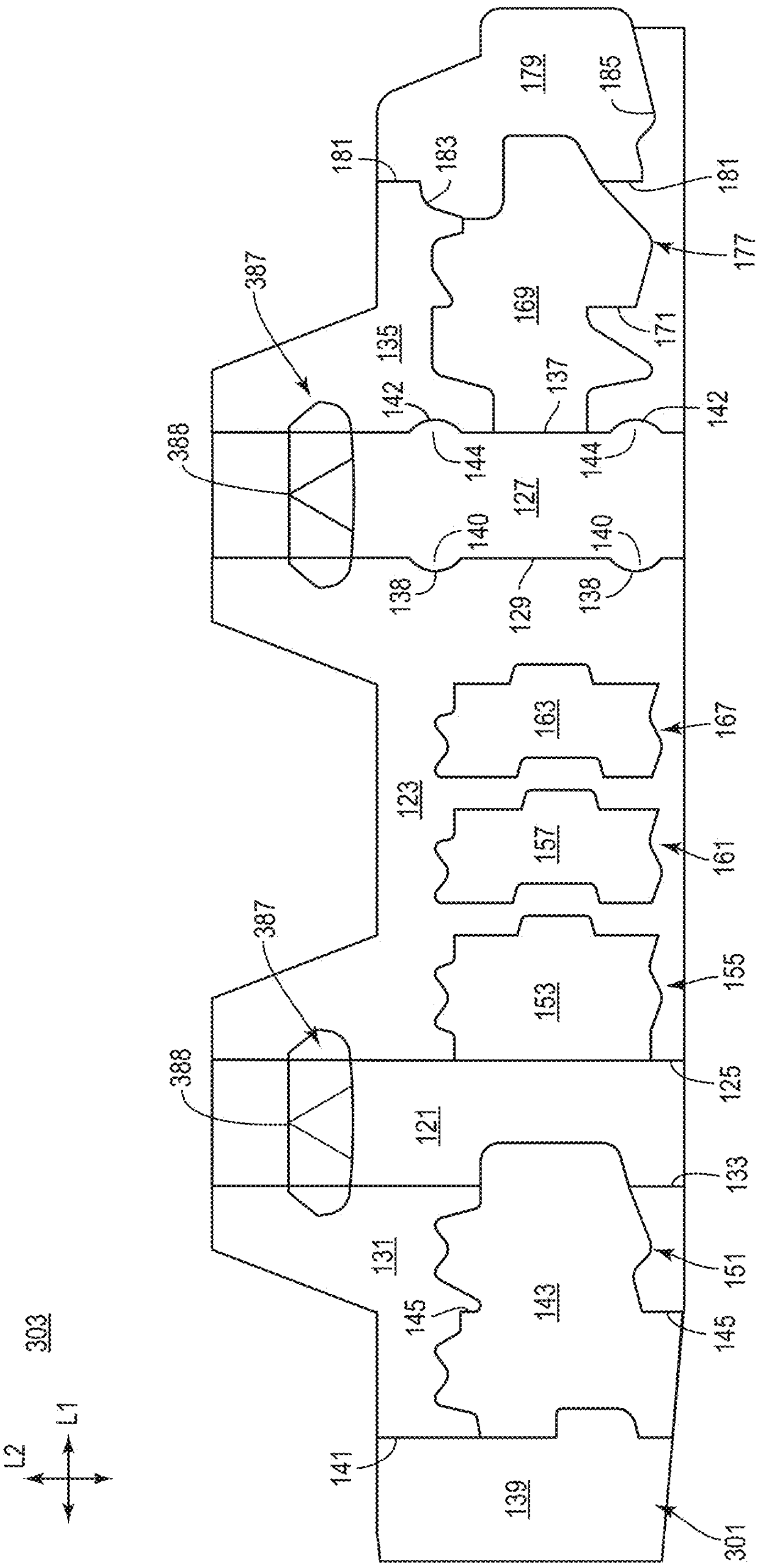
FIG. 7 is a plan view of an exterior surface of a blank for forming a construct according to a second exemplary embodiment of the disclosure.

With additional reference to FIG. 7, the exterior surface of a blank 303 for forming a construct 305 according to a second exemplary embodiment of the disclosure is illustrated. The blank 303 and the construct 305 can have one or more features similar to those described above with respect to the blank 103 and construct 105 described above, and like or similar features are designated with like or similar reference numerals.

As shown, the blank 303 can have the longitudinal axis L1, the lateral axis L2, and a configuration generally similar to that described above with regard to the blank 103, with the exception that the handle cutouts 187 have a respective handle flap 387 positioned at least partially therein and foldably connected to the respective end panel 121, 127 at a respective longitudinal fold line 388.

Furthermore, the cut 126 can be omitted such that the end flap 124 is formed as an upper portion of the side panel 123, and the cut 132 can be omitted such that the end flap 130 is formed as an upper portion of the side panel 135. Further still, upper portions of the end panels 121, 127 positioned over the respective side panels 131, 123 can be upper portions of such panels so as to be devoid of the respective cuts 122, 128, and the respective fold lines 133, 129 can extend further upwardly to a free edge of the blank 303.

Figure 8:
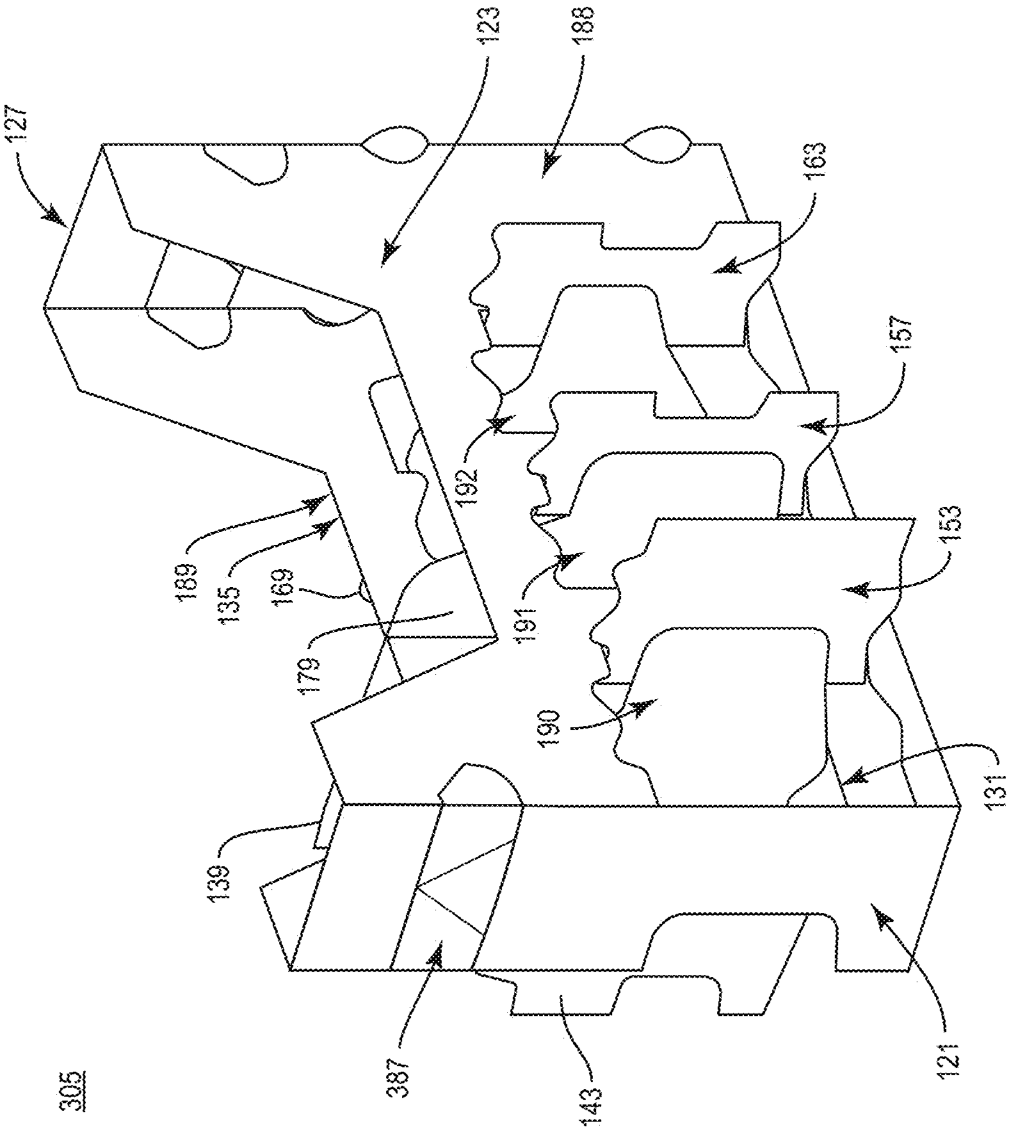
FIG. 8 is a perspective view of a construct formed from the blank of FIG. 7 according to the second exemplary embodiment of the disclosure.
Figure 9:
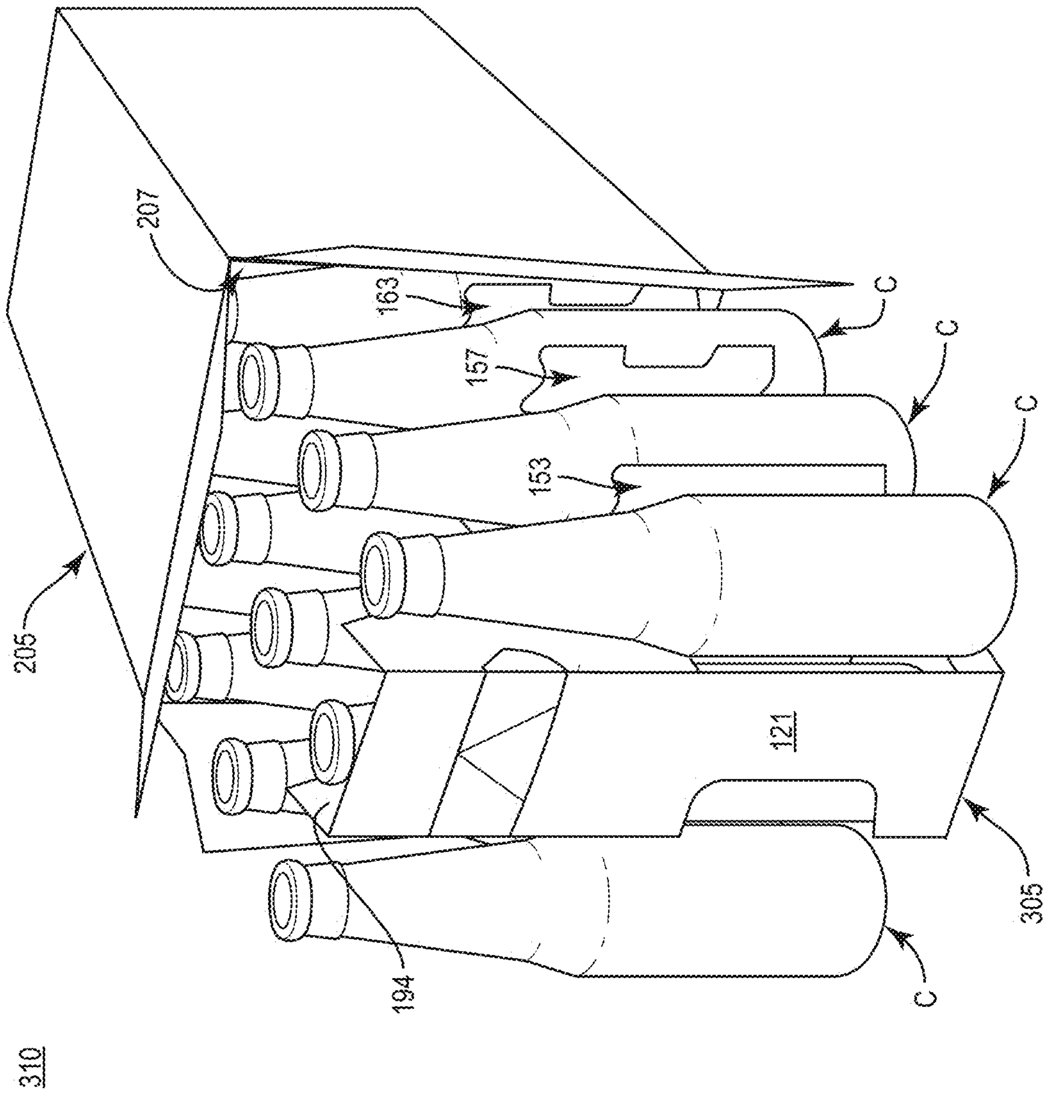
FIG. 9 is a perspective view of the construct of FIG. 8 holding a plurality of containers and at least partially received within a carton formed from the blank of FIG. 2 to form a system according to the second exemplary embodiment of the disclosure.

With additional reference to FIG. 8, the construct 305 can be formed in a manner similar to that described above with respect to the formation of the construct 105 from the blank 103. The construct 305 can be at least partially received in the interior 207 of the carton 205 or another container to form a system 310. The construct 305 and the system 310 can provide advantages similar to those described above with respect to the construct 105 and the system 110.

The construct 305 can have a different configuration of handle features without departing from the disclosure. For example, the construct 305 can be devoid of the handle flaps 387 without departing from the disclosure.

Figure 10:
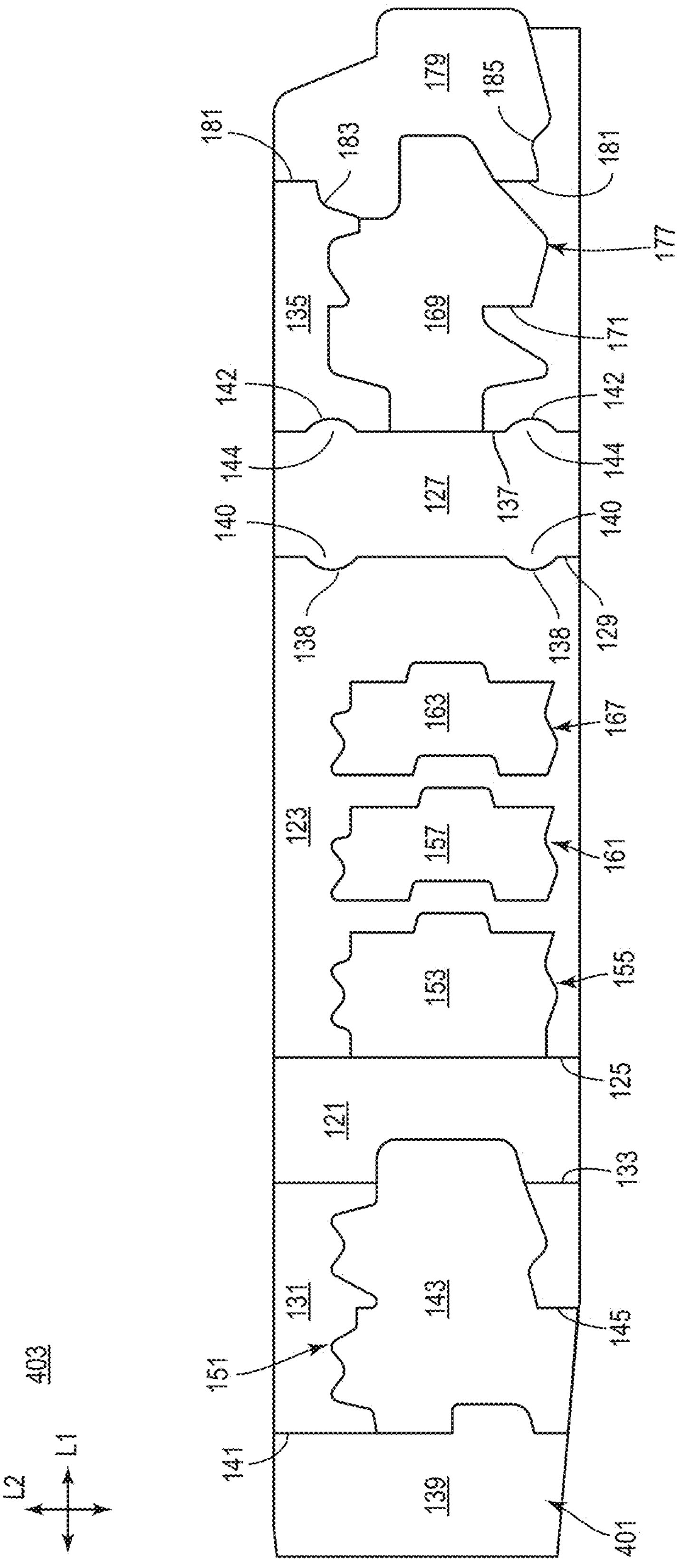
FIG. 10 is a plan view of an exterior surface of a blank for forming a construct according to a third exemplary embodiment of the disclosure.

With additional reference to FIG. 10, the exterior surface 401 of a blank 403 for forming a construct 405 according to a third exemplary embodiment of the disclosure is illustrated. The blank 403 and the construct 405 can have one or more features similar to those described above with respect to the blanks 103, 303 and constructs 105, 305 and like or similar features are designated with like or similar reference numerals.

As shown, the blank 403 can have the longitudinal axis L1, the lateral axis L2, and a configuration generally similar to that described above with regard to the blanks 103, 303, but can be devoid of the upper portions of the respective end panels 121, 127/side panels 131, 123, 134/end flaps 124, 130 so as to be devoid of handle features.

Figure 11:
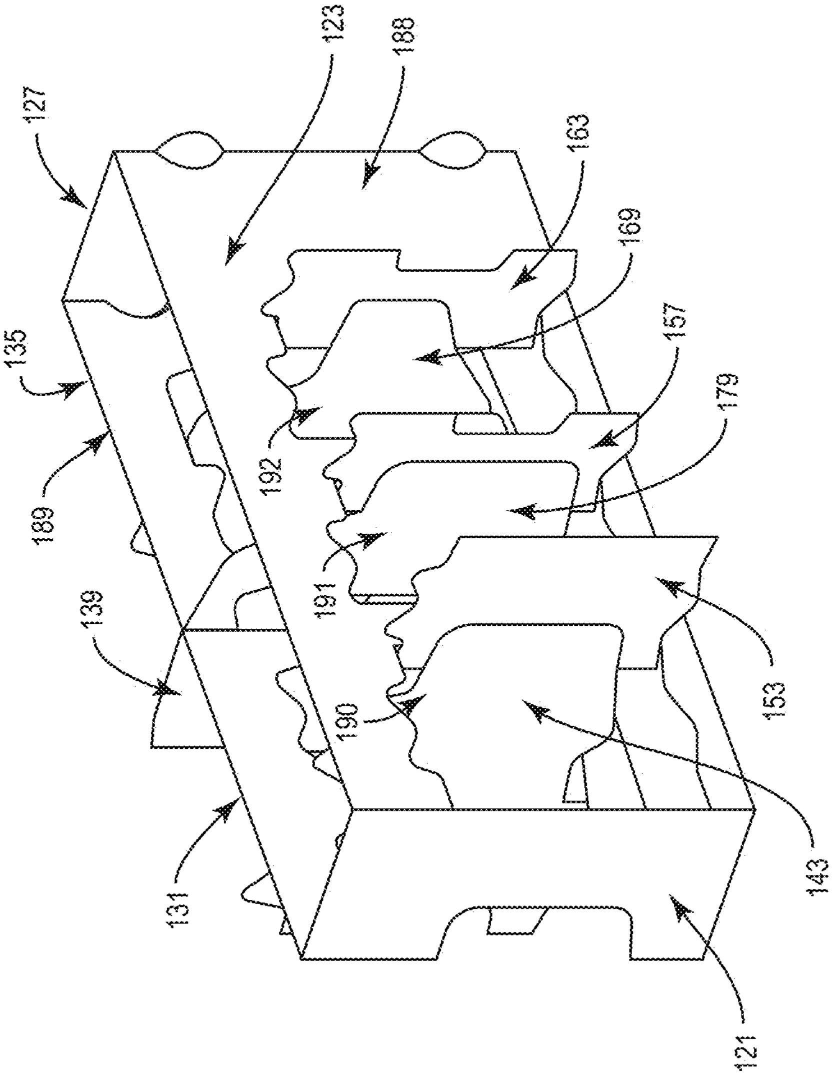
FIG. 11 is a perspective view of a construct formed from the blank of FIG. 10 according to the third exemplary embodiment of the disclosure.
Figure 12:
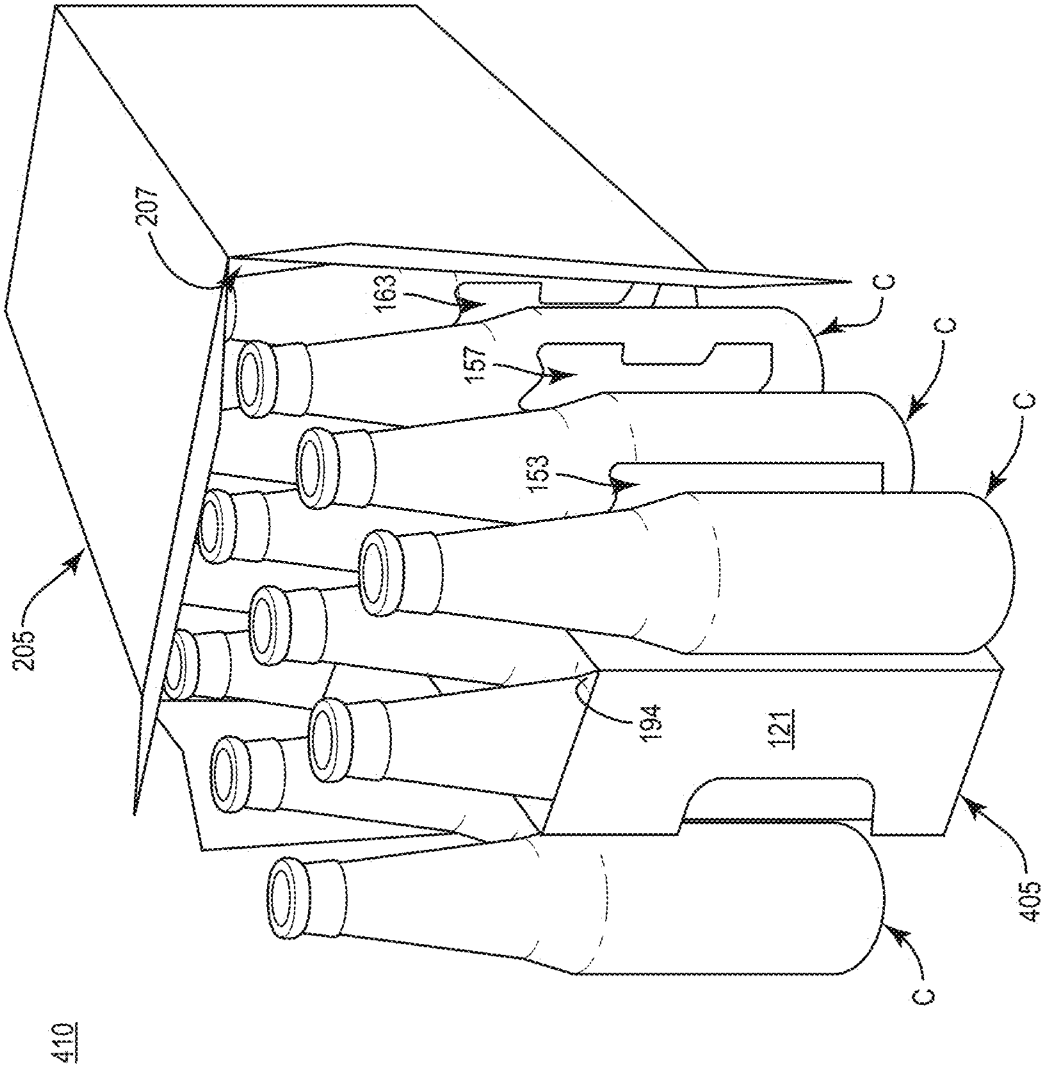
FIG. 12 is a perspective view of the construct of FIG. 11 holding a plurality of containers and at least partially received within a carton formed from the blank of FIG. 2 to form a system according to the third exemplary embodiment of the disclosure.

With additional reference to FIG. 11, the construct 405 can be formed in a manner similar to that described above with respect to the formation of the construct 105 from the blank 103 and the formation of the construct 305 from the blank 303. As shown in FIG. 12, the construct 405 can be at least partially received in the interior 207 of the carton 205 or another container to form a system 410. The construct 405 and the system 410 can provide advantages similar to those described above with respect to the constructs 105, 305 and the systems 110, 310.

Figure 13:
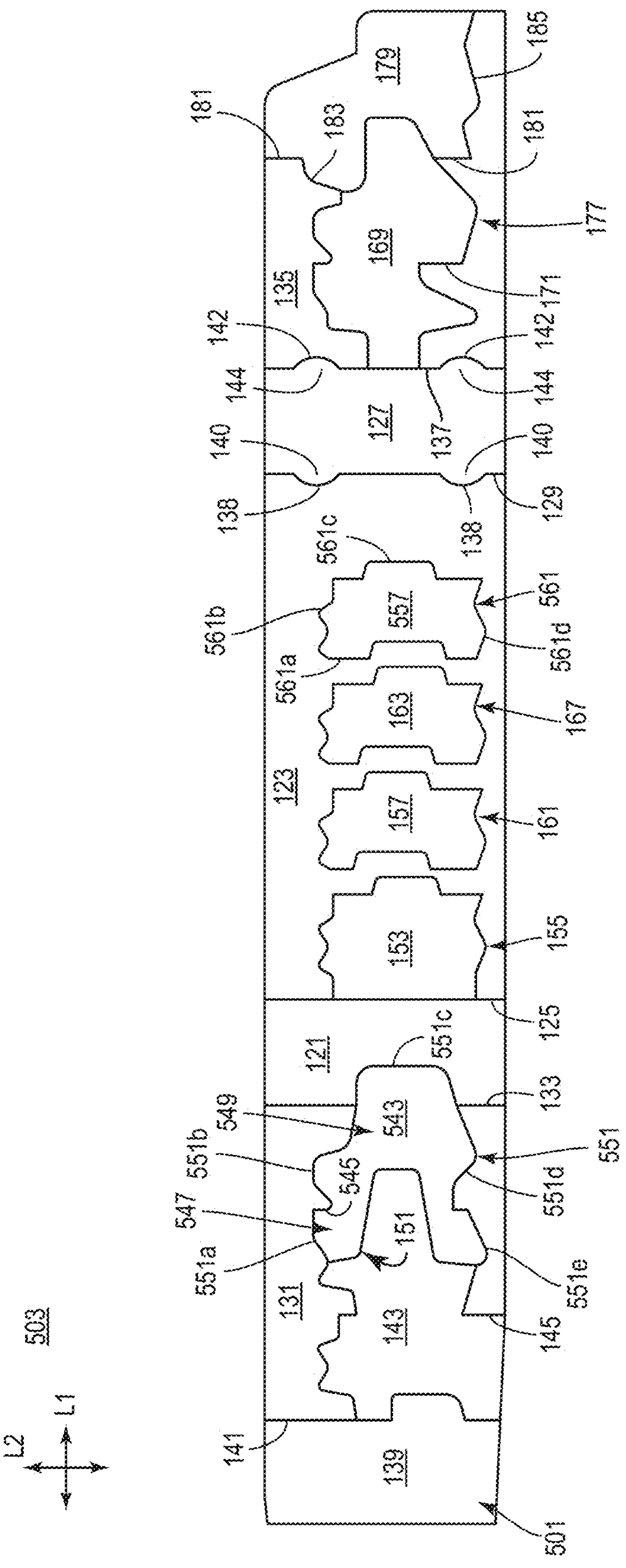
FIG. 13 is a plan view of an exterior surface of a blank for forming a construct according to a fourth exemplary embodiment of the disclosure.

Turning to FIG. 13, an exterior surface 501 of a blank 503 for forming a construct 505 (FIG. 14) according to a fourth exemplary embodiment of the disclosure is illustrated. The blank 503 and construct 505 formed therefrom can have one or more features that are the same or similar to the blanks 103, 303, 403 and constructs 105, 305, 405 described above, and like or similar features are designated with like or similar reference numerals.

As shown, the blank 503 can have the longitudinal axis L1 and the lateral axis L2, and includes the divider panel 139, the side panels 123, 131, 135, the end panels 123, 127, the divider flaps 143, 157, 163, 169, 179, and associated features.

In this regard, the blank 503 can have a configuration generally similar to the blank 403 described above, though having a longer length along the longitudinal axis L1. Furthermore, the blank 503 and construct 505 formed therefrom can include an additional divider flap 557 (broadly, "third divider flap") having a configuration generally similar to the divider flap 163, e.g., at least partially separable from the side panel 123 at a line of weakening 561 that includes a first generally lateral segment 561*a,* a generally longitudinal upper segment 561*b* extending from the segment 561*a,* a second generally lateral segment 561*c* extending from the segment 561*b,* and a generally longitudinal lower segment 561*d* extending from the segment 561*c* to the segment 561*a.*

The blank 503 and construct 505 formed therefrom can also include a divider flap 543 (broadly, "first divider flap") foldably connected to the side panel 131 at a lateral fold line 545 that is interrupted by a portion of the divider flap 143 extending therebetween. As shown, the divider flap 543 can have a first portion 547 and a second portion 549 at least partially interrupting the fold line 133 and the end panel 121.

The first portion 547 of the divider flap 543 can be at least partially separable from the second portion 149 of the divider flap 143 at respective portions of the line of weakening 151. The divider flap 543 can also be at least partially separable from the side panel 131 at a line of weakening 551 having one or more of straight, curved, and angled portions.

The line of weakening 551 can include a first upper generally longitudinal segment 551*a* extending from a portion of the line of weakening 151 to an endpoint of the fold line 545, a second upper generally longitudinal segment 551*b* extending from a portion of the fold line 545 (so as to interrupt the fold line 545) to a generally lateral segment 551*c,* a first lower generally longitudinal segment 551*d* that extends to a portion of the fold line 545 (so as to interrupt the fold line 545), and a second lower generally longitudinal segment 551*e* that extends from an endpoint of the fold line 545 to a portion of the line of weakening 151 associated with the divider flap 143.

Figure 14:
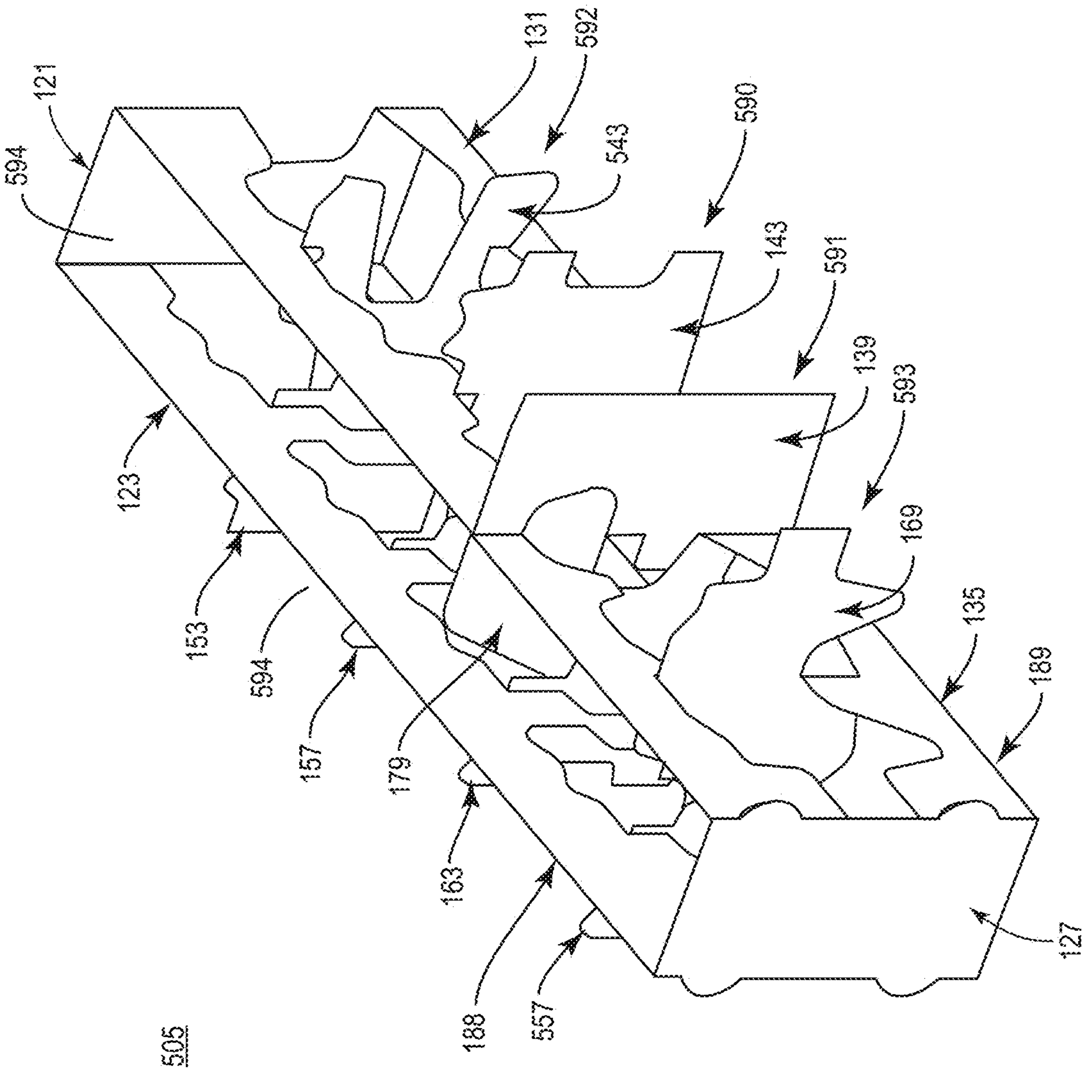
FIG. 14 is a perspective view of a construct formed from the blank of FIG. 13 according to the fourth exemplary embodiment of the disclosure.

Turning to FIG. 14, the construct 505 can be formed in a manner similar to that described above with respect to the constructs 105, 305, 405, with the end panels 121, 127 positioned in spaced and parallel relation, and the side panels 131, 135 positioned in generally coplanar relation and in spaced parallel relation with the side panel 123.

The divider flap 143 can separate from the side panel 131, the divider flaps 153, 157, 163 can separate from the side panel 123, and the divider flaps 169, 179 can separate from the side panel 135, with the divider flap 143 least partially attached to the divider flap 157 and the divider flap 179 at least partially attached to the divider flap 163. The end panel 139 can also be folded at the fold line 141 outwardly from the side panels as described above.

In this regard, and as described above, the side panel 123 forms a divider wall 188 of the construct 505, the side panels 131, 135 together form a divider wall 189 of the construct 505, the divider flaps 143, 157 together form a divider wall 590 of the construct 505, and the divider flaps 179, 163, and divider panel 139 together form a divider wall 591 (broadly, "fourth divider wall" or "second divider wall") of the construct 505.

In addition, the divider flap 543 can be separated from the side panel 131 and the end panel 121 along respective segments of the line of weakening 551, and further from the divider flap 543 along respective segments of the line of weakening 151. The divider flap 153 can be attached to the divider flap 543 and separated from the side panel 123 at respective portions of the line of weakening 155. The divider flap 543 can be folded at the fold line 545 into generally perpendicular relation with the side panel 123 and the side panels 131, 135 such that the divider flaps 543, 153 form an additional divider wall 592 (broadly, "fourth divider wall" or "second divider wall") of the construct 505.

Furthermore, the divider flap 169 can be separated from the side panel 135 at the respective portions of the line of weakening 177 and from the divider flap 179 at the cut 183, and folded at the fold line 171 into generally perpendicular relation with the side panels 123, 131, 135. The divider flap 169 can be attached to the divider flap 557, and such movement of the divider flap 169 can cause the divider flap 557 to separate from the side panel 123 at respective portions of the line of weakening 161 and move into generally perpendicular relation with the side panels 123, 131, 135 such that the divider flaps 169, 557 together form an additional divider wall 593 (broadly, "fourth divider wall" or "second divider wall") of the construct 505, and such that container receiving spaces or compartment spaces 594 can be formed between respective portions of the divider walls 188, 189, 590, 591, 592, 593 for receiving respective containers C with the advantages described above with respect to the constructs 105, 305, 405.

Figure 15:
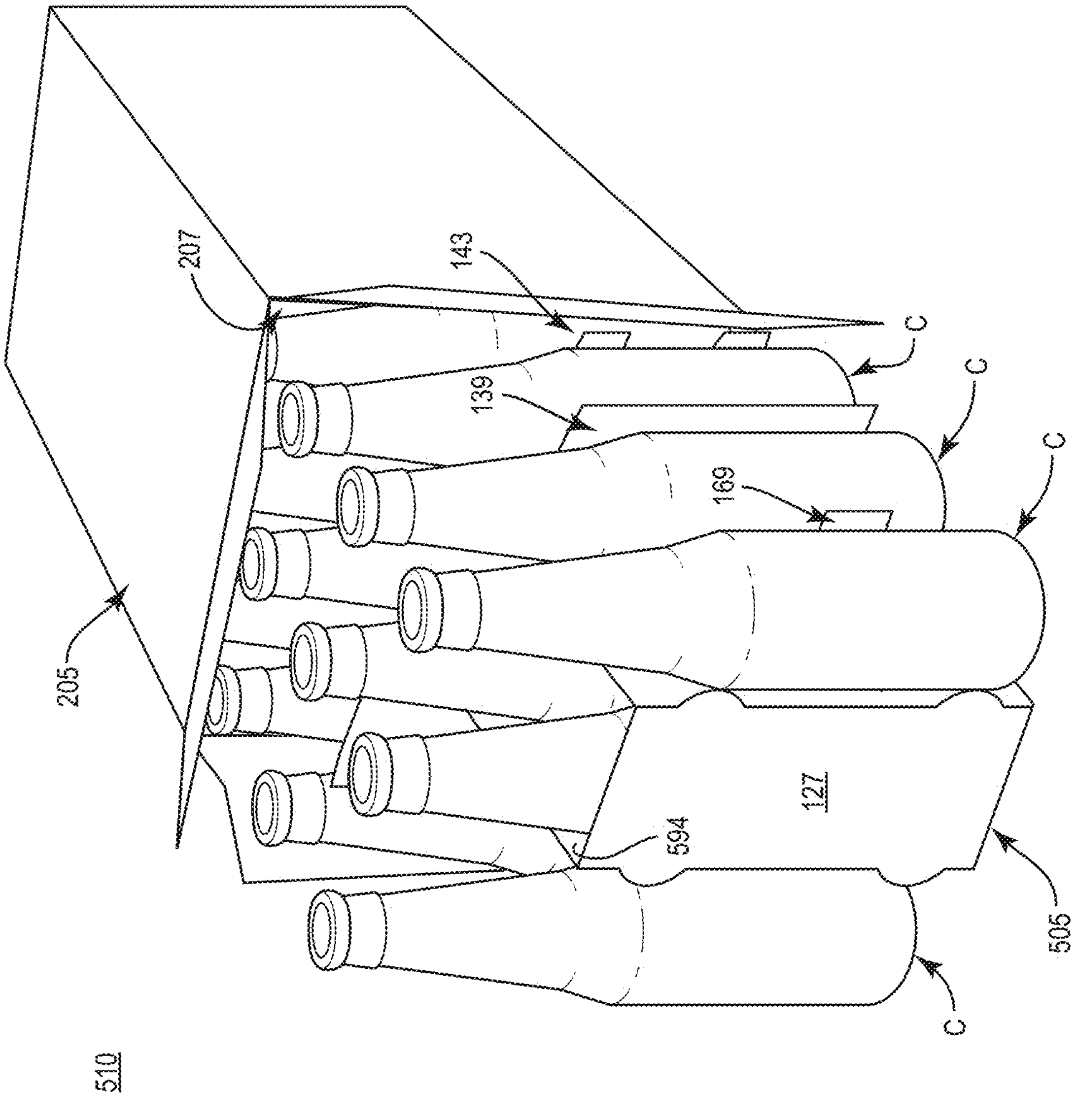
FIG. 15 is a perspective view of the construct of FIG. 14 holding a plurality of containers and at least partially received within a carton formed from the blank of FIG. 2 to form a system according to the fourth exemplary embodiment of the disclosure.

As shown in FIG. 15, the construct 505 having one or more of the containers C at least partially received in a respective compartment space 594 can be loaded into the interior 207 of a carton 205 to form a system with the advantages associated with the systems described above. In this regard, compartment spaces 594 can be defined between respective divider walls of the construct 505 and respective panels of the carton 205.

Figure 16:
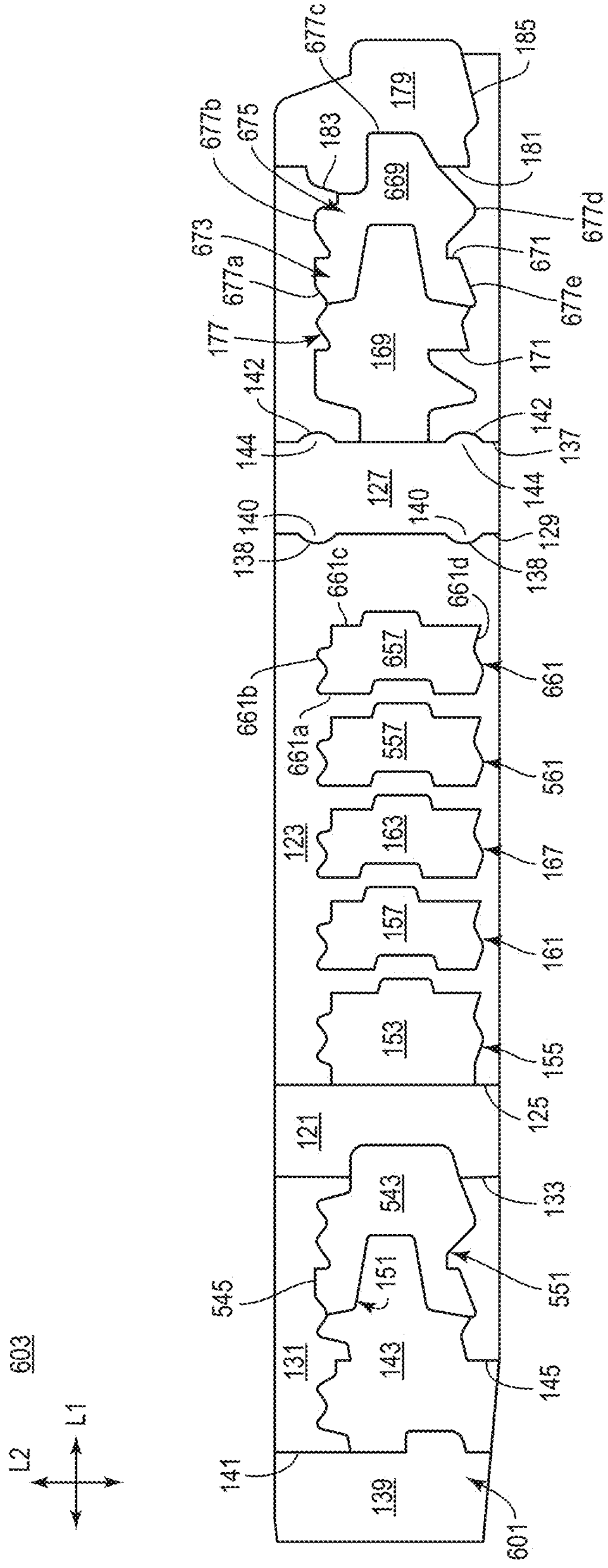
FIG. 16 is a plan view of an exterior surface of a blank for forming a construct according to a fifth exemplary embodiment of the disclosure.

Turning to FIG. 16, an exterior surface 601 of a blank 603 for forming a construct 605 (FIG. 17) according to a fifth exemplary embodiment of the disclosure is illustrated. The blank 603 and construct 605 formed therefrom can have one or more features that are the same or similar to the blanks 103, 303, 403, 503 and constructs 105, 305, 405, 505 described above, and like or similar features are designated with like or similar reference numerals.

As shown, the blank 603 can have the longitudinal axis L1 and the lateral axis L2, and includes the divider panel 139, the side panels 123, 131, 135, the end panels 123, 127, the divider flaps 143, 157, 163, 169, 179, 543, 557, and associated features.

In this regard, the blank 603 can have a configuration generally similar to the blank 503 described above, though having a longer length along the longitudinal axis L1. Furthermore, the blank 603 and construct 605 formed therefrom can include an additional divider flap 657 (broadly, "third divider flap") having a configuration generally similar to the divider flap 157, e.g., at least partially separable from the side panel 123 at a line of weakening 661 that includes a first generally lateral segment 661*a*, a generally longitudinal upper segment 661*b* extending from the segment 661*a*, a second generally lateral segment 661*c* extending from the segment 661*b*, and a generally longitudinal lower segment 661*d* extending from the segment 661*c* to the segment 661*a*.

The blank 603 and construct 605 formed therefrom can also include a divider flap 669 (broadly, "fourth divider flap") positioned between the divider flaps 169, 179 and having a configuration generally similar to that of the divider flap 169. In this regard, the divider flap 669 can be foldably connected to the side panel 135 at a fold line 671 at least partially interrupted by respective portions of the divider flap 169. The divider flap 669 can have a first portion 673 and a second portion 675 at least partially bisected by the fold line 671 and at least partially separable from the divider flap 169 along respective portions of the line of weakening 177 that intersect the divider flap 669.

The divider flap 669 can also be at least partially separable from the side panel 135 at a line of weakening 677 that includes a first upper generally longitudinal segment 677*a* extending from respective portions of the line of weakening 177 to an endpoint of the fold line 671, a second upper generally longitudinal segment 677*b* extending from a portion of the fold line 671 (so as to interrupt the fold line 671) to the cut 183, a generally lateral segment 677*c* extending from the intersection of the segment 677*b* and the cut 183, a first lower generally longitudinal segment 677*d* extending from the segment 677*c* to an endpoint of the fold line 671, and a second lower generally longitudinal segment 677*e* extending from a portion of the fold line 671 (so as to interrupt the fold line 671) to a respective portion of the line of weakening 177.

Figure 17:
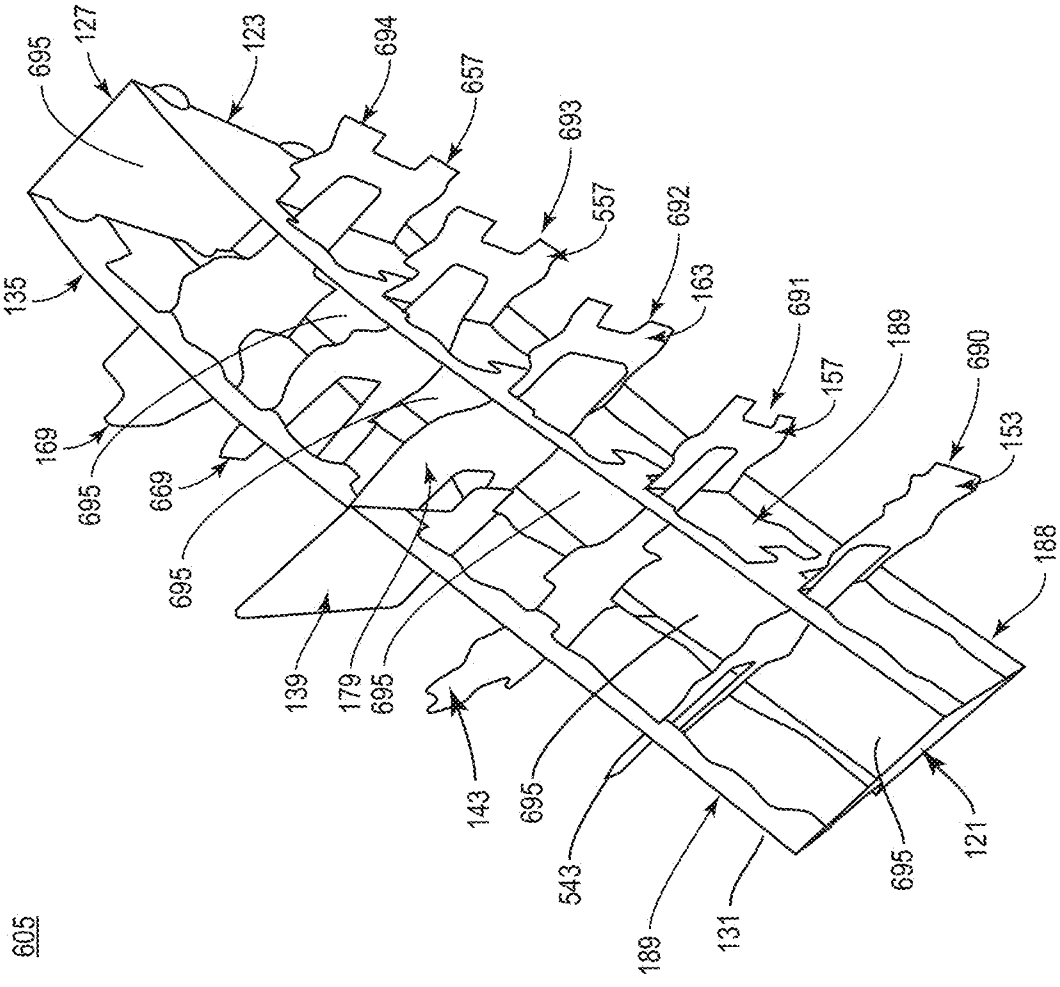
FIG. 17 is a perspective view of a construct formed from the blank of FIG. 16 according to the fifth exemplary embodiment of the disclosure.

Turning to FIG. 17, the construct 605 can be formed in a manner similar to that described above with respect to the constructs 105, 305, 405, 505 with the end panels 121, 127 positioned in spaced and parallel relation, and the side panels 131, 135 positioned in generally coplanar relation and in spaced parallel relation with the side panel 123.

The divider flap 143 can separate from the side panel 131 at respective portions of the line of weakening 151, the divider flap 543 can separate from the side panel 131 and the end panel 121 at respective portions of the line of weakening 551 and further from the divider flap 143 at respective portions of the line of weakening 151, the divider flaps 153, 157, 163, 557 can separate from the side panel 123 at respective portions of the respective lines of weakening 155, 161, 167, 561, and the divider flaps 169, 179 can separate from the side panel 135 at respective portions of the lines of weakening 177 and cuts 183, 185.

The divider flap 143 can be at least partially attached to the divider flap 157, the divider flap 543 can be at least partially attached to the divider flap 153, and the divider flap 179 can be at least partially attached to the divider flap 163. The end panel 139 can also be folded at the fold line 141 outwardly from the side panels as described above.

Further, the divider flap 669 can separate from the end panel 135 at respective portions of the line of weakening 677 and from the divider flaps 168, 179 at respective portions of the respective lines of weakening 177 and cut 183 and can fold at the fold line 671 into generally perpendicular relation with the side panels 123, 131, 135. The divider flap 557 can be attached to the divider flap 669 and separate from the side panel 123 at respective portions of the line of weakening 561 so as to move into generally perpendicular relation with the side panels 123, 131, 135.

In addition, the divider flap 169 can be attached to the divider flap 657 such that folding of the divider flap 169 at the fold line 171 into generally perpendicular relation with the side panels 123, 131, 135 can cause the divider flap 657 to separate from the side panel 123 at respective portions of the line of weakening 661 so as to move into generally perpendicular relation with the side panels 123, 131, 135.

In this regard, and as described above, the side panel 123 forms a divider wall 188 of the construct 605 and the side panels 131, 135 together form a divider wall 189 of the construct 605. The attached divider panels 543, 153 can form a divider wall 690 (broadly, "first divider wall") of the construct 605, the attached divider panels 143, 157 can form a divider wall 691 (broadly, "first divider wall") of the construct 605, the attached divider panels 179, 163 and divider panel 139 can together form a divider wall 692 of the construct 605, the attached divider panels 669, 557 can together form a divider wall 693 of the construct 605, and the attached divider panels 169, 657 can together form a divider wall 694 of the construct 605, and such that respective container receiving spaces or compartment spaces 695 can be formed between respective portions of the divider walls 188, 189, 690, 691, 692, 693, 694.

Figure 18:
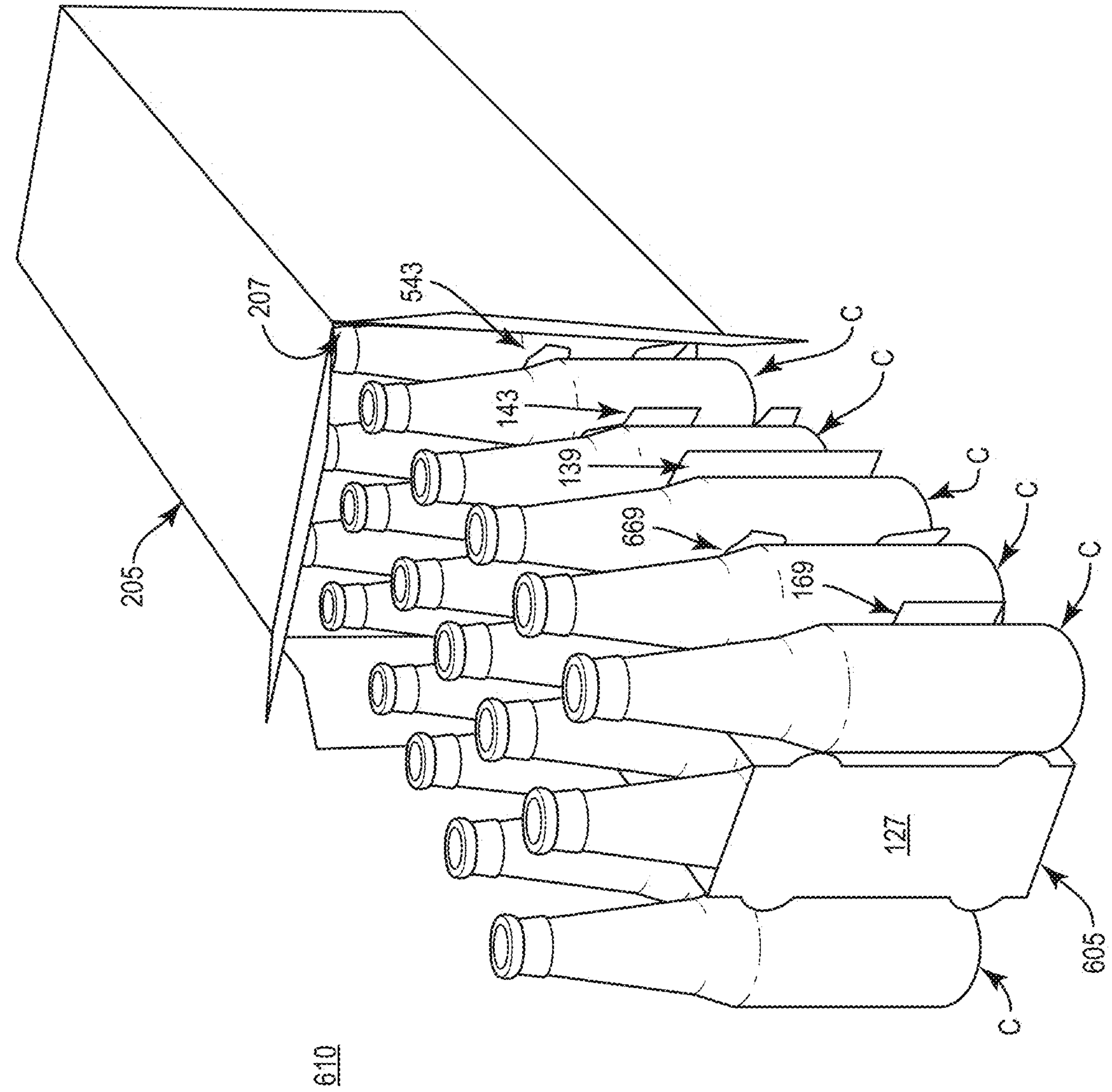
FIG. 18 is a perspective view of the construct of FIG. 17 holding a plurality of containers and at least partially received within a carton formed from the blank of FIG. 2 to form a system according to the fifth exemplary embodiment of the disclosure.

Turning to FIG. 18, the construct 605 having one or more of the containers C at least partially received in a respective compartment space 695 can be loaded into the interior 207 of a carton 205 to form a system with the advantages associated with the systems described above. In this regard, compartment spaces 695 can be defined between respective divider walls of the construct 605 and respective panels of the carton 205.

Figure 19:
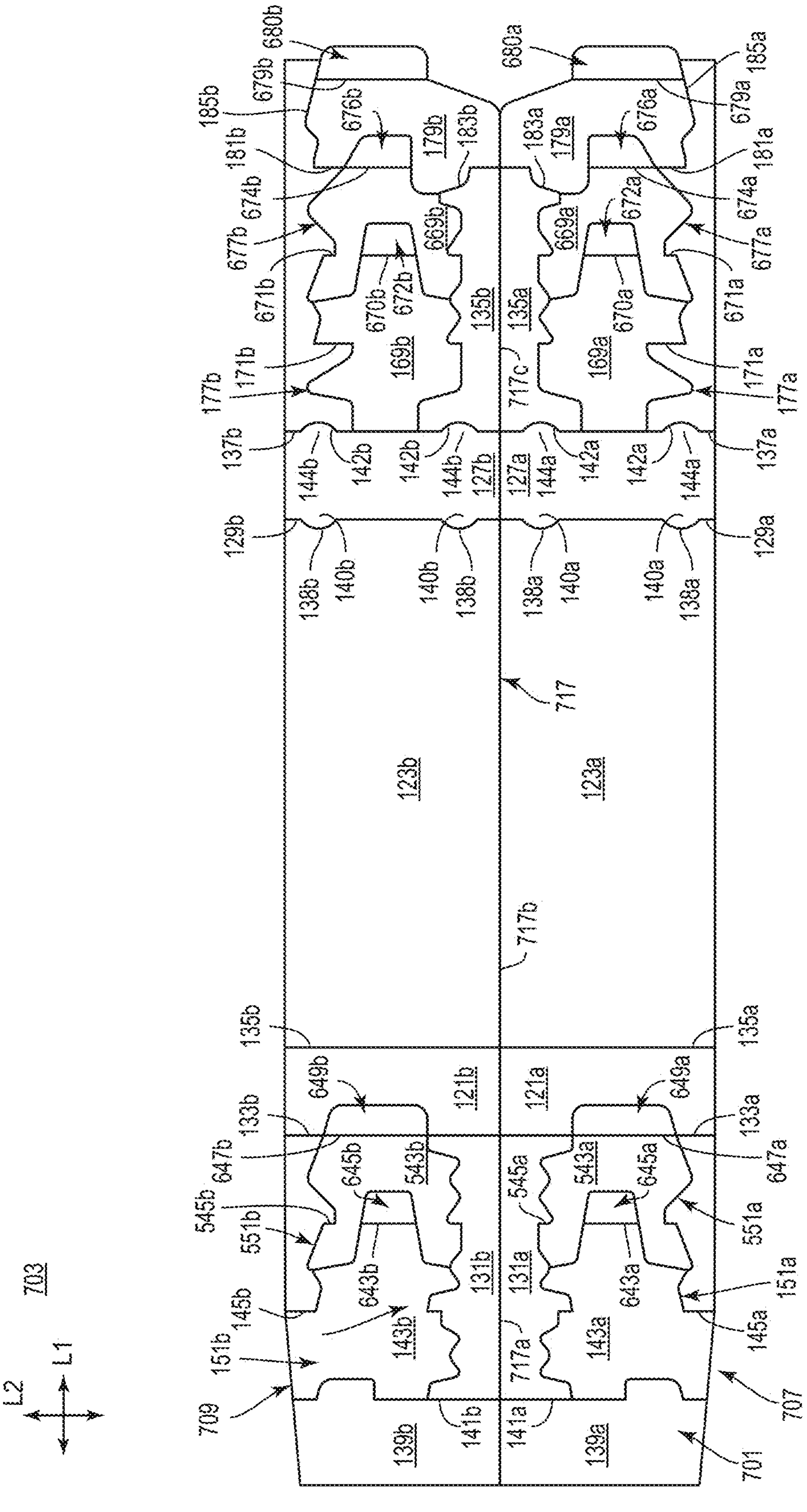
FIG. 19 is a plan view of an exterior surface of a blank for forming a construct according to a sixth exemplary embodiment of the disclosure.

Turning to FIG. 19, a blank 703 for forming a construct 705 (FIG. 20) according to a sixth exemplary embodiment of the disclosure is illustrated. The blank 703 and construct 705 formed therefrom can have one or more features that are the same or similar to the blanks 103, 303, 403, 503, 603 and constructs 105, 305, 405, 505, 605 described above, and like or similar features are designated with like or similar reference numerals.

As shown, the blank 703 can have the longitudinal axis L1 and the lateral axis L2, a front portion 707 for forming a front portion 713 of the construct 705, and a back portion 709 for forming a back portion 715 of the construct 705. The front portion 707 of the blank 703/front portion 713 of the construct 705 is at least partially and at least partially separably connected to the back portion 709 of the blank 703/back portion 715 of the construct 715 at a line of weakening 717 that includes a first cut portion 717*a,* a central fold line portion 717*b*, and a second cut portion 717*c*.

The blank 703 and the construct 705 formed therefrom can include a divider panel 139*a,* side panels 131*a,* 123*a,* 135*a,* end panels 121*a,* 127*a,* divider flaps 143*a* (broadly, "first divider flap"), 543*a* (broadly, "first divider flap"), 169*a* (broadly, "second divider flap"), 669*a* (broadly, "second divider flap"), and 179*a* (broadly, "second divider flap") and associated features generally similar to the respective divider panel 139, side panels 131, 123, 135, end panels 121, 127, divider flaps 143, 543, 169, 669, and 179 described above. In this regard, the features associated with the panels 121*a,* 123*a,* 127*a,* 131*a,* 135*a,* 139*a* and flaps 143*a,* 169*a,* 179*a,* 543*a,* 669*a* are the same as those associated with the panels 121, 123, 127, 131, 135, 139 and flaps 143, 169, 179, 543, 669 described above, and provided with an "a" suffix.

However, a lateral end portion of the divider flap 143*a* can be bisected by a fold line 643*a* to form an attachment flap 645*a* foldably connected to the remainder of the divider flap 143*a* at the fold line 643*a.* Further, a lateral end portion of the divider flap 543*a* can be bisected by a fold line 647*a* to form an attachment flap 649*a.*

Similarly, a lateral end portion of the divider flap 169*a* can be bisected by a fold line 670*a* to form an attachment flap 672*a* foldably connected to the remainder of the divider flap 169*a* at the fold line 670*a,* a lateral end portion of the divider flap 669*a* can be bisected by a fold line 674*a* to form an attachment flap 676*a* foldably connected to the remainder of the divider flap 669*a* at the fold line 670*a,* and a lateral end portion of the divider flap 179*a* can be bisected by a fold line 679*a* to form an attachment flap 680*a* foldably connected to the remainder of the divider flap 179*a* at the fold line 679*a.*

In the illustrated embodiment, the back portion 709 of the blank 703 includes a divider panel 139*b,* side panels 131*b,* 123*b,* 135*b,* end panels 121*b,* 127*b,* divider flaps 143*b* (broadly, "first divider flap" or "second divider flap"), 543*b* (broadly, "first divider flap" or "second divider flap"), 169*b* (broadly, "second divider flap"), 669*b* (broadly, "second divider flap"), and 179*b* (broadly, "second divider flap") and associated features that are generally a mirror-image of the corresponding panels of the front portion 707 of the blank 703. Corresponding components (e.g., panels, flaps, fold lines, cuts, etc.) have been designated by corresponding reference numbers that differ by the "a" or "b" suffix, with the "a" components corresponding to the front portion 707 of the blank 703 and the "b" components corresponding to the back portion 709 of the blank 703.

Figure 20:
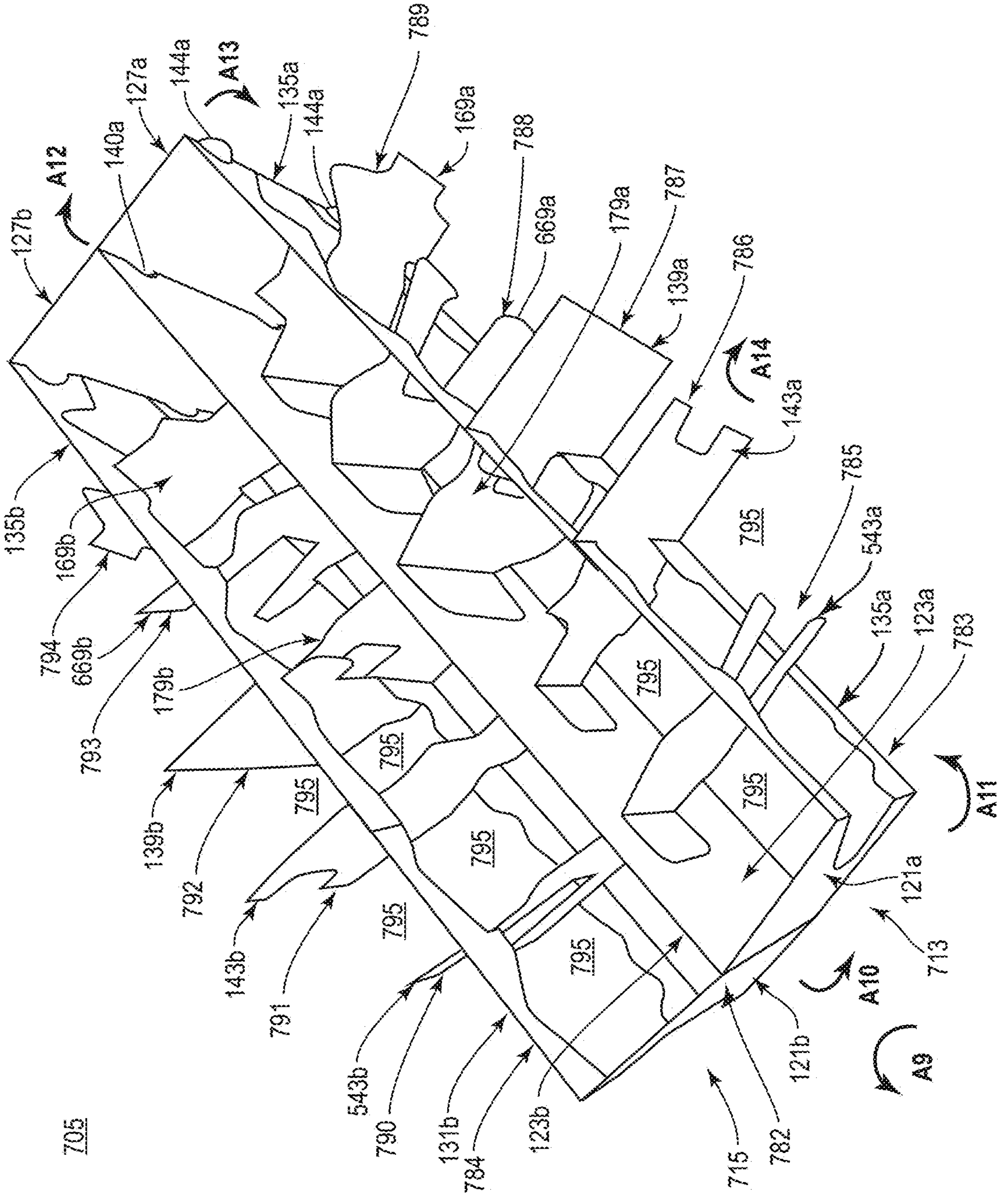
FIG. 20 is a perspective view of a construct formed from the blank of FIG. 19 according to the sixth exemplary embodiment of the disclosure.

With additional reference to FIG. 20, according to one embodiment, the blank 703 can be folded about the line of weakening 713 in the direction of the arrow A9 such that the front portion 707 of the blank 703 is positioned in at least partial face-to-face contact with the back portion 709 of the blank 703.

The front end panel 121*a* can be folded at the fold line 125*a* in the direction of the arrow A10 into generally perpendicular relation with the front side panel 123*a,* the side panel 131*a* can be folded at the fold line 133*a* in the direction of the arrow A11 into generally perpendicular relation with the front end panel 121*a* and into generally parallel and spaced relation with the front side panel 123*a,* the end panel 127*a* can be folded at the fold line 129*a* in the direction of the arrow A12 into generally perpendicular relation with the front side panel 123*a,* the front side panel 135*a* can be folded at the fold line 137*a* in the direction of the arrow A13 into generally perpendicular relation with the end panel 127*a* and into generally parallel and spaced relation with the front side panel 123*a,* and the front divider panel 139*a* can be folded at the fold line 141*a* in the direction of the arrow A14 into generally perpendicular relation with the front side panels 131*a,* 135*a.* In the illustrated embodiment, the divider panel 139*a* can be attached to the divider flap 179*a.*

The divider flap 143*a* and attachment flap 645*a* can be separated from the side panel 131*a* and the divider flap 543*a* at respective portions of the line of weakening 151*a* and folded at the fold line 145*a* into generally perpendicular relation with the side panels 123*a,* 131*a,* 135*a.* The attachment flap 645*a* can be folded at the fold line 645*a* and positioned in at least partial face-to-face contact with the side panel 123*a*.

Similarly, the divider flap 543*a* and attachment flap 649*a* can be separated from the side panel 131*a* and the end panel 121*a* at respective portions of the line of weakening 551*a* and folded at the fold line 545*a* into generally perpendicular relation with the side panels 123*a*, 131*a*, 135*a*. The attachment flap 649*a* can be folded at the fold line 647*a* and positioned in at least partial face-to-face contact with the side panel 123*a*.

Similarly, the divider flap 543*a* and attachment flap 649*a* can be separated from the side panel 131*a* and the end panel 121*a* at respective portions of the line of weakening 551*a* and folded at the fold line 545*a* into generally perpendicular relation with the side panels 123*a*, 131*a*, 135*a*. The attachment flap 649*a* can be folded at the fold line 647*a* and positioned in at least partial face-to-face contact with the side panel 123*a*.

The divider flap 169*a* and attachment flap 672*a* can be separated from the side panel 135*a* at respective portions of the line of weakening 177*a* and folded at the fold line 171*a* into generally perpendicular relation with the side panels 123*a*, 131*a*, 135*a*. The attachment flap 672*a* can be folded at the fold line 670*a* and positioned in at least partial face-to-face contact with the side panel 123*a*.

The divider flap 669*a* and attachment flap 676*a* can be separated from the side panel 135*a* at respective portions of the line of weakening 677*a* and folded at the fold line 671*a* into generally perpendicular relation with the side panels 123*a*, 131*a*, 135*a*. The attachment flap 676*a* can be folded at the fold line 674*a* and positioned in at least partial face-to-face contact with the side panel 123*a*.

The divider flap 179*a* and attachment flap 680*a* can be separated from the side panel 135*a* at the respective cuts 183*a*, 185*a* and folded at the fold line 181*a* into generally perpendicular relation with the side panels 123*a*, 131*a*, 135*a* to form a divider wall of the construct 705, as described further below. The attachment flap 680*a* can be folded at the fold line 679*a* and positioned in at least partial face-to-face contact with the side panel 123*a* to form a divider wall of the construct, as described further below.

The respective panels and divider flaps of the back portion 715 of the construct 705 can be arranged in a fashion similar to that described above with respect to the front portion 713 of the construct 705 to form the back portion 715 of the construct 705.

Figure 21:
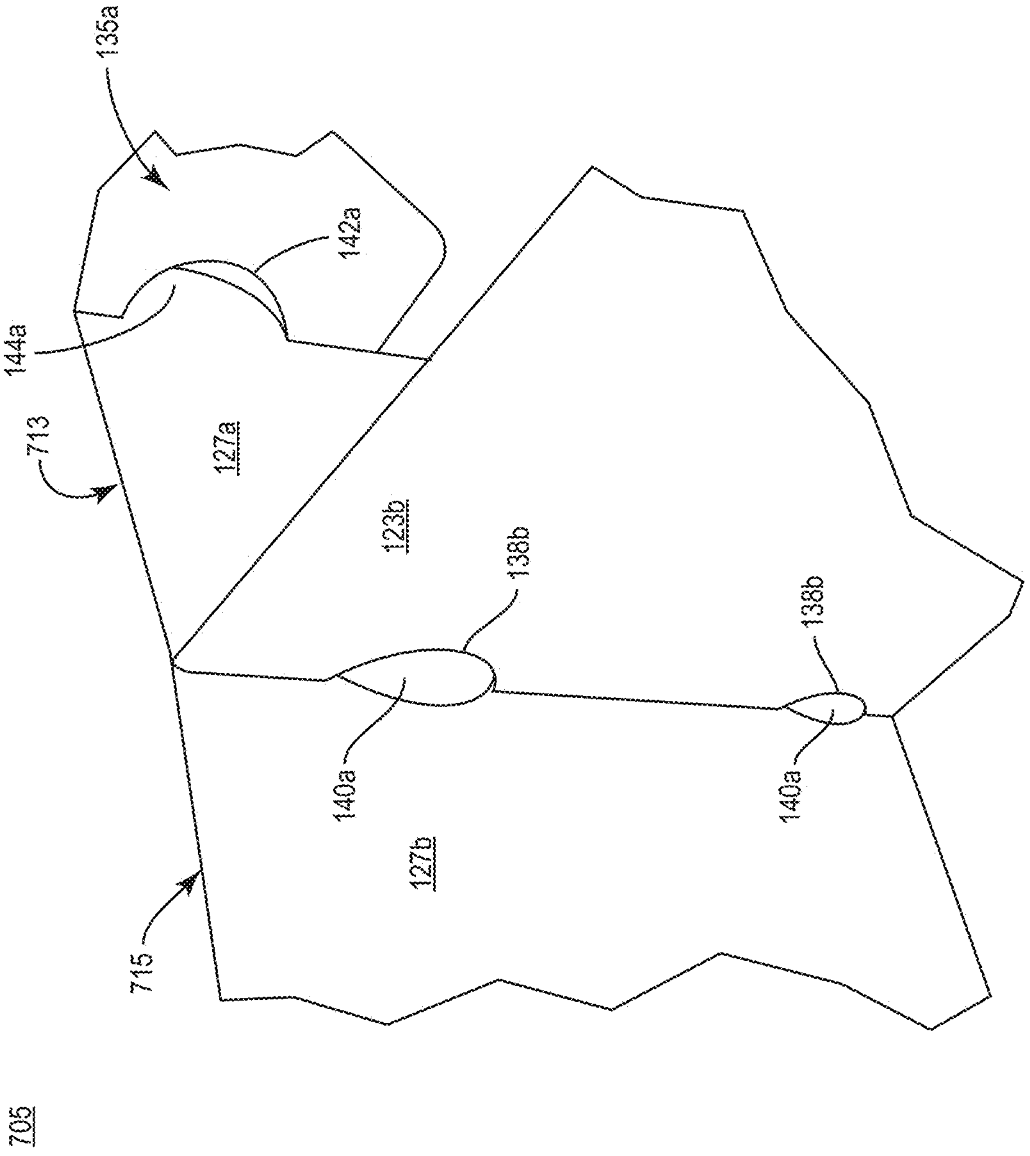
FIG. 21 is an enlarged view of a portion of the construct of FIG. 20.

As best shown in FIG. 21, the arrangement of the end panels 127*a*, 127*b* is such that the respective tabs 140*a*, 142*a* can be separated from the respective side panels 123*a*, 135*a* along the respective cuts 138*a*, 142*a* and such that the respective tabs 140*b*, 142*b* can be separated from the respective side panels 123*b*, 135*b* along the respective cuts 138*b*, 142*b*. The position of the tabs 140*a*, 140*b* adjacent the side panels 123*a*, 123*b* is such that the tabs 140*a*, 140*b* can be positioned in an at least partially overlapping relation, with the respective tabs 140*a* at least partially inserted through openings formed by the respective cuts 138*b* associated with the tabs 140*b*, and with the tabs 140*b* at least partially inserted through openings formed by the respective cuts 138*a* associated with the tabs 140*a*. Such an arrangement can provide stiffness to the construct 705 and/or an interfering arrangement that maintains the erected configuration of the construct 705 and resists collapse and/or unwanted deformation of the construct 705. In this regard, at least the tabs 140*a*, 140*b* and associated cuts 138*a*, 138*b* can be locking features of the blank 703/construct 705 formed therefrom.

In the aforementioned arrangement of the construct 705, the side panels 123*a*, 123*b* can together form a divider wall 782 (broadly, "second divider wall") of the construct 705, the side panels 131*a*, 135*a* can together form a divider wall 783 (broadly, "third divider wall") of the construct 705, the side panels 131*b*, 135*b* can together form a divider wall 784 (broadly, "third divider wall") of the construct 705, the divider flap 543*a* can form a divider wall 785 of the construct 705, the divider flap 143*a* can form a divider wall 786 of the construct 705, the divider flap 179*a* and divider panel 139 can together form a divider wall 787 of the construct 705, the divider flap 669*a* can form a divider wall 788 (broadly, "fourth divider wall" or "second divider wall") of the construct 705, the divider flap 169*a* can form a divider wall 789 (broadly, "fourth divider wall" or "second divider wall") of the construct 705, the divider flap 543*b* can form a divider wall 790 of the construct 705, the divider flap 143*b* can form a divider wall 791 of the construct 705, the divider flap 179*b* can form a divider wall 792 of the construct 705, the divider flap 669*b* can form a divider wall 793 of the construct 705, and the divider flap 169*b* can form a divider wall 794 of the construct 705.

Accordingly, compartment spaces or container receiving spaces 795 can be formed between and adjacent respective portions of the divider walls 782, 783, 784, 785, 786, 787, 788, 789, 790, 791, 792, 793 for receiving respective containers C with the advantages described above with respect to the constructs 105, 305, 405, 505, 605.

Figure 22:
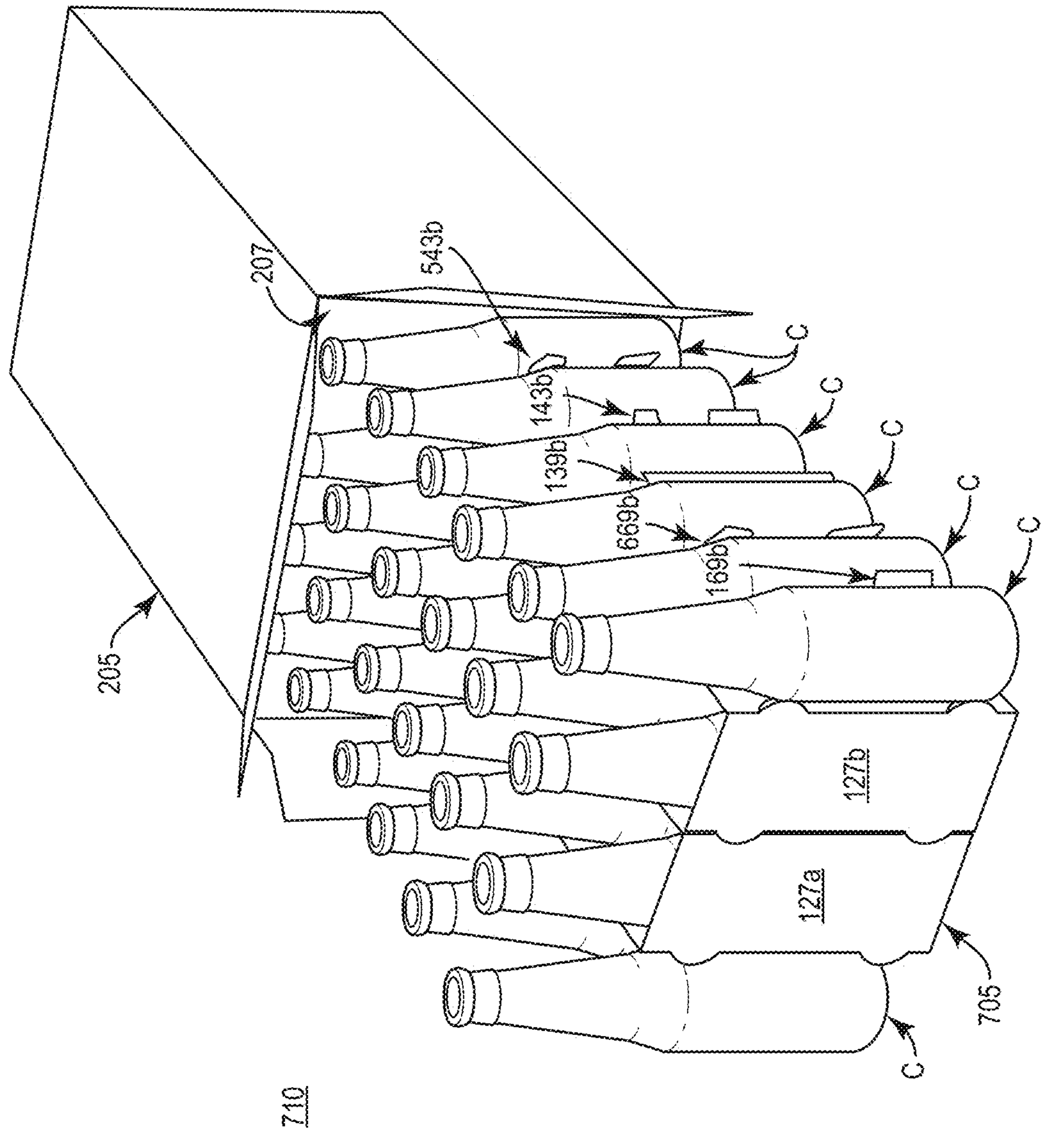
FIG. 22 is a perspective view of the construct of FIG. 20 holding a plurality of containers and at least partially received within a carton formed from the blank of FIG. 2 to form a system according to the sixth exemplary embodiment of the disclosure.

As shown in FIG. 22, the construct 705 having one or more of the containers C at least partially received in a respective compartment space 795 and the construct 705 can be loaded into the interior 207 of a carton 205 to form a system with the advantages associated with the systems described above. In this regard, compartment spaces 795 can be defined between respective divider walls of the construct 705 and respective panels of the carton 205.

Figure 23:
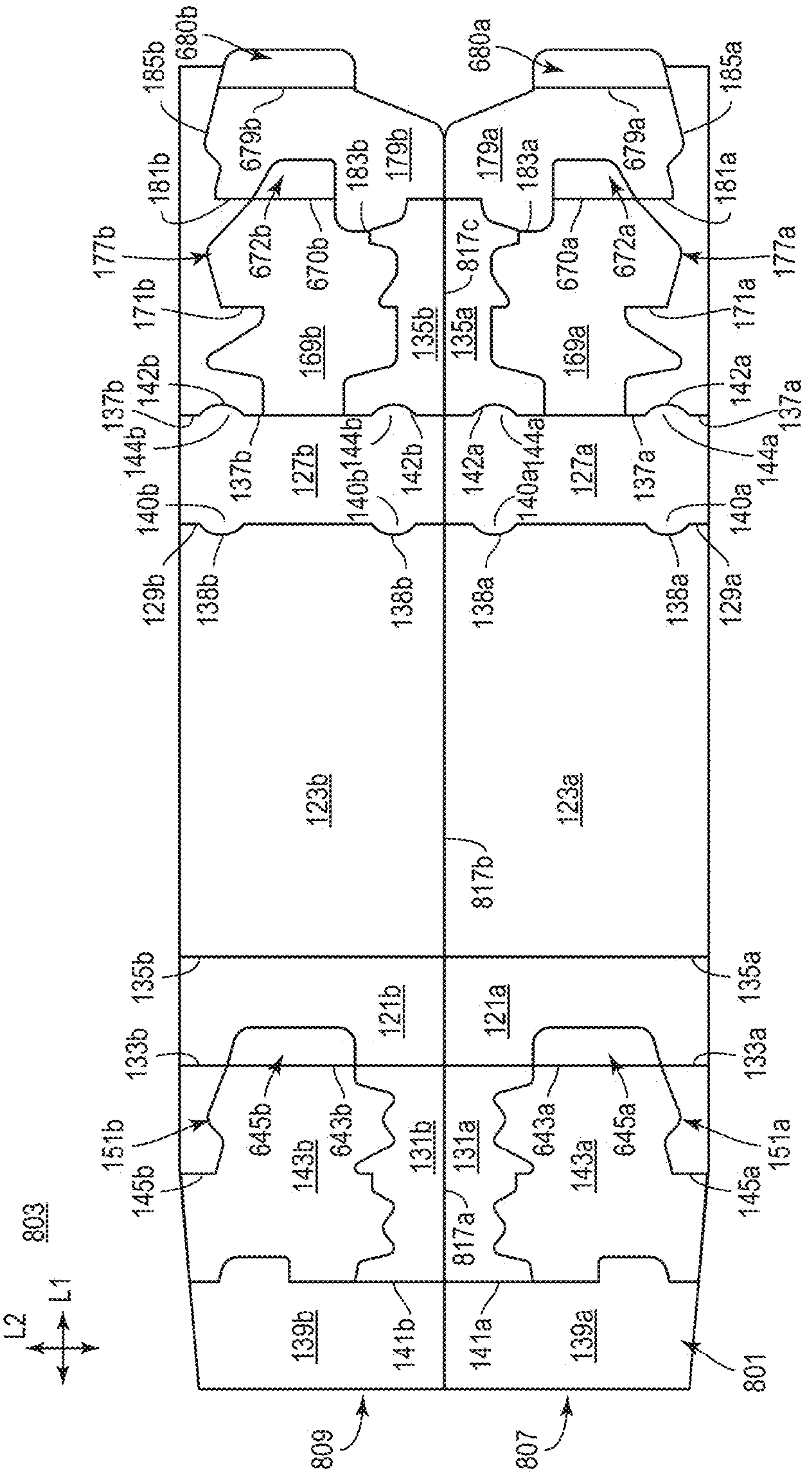
FIG. 23 is a plan view of an exterior surface of a blank for forming a construct according to a seventh exemplary embodiment of the disclosure.
Figure 24:
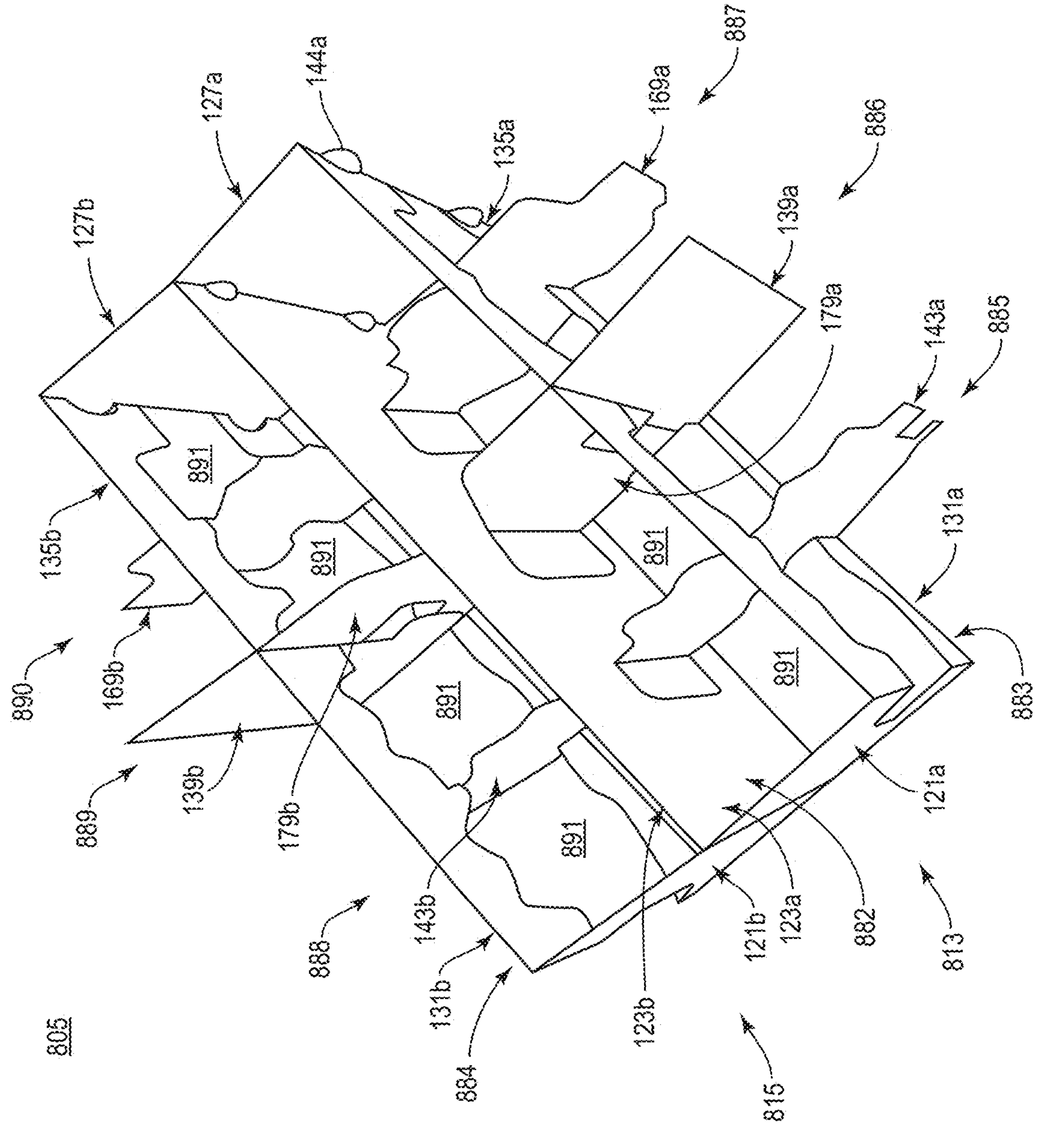
FIG. 24 is a perspective view of a construct formed from the blank of FIG. 23 according to the seventh exemplary embodiment of the disclosure.
Figure 25:
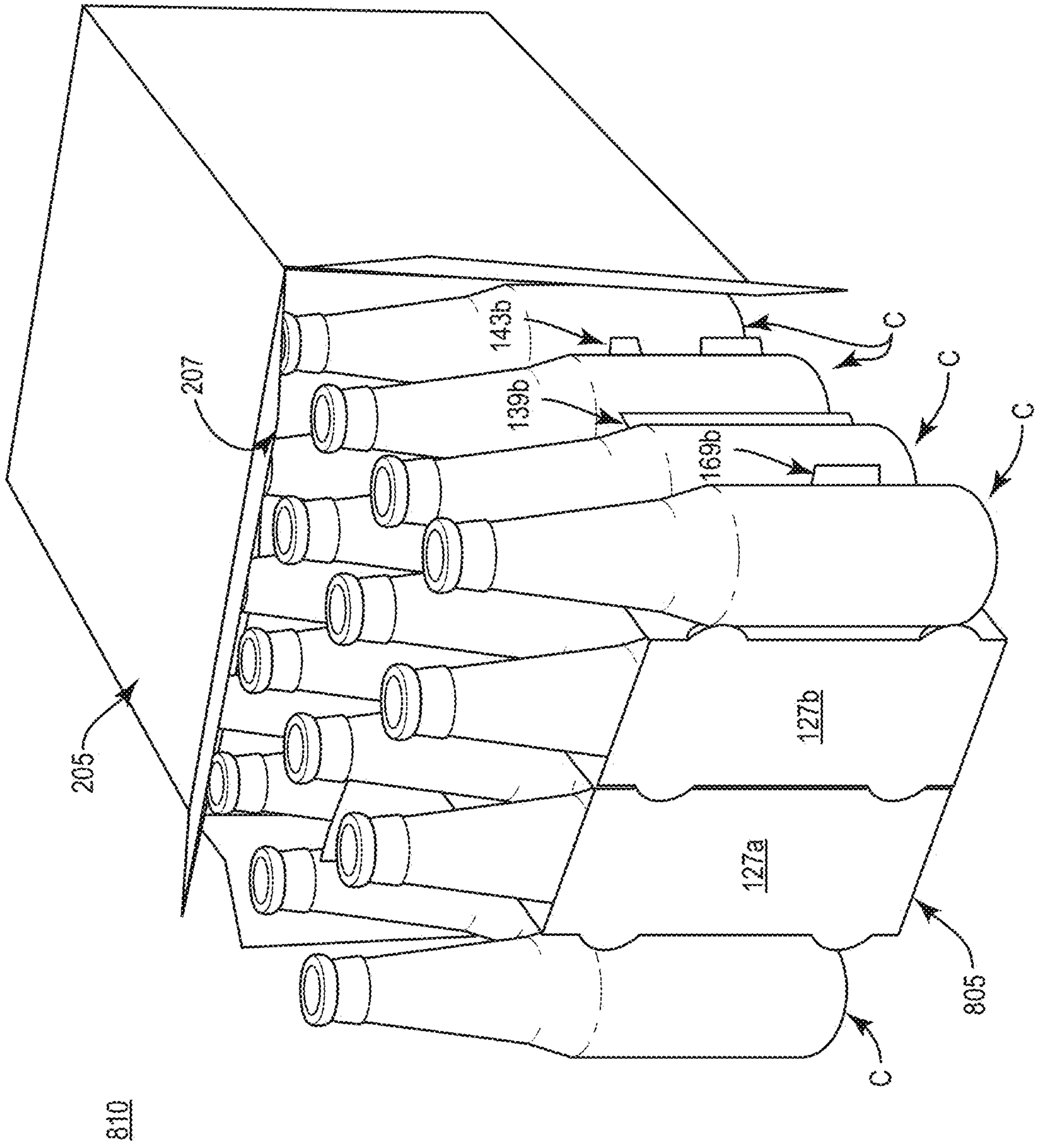
FIG. 25 is a perspective view of the construct of FIG. 24 holding a plurality of containers and at least partially received within a carton formed from the blank of FIG. 2 to form a system according to the seventh exemplary embodiment of the disclosure.

Turning to FIG. 23, a blank 803 for forming a construct 805 (FIG. 24) according to a seventh exemplary embodiment of the disclosure is illustrated. The blank 803 and construct 805 formed therefrom can have one or more features that are the same or similar to the blanks 103, 303, 403, 503, 603, 703 and constructs 105, 305, 405, 505, 605, 705 described above, and like or similar features are designated with like or similar reference numerals.

As shown, the blank 803 can have the longitudinal axis L1 and the lateral axis L2, a front portion 807 for forming a front portion 813 of the construct 805, and a back portion 809 for forming a back portion 815 of the construct 805. The front portion 807 of the blank 803/front portion 813 of the construct 805 is at least partially and at least partially separably connected to the back portion 809 of the blank 803/back portion 815 of the construct 815 at a line of weakening 817 that includes a first cut portion 817*a*, a central fold line portion 817*b*, and a second cut portion 817*c*.

The blank 803 and the construct 805 formed therefrom can include the divider panels 139*a*, 139*b*, the side panels 131*a*, 131*b*, 123*a*, 123*b*, 135*a*, 135*b*, the end panels 121*a*, 121*b*, 127*a*, 127*b*, the divider flaps 143*a*, 143*b*, 543*a*, 543*b*, 169*a*, 169*b*, 669*a*, 669*b*, 179*a*, and 179*b* and associated features.

In this regard, the blank 803 and construct 805 therefrom can have a configuration generally similar to that described above with respect to the blank 703 and the construct 705, except that the blank 803/construct 805 can have a generally shorter length in the longitudinal direction L1.

Furthermore, and as shown, the blank 803 and construct 805 formed therefrom can be devoid of the divider flap 543*a*, 543*b*, 669*a*, 669*b*, and associated features.

Figure 29:
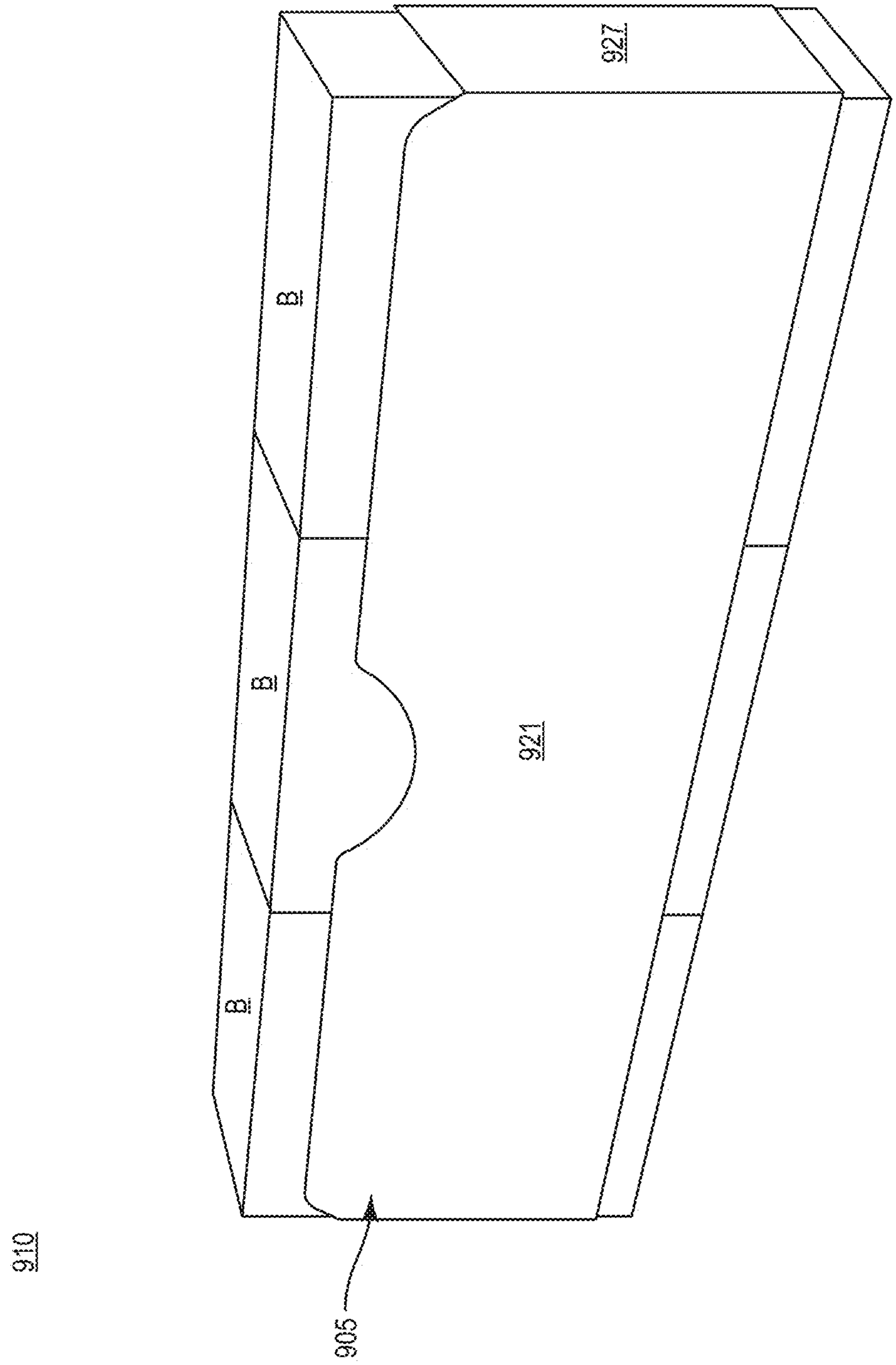
FIG. 29 is a perspective view of a system including a construct formed from the blank of FIG. 26 holding a plurality of containers according to the eighth exemplary embodiment of the disclosure.

In this regard, and with additional reference to FIG. 29, the construct 805 can be formed in a manner generally similar to that described above with respect to the construct 805, without the action of the divider flaps 543*a*, 543*b*, 669*a*, 669*b*.

Accordingly, the side panels 123*a*, 123*b* can together form a divider wall 882 of the construct 805, the side panels 131*a*, 135*a* can together form a divider wall 883 of the construct 805, the side panels 131*b*, 135*b* can together form a divider wall 884 of the construct 805, the divider flap 143*a* can form a divider wall 885 of the construct 805, the divider flap 179*a* and divider panel 139 can together form a divider wall 886 of the construct 805, the divider flap 169*a* can form a divider wall 887 of the construct 805, the divider flap 143*b* can form a divider wall 888 of the construct 805, the divider flap 179*b* can form a divider wall 889 of the construct 805, and the divider flap 169*b* can form a divider wall 890 of the construct 805.

Accordingly, compartment spaces or container receiving spaces 891 can be formed between and adjacent respective portions of the divider walls 882, 883, 884, 885, 886, 887, 888, 889, 890 for receiving respective containers C with the advantages described above with respect to the constructs 105, 305, 405, 505, 605, 705.

The construct 805 having one or more of the containers C at least partially received in a respective compartment space 891 and the construct 805 can be loaded into the interior 207 of a carton 205 to form a system with the advantages associated with the systems described above. In this regard, compartment spaces 891 can be defined between respective divider walls of the construct 805 and respective panels of the carton 205.

Figure 26:
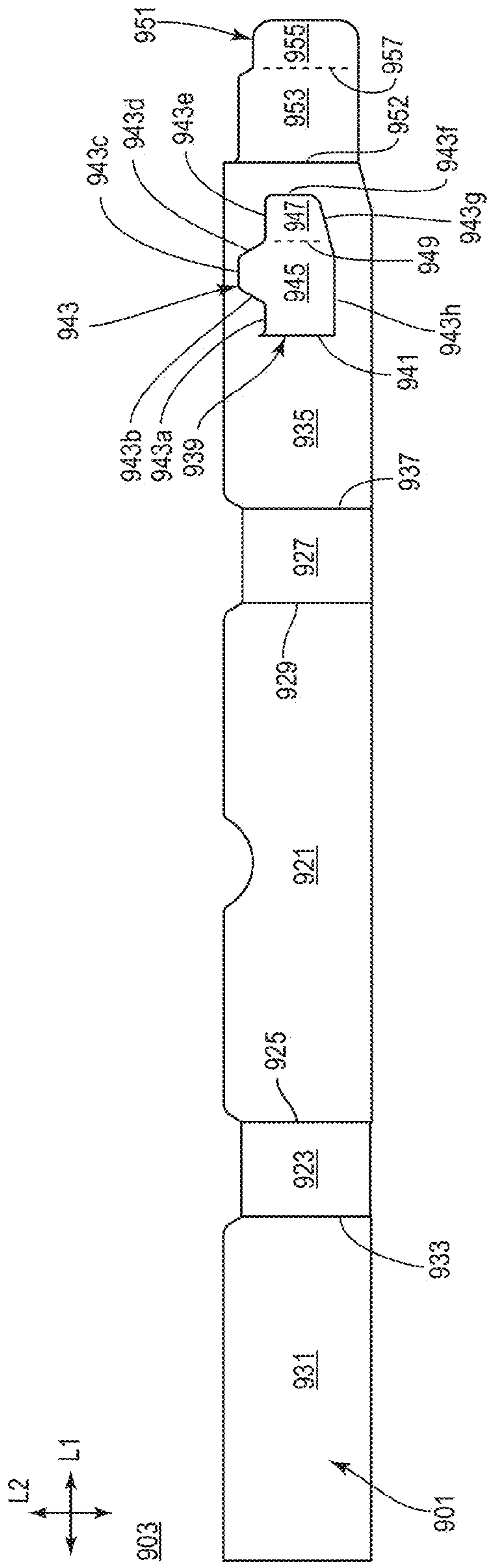
FIG. 26 is a plan view of an exterior surface of a blank for forming a construct according to an eighth exemplary embodiment of the disclosure.

Turning to FIG. 26, an exterior surface 901 of a blank 903 for forming a construct 905 (FIG. 27) according to an eighth exemplary embodiment of the disclosure is illustrated. As described herein, the construct 905 can have divider features for providing a plurality of compartment spaces 963 in an interior 907 thereof, e.g., so as to provide a separation, buffer, etc., between multiple containers in an interior 907 of the construct 905. In this regard, the construct 905 can be a divider construct, and can be provided with one or more containers B to form a system 910. It will be understood that, in some embodiments, the construct 905 and, optionally, containers B held therein, can be loaded into the interior of an outer carton or construct to form a further system.

In some embodiments, the construct 905 can be configured to at least partially hold one or more brick-shaped containers B commonly referred to as TETRA PAK© containers (that contain a liquid beverage or other food or beverage product. The containers B can be any suitable container such as any shape, size, and type of container that is commercially available from Tetra Pak International SA, Lausanne, Switzerland, such as TETRA BRIK packages, TETRA BRIK ASEPTIC packages, TETRA PRISM ASEPTIC packages, or any other suitable package or container (see www.tetrapak.com for more information). The containers B could be other suitable containers made from other materials by other manufactures (e.g., PET bottles, yogurt containers, juice-boxes, beverage cans, etc.), and such materials can include, but are not limited to, glass; plastics such as PET, LDPE, LLDPE, HDPE, PP, PS, PVC, EVOH, and Nylon; and the like; aluminum and/or other metals; or any combination thereof.

With continued reference to FIG. 26, the blank 903 and construct 905 formed therefrom can have the longitudinal axis L1 and the lateral axis L2 and can include a plurality of panels for extending at least partially around an interior 907 of the construct 905.

The plurality of panels of the blank 903/construct 905 can include a front panel 921, a first side panel 923 (broadly, "second side panel") foldably connected to the front panel 921 at a lateral fold line 925, a second side panel 927 (broadly, "first side panel') foldably connected to the front panel 921 at a lateral fold line 929, a first back panel 931 (broadly, "second back panel") foldably connected to the first side panel 923 at a lateral fold line 933, and a second back panel 935 (broadly, "first back panel") foldably connected to the second side panel 927 at a lateral fold line 937.

As described herein, the blank 903 and the construct 905 formed therefrom can also include divider features that can include a first divider flap 939 (broadly, "second divider flap") foldably connected to the back panel 935 at a lateral fold line 941 and at least partially separable therefrom at a cut 943 that can include a first upper generally longitudinal segment 943*a* extending from an endpoint of the fold line 941 to a first upper generally oblique segment 943*b* that intersects a second upper generally longitudinal segment 943*c* that extends to a second upper generally oblique segment 943*d* that extends downwardly to a third upper generally longitudinal segment 943*e*. A generally lateral segment 943*f* of the cut 943 extends from an endpoint of the segment 943*e* to a first lower generally oblique segment 943*g* that intersects a first lower generally longitudinal segment 943*h* that extends to an endpoint of the fold line 941.

As shown, the fold line 941 and/or the cut 943 can at least partially define a wall forming portion 945 of the divider flap 939 and an attachment portion 947 of the divider flap 939 that is foldably connected to the wall forming portion 945 of the divider flap 939 at a lateral fold line 949.

The divider features of the blank 903 and construct 905 formed therefrom can also include a second divider flap 951 (broadly, "first divider flap") foldably connected to the second back panel 935 at a lateral fold line 952. As shown, the divider flap 951 can include a wall forming portion 953 and an attachment portion 955 foldably connected to the wall forming portion 953 at a lateral fold line 957. In some embodiments, the second divider flap 951 can be at least one end flap foldably connected to a respective panel of the plurality of panels of the blank 903 and construct 905 formed therefrom.

Figure 27:
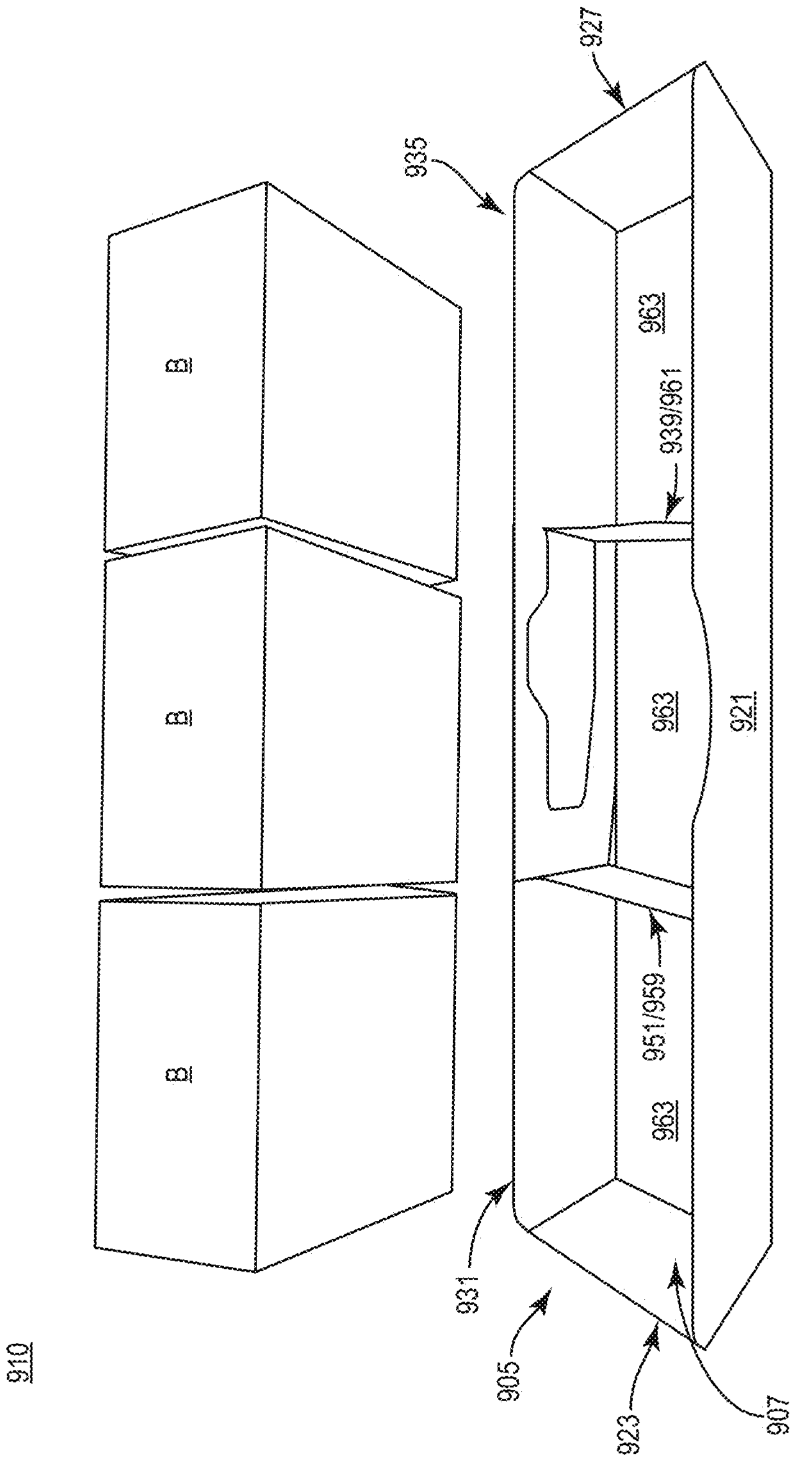
FIG. 27 is a first sequential perspective view of a formation of a system including a construct formed from the blank of FIG. 26 holding a plurality of containers according to the eighth exemplary embodiment of the disclosure.
Figure 28:
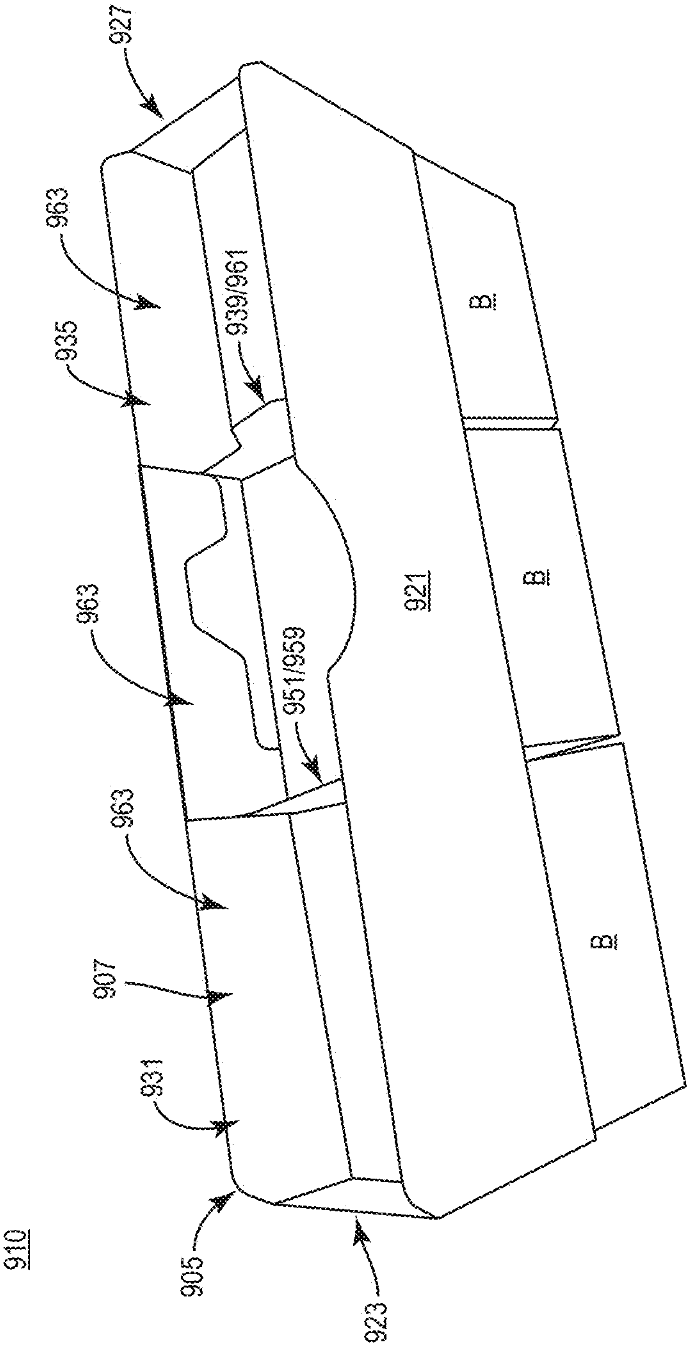
FIG. 28 is a second sequential perspective view of a formation of a system including a construct formed from the blank of FIG. 26 holding a plurality of containers according to the eighth exemplary embodiment of the disclosure.

With additional reference to FIGS. 27-29, according to some exemplary embodiments, the construct 905 can be at least partially formed from the blank 903 by folding the side panels 923, 927 at the respective fold lines 925, 929 into generally perpendicular relation extending away from the front panel 921, and folding the back panels 931, 935 at the respective fold lines 933, 937 into generally perpendicular relation with the respective side panels 923, 927 and into at least partially overlapping and/or face-to-face contact with one another.

Simultaneously or thereafter, the divider flap 951 can be folded at the fold line 952 into generally perpendicular relation with and extending away from the back panels 931, 935, and the attachment portion 955 thereof can be folded relative to the wall forming portion 953 thereof at the fold line 957 into at least partial face-to-face contact with the front panel 921. In this regard, at least the wall forming portion 953 of the divider flap 951 extends from the front panel 921 to the back panels 931, 935 to form a divider wall 959 (broadly, "first divider wall" or "second divider wall" in the interior 907 of the construct 905.

Simultaneously or thereafter, the divider flap 939 can be at least partially separated from the back panel 935 at the respective portions of the cut 943 and folded away therefrom at the fold line 941 so as to extend perpendicularly away therefrom into the interior 907 of the construct 905. The attachment portion 947 of the divider flap 939 can be folded relative to the wall forming portion 945 thereof at the fold line 949 and positioned in at least partial face-to-face contact with the front panel 921 such that at least the wall forming portion 945 of the divider flap 939 extends from the front panel 921 to the back panels 931, 935 to form a divider wall 961 (broadly, "first divider wall" or "second divider wall") in the interior 907 of the construct 905.

It will be understood that the aforementioned arrangement of the construct 905 can be at least partially maintained with one or more applications of an adhesive such as glue. In some embodiments, one or more applications of an adhesive can be provided to one or more interior surfaces of the front panel 921 and to one or more exterior surfaces of the back panel 935.

In the illustrated embodiment, the divider walls 959, 961 can form a plurality of container-receiving spaces 963 in the interior 907 of the construct 905, each container receiving space 963 configured to at least partially receive a portion of a respective container B therethrough and to provide at least partial separation between adjacent containers B in the interior 907 of the construct 905.

In some embodiments, a container receiving space 963 can be at least partially defined between the divider wall 959, the side panel 923, and respective portions of the front panel 921 and at least a portion of the back panel 931. In some embodiments, a container receiving space 963 can be at least partially defined between the divider walls 959, 961, and respective portions of the front panel 921 and back panels 931, 935. In some embodiments, a container receiving space 963 can be at least partially defined between the divider wall 961 and the side panel 927, and respective portions of the front panel 921 and back panel 935.

In some embodiments, the construct 905 can be configured and arranged to provide a tightened engagement about a respective portion of a respective container B at least partially received in a respective container receiving space 963 so as to minimize, inhibit, and/or prevent incidental or unwanted disengagement of a respective container B from the construct 905/package 910.

Figure 30:
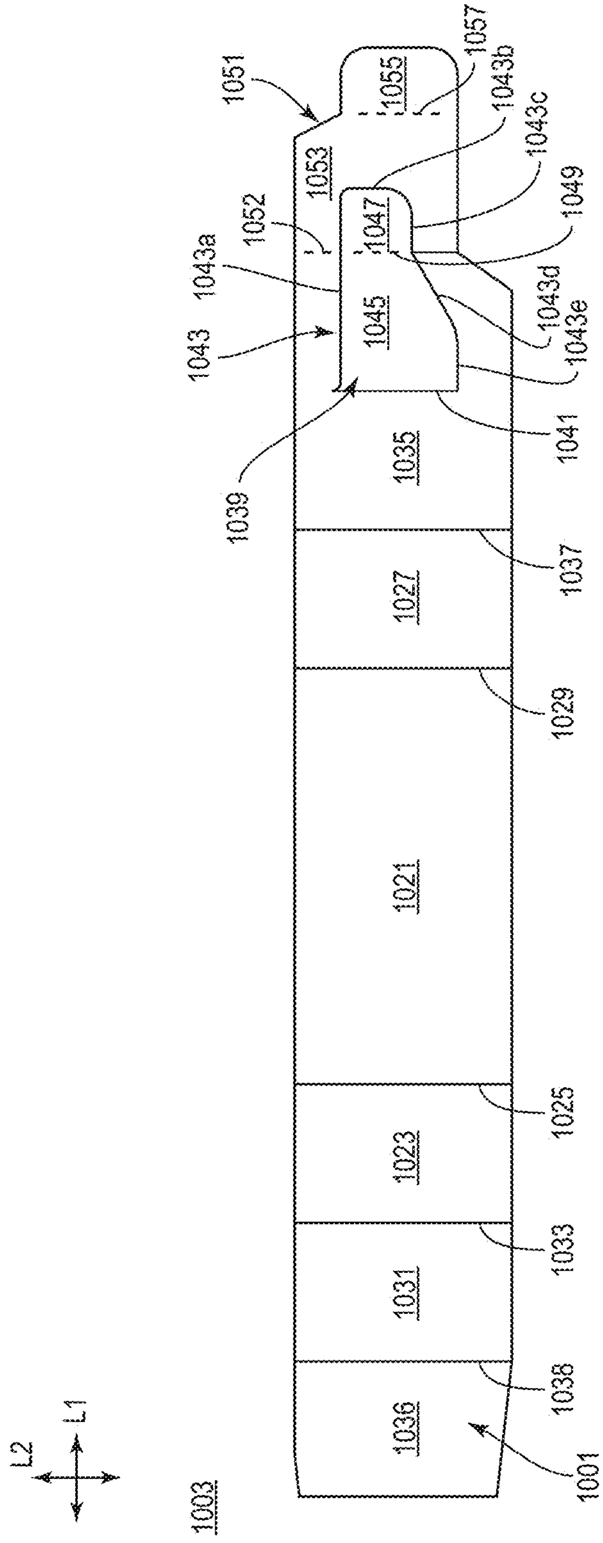
FIG. 30 is a plan view of an exterior surface of a blank for forming a construct according to a ninth exemplary embodiment of the disclosure.

Turning to FIG. 30, an exterior surface 1001 of a blank 1003 for forming a construct 1005 according to a ninth exemplary embodiment of the disclosure is illustrated. As described herein, the construct 1005 can have divider features for providing a plurality of compartment spaces 1063 in an interior 1007 thereof, e.g., so as to provide a separation, buffer, etc., between multiple containers in an interior 1007 of the construct 1005. In this regard, the construct 1005 can be a divider construct, and can be provided with one or more containers B to form a system 1010. It will be understood that, in some embodiments, the construct 1005 and, optionally, containers B held therein, can be loaded into the interior of an outer carton or construct to form a further system.

The blank 1003 and the construct 1005 formed therefrom can have one or more features that are the same or similar to those described above with respect to the blank 903 and construct 905, and like or similar features are designated with like or similar reference numerals. The construct 1005 can be provided with one or more containers B to form a system 1010.

With continued reference to FIG. 30, the blank 1003 and construct 1005 formed therefrom can have the longitudinal axis L1 and the lateral axis L2 and can include a plurality of panels for extending at least partially around an interior 1007 of the construct 1005.

The plurality of panels of the blank 1003/construct 1005 can include a front panel 1021, a first side panel 1023 (broadly, "second side panel") foldably connected to the front panel 1021 at a lateral fold line 1025, a second side panel 1027 (broadly, "first side panel") foldably connected to the front panel 1021 at a lateral fold line 1029, a first back panel 1031 (broadly, "second back panel") foldably connected to the first side panel 1023 at a lateral fold line 1033, and a second back panel 1035 (broadly, "first back panel") foldably connected to the second side panel 1027 at a lateral fold line 1037.

The blank 1003 and construct 1005 formed therefrom can also include at least one end flap foldably connected to a respective panel of the plurality of panels thereof. In the illustrated embodiment, the at least one end flap can include a back end flap 1036 foldably connected to the back panel 1031 at a lateral fold line 1038. In some embodiments, the back end flap 1036 can be considered a third back panel of the plurality of panels. In some embodiments, the back end flap 1036 and the back panel 1031 can be considered portions of a back panel of the plurality of panels.

As described herein, the blank 1003 and the construct 1005 formed therefrom can also include divider features that can include a first divider flap 1039 (broadly, "second divider flap") foldably connected to the back panel 1035 at a lateral fold line 1041 and at least partially separable therefrom at a cut 1043 that can include an upper generally longitudinal segment 1043*a* extending from an endpoint of the fold line 1041 to a generally lateral segment 1043*b* of the cut 1043. The segment 1043*b* extends to a first lower generally longitudinal segment 1043*c* that intersects a lower generally oblique segment 1043*d* that extends to a second lower generally longitudinal segment 1043*e* that intersects an endpoint of the fold line 1041.

As shown, the fold line 1041 and/or the cut 1043 can at least partially define a wall forming portion 1045 of the divider flap 1039 and an attachment portion 1047 of the divider flap 1039 that is foldably connected to the wall forming portion 1045 of the divider flap 1039 at a lateral fold line 1049.

The divider features of the blank 1003 and construct 1005 formed therefrom can also include a second divider flap 1051 (broadly, "first divider flap") foldably connected to the second back panel 1035 at a lateral fold line 1053. A portion of the cut 1043 associated with the divider flap 1039 intersects the fold line 1053 and extends along a portion of the second divider flap 1051 such that at least the attachment portion 1047 of the divider flap 1039 can be at least partially separable from the divider flap 1051.

As shown, the divider flap 1051 can include a wall forming portion 1053 and an attachment portion 1055 foldably connected to the wall forming portion 1053 at a lateral fold line 1057. In some embodiments, the second divider flap 1051 can be at least one end flap foldably connected to a respective panel of the plurality of panels of the blank 1003 and construct 1005 formed therefrom.

Figure 31:
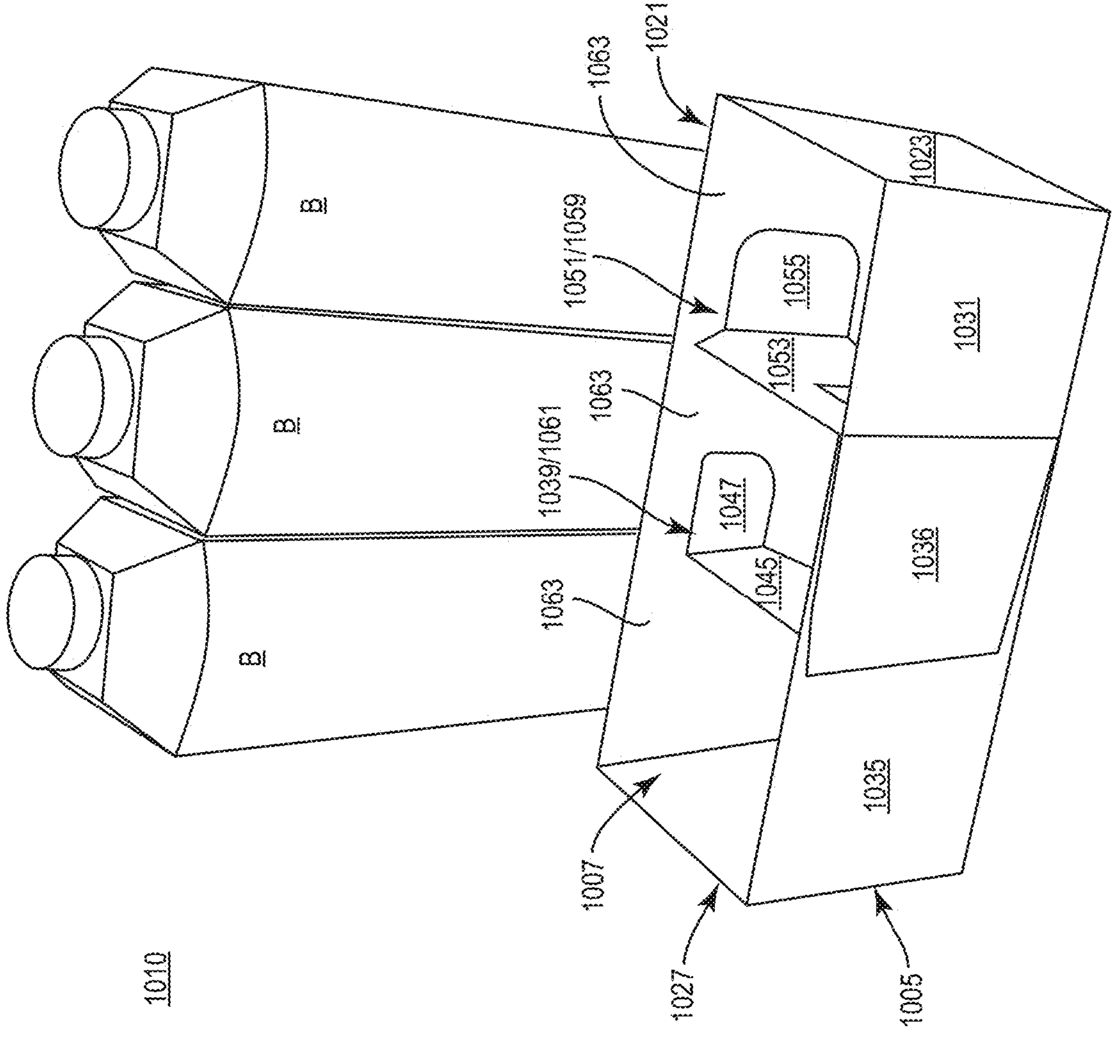
FIG. 31 is a first sequential perspective view of a formation of a system including a construct formed from the blank of FIG. 30 holding a plurality of containers according to the ninth exemplary embodiment of the disclosure.
Figure 32:
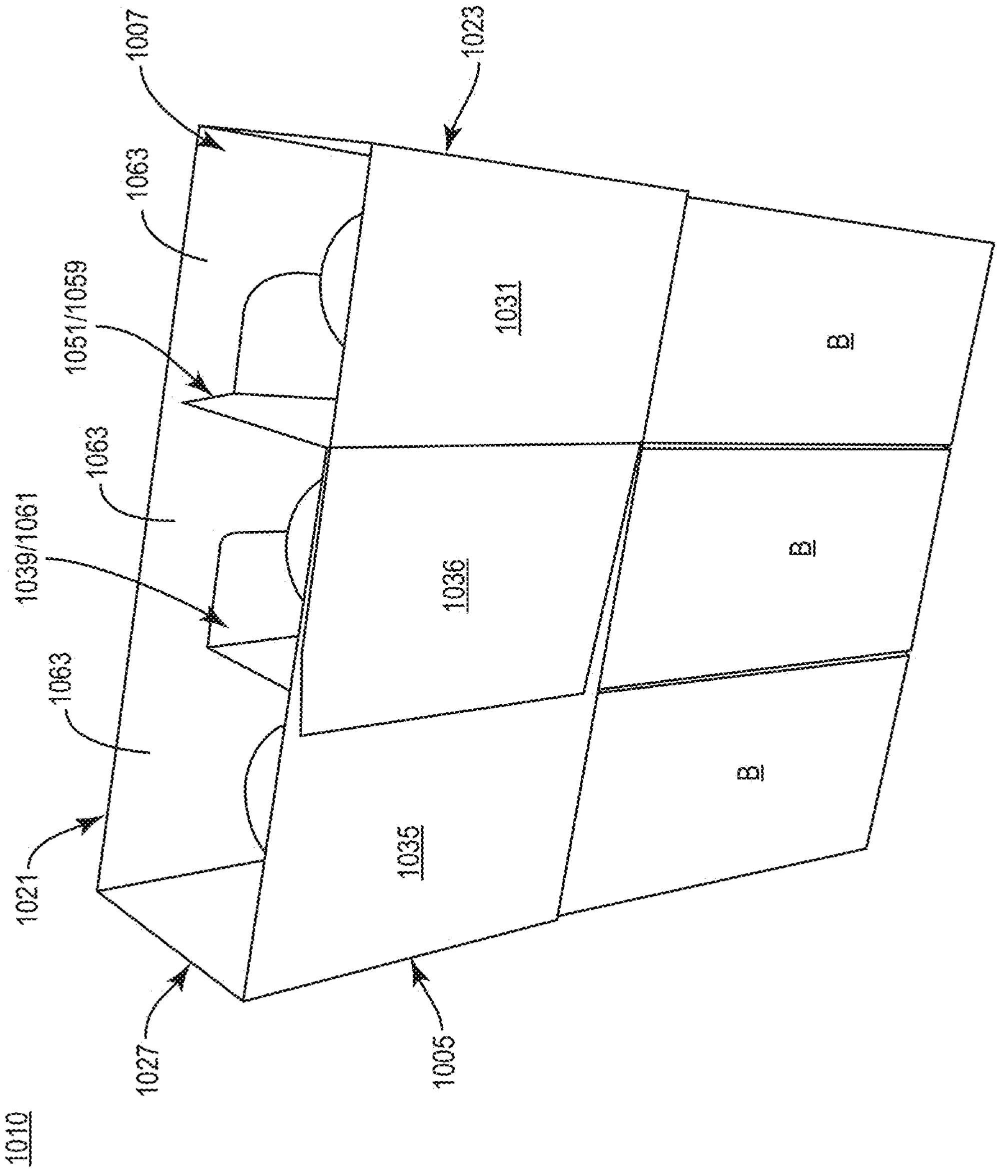
FIG. 32 is a second sequential perspective view of a formation of a system including a construct formed from the blank of FIG. 30 holding a plurality of containers according to the ninth exemplary embodiment of the disclosure.
Figure 33:
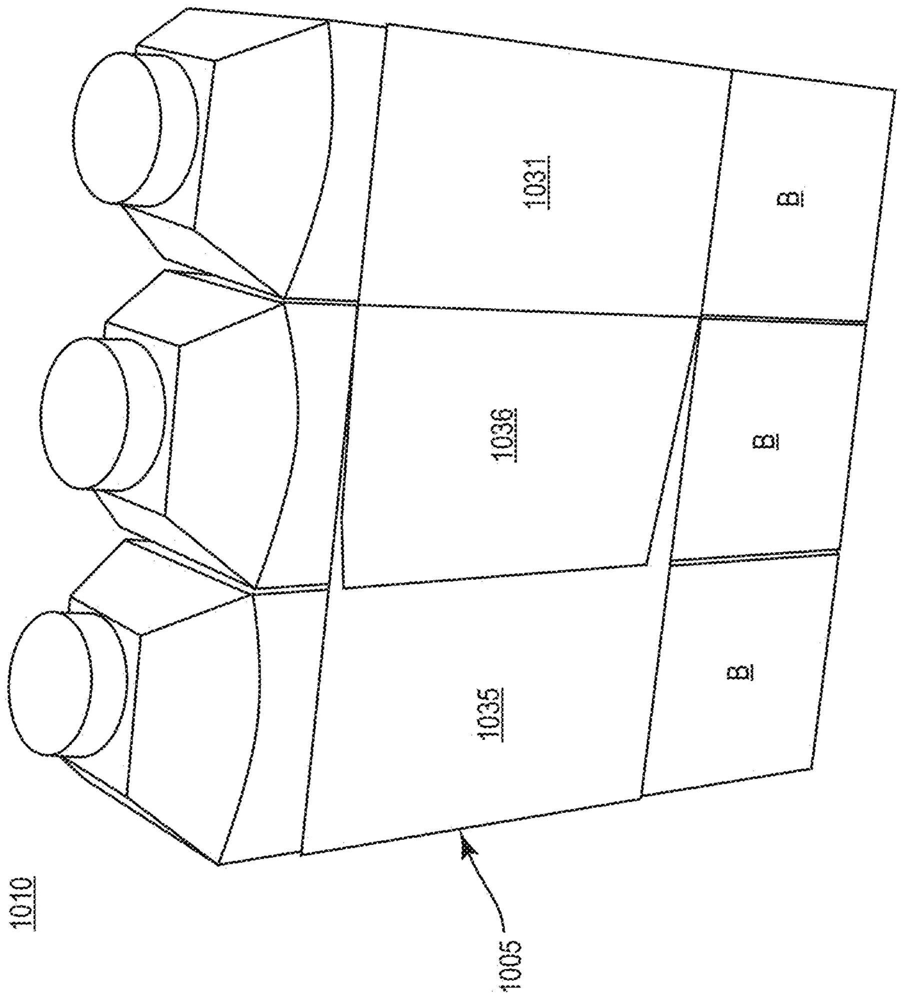
FIG. 33 is a perspective view of a system including a construct formed from the blank of FIG. 30 holding a plurality of containers according to the ninth exemplary embodiment of the disclosure.

With additional reference to FIGS. 31-33, according to some exemplary embodiments, the construct 1005 can be at least partially formed from the blank 1003 by folding the side panels 1023, 1027 at the respective fold lines 1025, 1029 into generally perpendicular relation extending away from the front panel 1021, and folding the back panels 1031, 1035 at the respective fold lines 1033, 1037 into generally perpendicular relation with the respective side panels 1023, 1027. Such movement of the back panel 1031 can carry the back end flap 1036 into at least partially overlapping and/or face-to-face contact with the back panel 1035.

Simultaneously or thereafter, the divider flap 1051 can be folded at the fold line 1052 into generally perpendicular relation with and extending away from the back panels 1031, 1035, and the attachment portion 1055 thereof can be folded relative to the wall forming portion 1053 thereof at the fold line 1057 into at least partial face-to-face contact with the front panel 1021. In this regard, at least the wall forming portion 1053 of the divider flap 1051 extends from the front panel 1021 to the back panels 1031, 1035 and back end flap 1036 to form a divider wall 1059 in the interior 1007 of the construct 1005.

Simultaneously or thereafter, the divider flap 1039 can be at least partially separated from the back panel 1035 at the respective portions of the cut 1043 and folded away therefrom at the fold line 1041 so as to extend perpendicularly away therefrom into the interior 1007 of the construct 1005. The attachment portion 1047 of the divider flap 1039 can be folded relative to the wall forming portion 1045 thereof at the fold line 1049 and positioned in at least partial face-to-face contact with the front panel 1021 such that at least the wall forming portion 1045 of the divider flap 1039 extends from the front panel 1021 to the back panels 1031, 1035 and back end flap 1036 to form a divider wall 1061 in the interior 1007 of the construct 1005.

It will be understood that the aforementioned arrangement of the construct 1005 can be at least partially maintained with one or more applications of an adhesive such as glue. In some embodiments, one or more applications of an adhesive can be provided to one or more interior surfaces of the front panel 1021 and to one or more exterior surfaces of the back panel 1035.

In the illustrated embodiment, the divider walls 1055, 1061 can form a plurality of container-receiving spaces 1063 in the interior 1007 of the construct 1005, each container receiving space 1063 configured to at least partially receive a portion of a respective container B therethrough and to provide at least partial separation between adjacent containers B in the interior 1007 of the construct 1005.

In some embodiments, a container receiving space 1063 can be at least partially defined between the divider wall 1059, the side panel 1023, and respective portions of the front panel 1021 and the back panel 1031. In some embodiments, a container receiving space 1063 can be at least partially defined between the divider walls 1059, 1061, and respective portions of the front panel 1021 and the back panel 1035 and the back end flap 1036. In some embodiments, a container receiving space 1063 can be at least partially defined between the divider wall 1061 and the side panel 1027, and respective portions of the front panel 1021 and back panel 1035.

In some embodiments, the construct 1005 can be configured and arranged to provide a tightened engagement about a respective portion of a respective container B at least partially received in a respective container receiving space 1063 so as to minimize, inhibit, and/or prevent incidental or unwanted disengagement of a respective container B from the construct 1005/package 1010.

Figure 34:
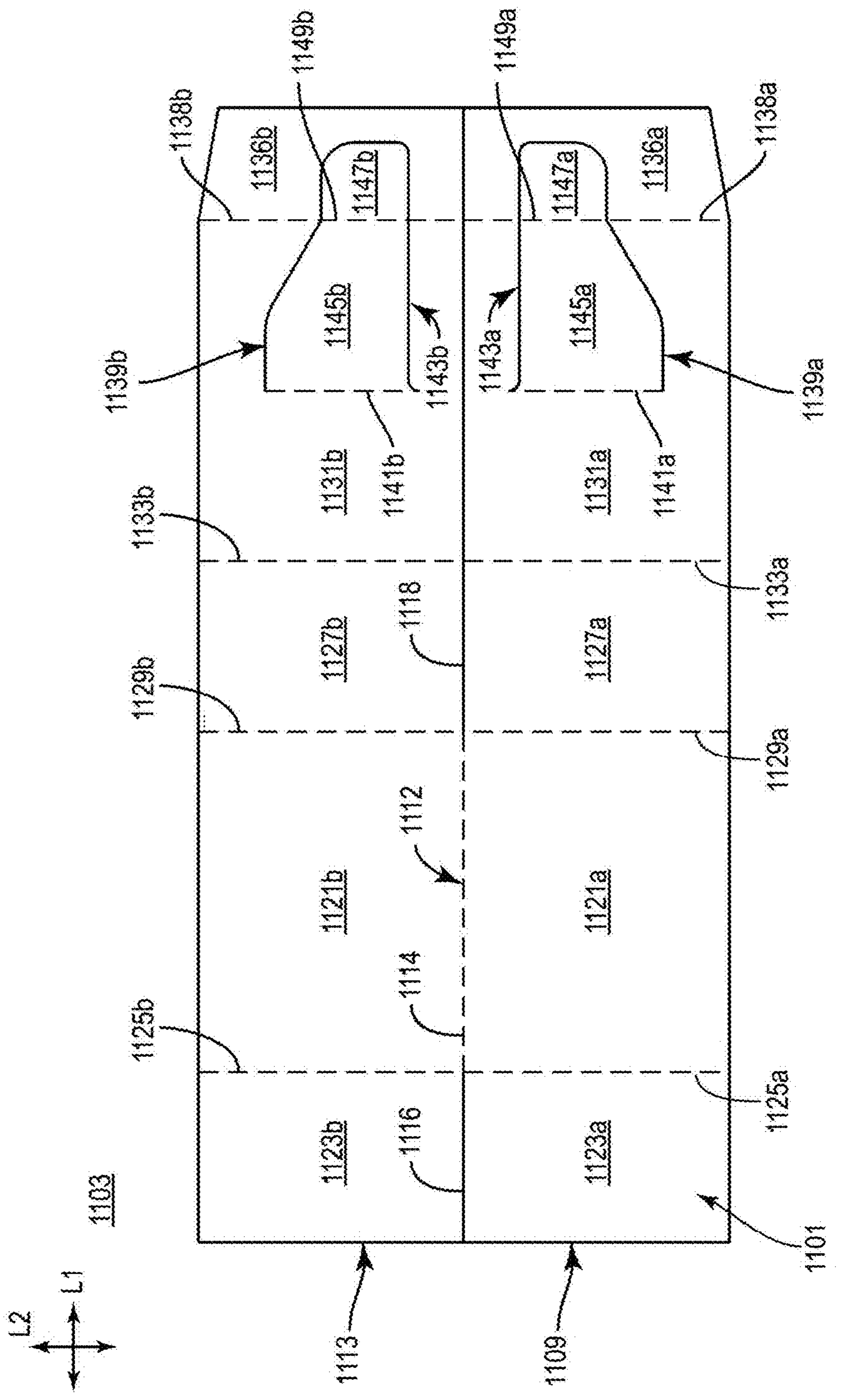
FIG. 34 is a plan view of an exterior surface of a blank for forming a construct according to a tenth exemplary embodiment of the disclosure.

Turning to FIG. 34, an exterior surface 1101 of a blank 1103 for forming a construct 1105 according to a tenth exemplary embodiment of the disclosure is illustrated. As described herein, the construct 1105 can have divider features for providing a plurality of compartment spaces in an interior 1107 thereof, e.g., so as to provide a separation, buffer, etc., between multiple containers in an interior 1107 of the construct 1105. In this regard, the construct 1105 can be a divider construct, and can be provided with one or more containers B to form a system 1110. It will be understood that, in some embodiments, the construct 1105 and, optionally, containers B held therein, can be loaded into the interior of an outer carton or construct to form a further system.

The blank 1103 and the construct 1105 formed therefrom can have one or more features that are the same or similar to those described above with respect to the blanks 903, 1003 and constructs 905, 1005, and like or similar features are designated with like or similar reference numerals. The construct 1105 can be provided with one or more containers B to form a system 1110.

As shown in FIG. 34, the blank 1103 can include a front portion 1109 for forming a front portion 1111 of the construct 1105, and a back portion 1113 for forming a back portion 1115 of the construct 1105, the front portion 1109 of the blank 1103 at least partially foldably connected to and at least partially separably connected to the back portion 1113 of the blank 1103 at a line of weakening 1112.

The blank 1103 and construct 1105 formed therefrom can have the longitudinal axis L1 and the lateral axis L2 and can include a plurality of panels for extending at least partially around an interior 1107 of the construct 1105.

As shown, the front portion 1109 of the blank 1103/front portion 1111 of the construct 1105 can include a front central panel 1121*a*, a first front side panel 1123*a* (broadly, "second front side panel") foldably connected to the front central panel 1121*a* at a lateral fold line 1125*a*, a second front side panel 1127*a* (broadly, "first front side panel") foldably connected to the front central panel 1121*a* at a lateral fold line 1129*a*, and a back panel 1131*a* foldably connected to the second side panel 1127*a* at a lateral fold line 1133*a*.

The blank 1103 and construct 1105 formed therefrom can also include at least one end flap foldably connected to a respective panel of the plurality of panels thereof. In the illustrated embodiment, the at least one end flap can include a front attachment flap 1136*a* foldably connected to the back panel 1131*a* at a lateral fold line 1138*a*.

As described herein, the blank 1103 and the construct 1105 formed therefrom can also include divider features that can include a front divider flap 1139*a* foldably connected to the front panel 1131*a* at a lateral fold line 1141*a* and at least partially separable therefrom at a cut 1143*a* having a configuration generally similar to that of the cut 1043 described above.

As shown, the fold line 1141*a* and/or the cut 1143*a* can at least partially define a wall forming portion 1145*a* of the divider flap 1139*a* and an attachment portion 1147*a* of the divider flap 1139*a* that is foldably connected to the wall forming portion 1145*a* of the divider flap 1139*a* at a lateral fold line 1149*a*. In this regard, the cut 1143*a* can have a configuration generally similar to the cut 1043 described above.

As also shown, a portion of the cut 1143*a* associated with the divider flap 1139*a* intersects the fold line 1138*a* and extends along a portion of the attachment flap 1136*a* such that at least the attachment portion 1147*a* of the divider flap 1139*a* can be at least partially separable from the attachment flap 1136*a*.

In the illustrated embodiment, the back portion 1113 of the blank 1103 and the back portion 1115 of the construct

1105 can include a back central panel 1121*b*, a back first side panel 1123*b* (broadly, "second back side panel"), a back second side panel 1127*b* (broadly, "first back side panel"), a back panel 1131*b*, a back attachment flap 1136*b*, and a back divider flap 1139*b* (broadly, "first divider flap" or "second divider flap") having associated features that are generally a mirror-image of the corresponding portions of the front portion 1109 of the blank 1103. Corresponding components (e.g., panels, flaps, fold lines, cuts, etc.) have been designated by corresponding reference numbers that differ by the "a" or "b" suffix, with the "a" components corresponding to the front portion 1109 of the blank 1103 and the "b" components corresponding to the back portion 1113 of the blank 1103.

As shown, the central panel 1121*a* can be foldably connected to the central panel 1121*b* at a respective portion of the line of weakening 1112, e.g., at a fold line segments 1114 of the line of weakening 1112, and the panels 1123*a*, 1127*a*, 1131*a* and attachment flap 1136*a* can be separably connected to the panels 1123*b*, 1127*b*, 1131*b* and attachment flap 1136*b* at respective portions of the line of weakening 1112, e.g., cut segments 1114, 1116 of the line of weakening 1112 that are interrupted by the fold line segment 1114.

Figure 35:
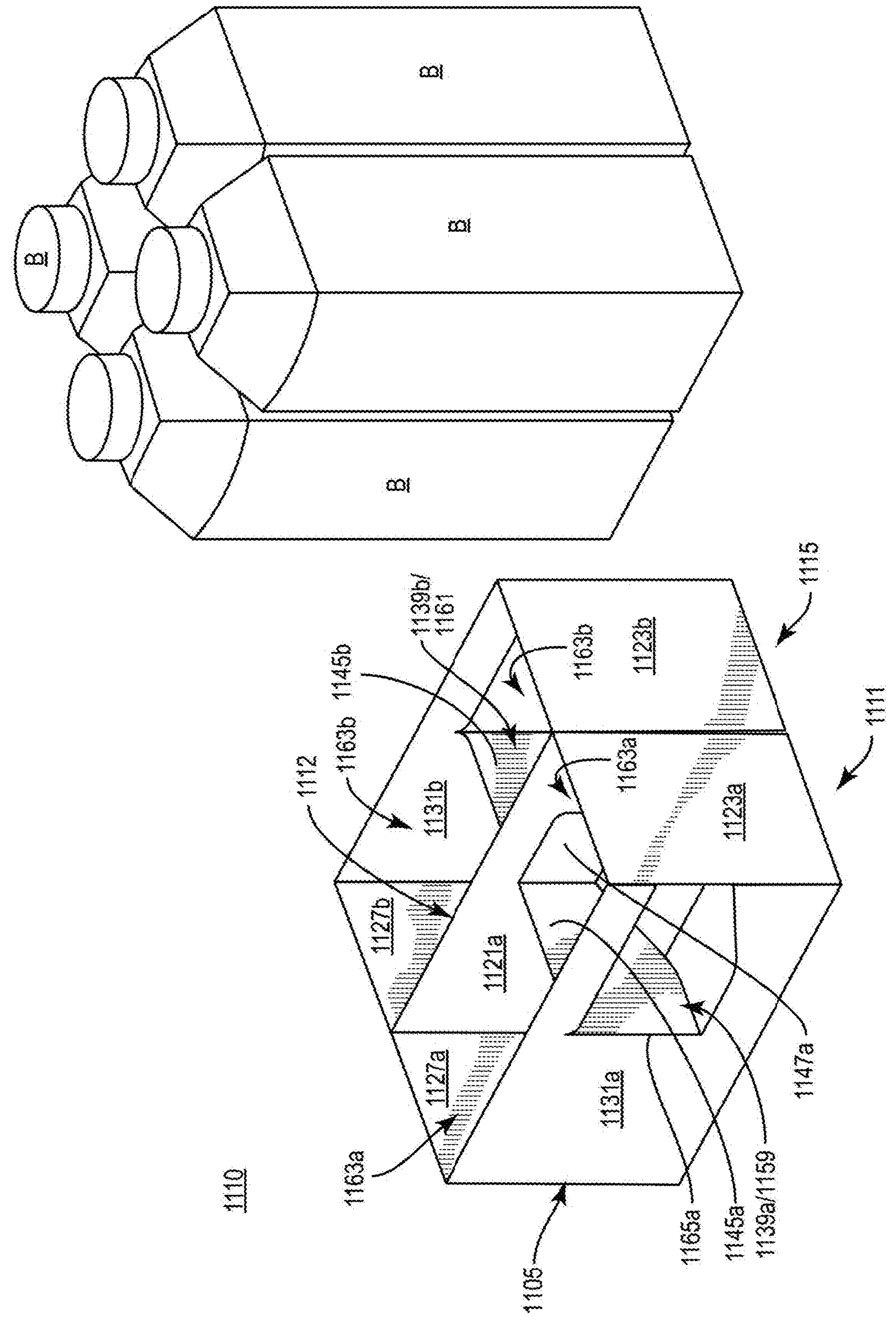
FIG. 35 is a perspective view of a formation of a system including a construct formed from the blank of FIG. 34 holding a plurality of containers according to the tenth exemplary embodiment of the disclosure.
Figure 36:
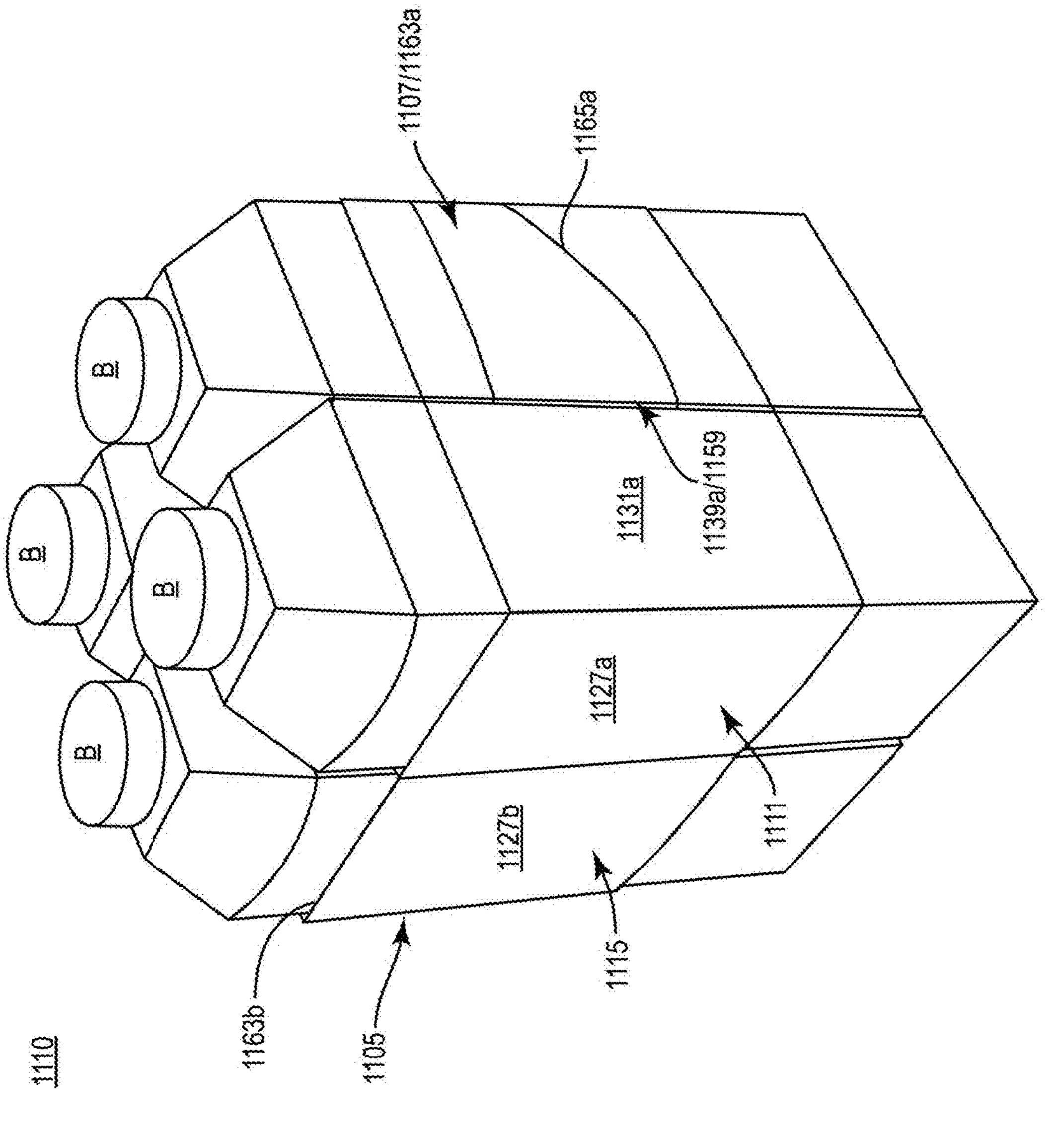
FIG. 36 is a perspective view of a system including a construct formed from the blank of FIG. 34 holding a plurality of containers according to the tenth exemplary embodiment of the disclosure.
Figure 37:
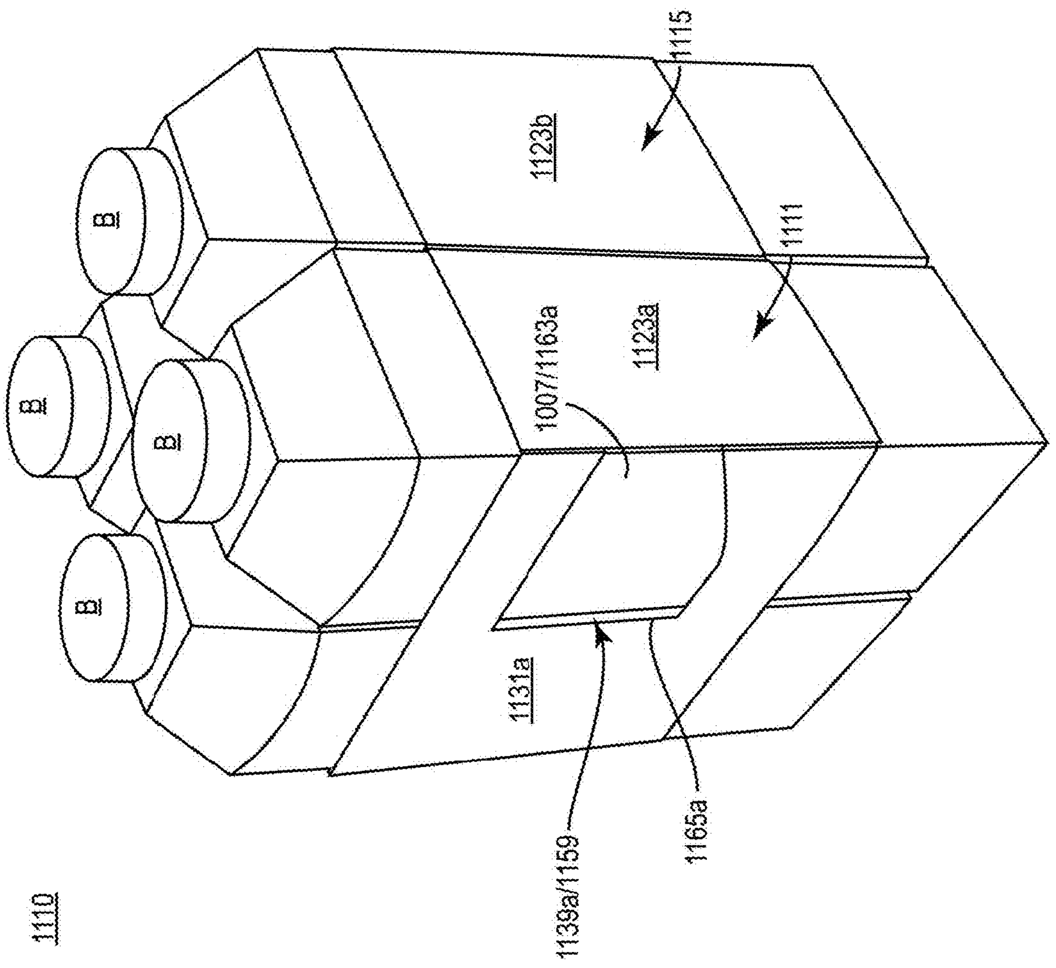
FIG. 37 is another perspective view of the system of FIG. 36.

With additional reference to FIGS. 35-37, according to some exemplary embodiments, the construct 1105 can be at least partially formed from the blank 1103 by folding the exterior surface of the back central panel 1121*b* into at least partial face-to-face contact with the exterior surface of the front central panel 1121*a* at the respective portion of the line of weakening 1112. In particular, the central panels 1121*a*, 1121*b* can be folded at the fold line segment 1114 of the line of weakening 1112, and the panels 1123*a*, 1127*a*, 1131*a* and end flap 1136*a* can be at least partially separated from the respective panels 1123*b*, 1127*b*, 1131*b* and end flap 1136*b* at the respective cut segments 1116, 1118.

In order to form the front portion 1111 of the construct 1105, according to some embodiments, the front side panels 1123*a*, 1127*a* can be folded at the respective fold lines 1125*a*, 1129*a* into generally perpendicular relation extending away from the front central panel 1121*a*, the front panel 1131*a* can be folded at the fold line 1133*a* into generally perpendicular relation with the side panels 1123*a*, 1127*a* and into spaced and parallel relation with the front central panel 1121*a*, and the attachment flap 1136*a* can be folded at the fold line 1138*a* and positioned in at least partial face-to-face contact with the side panel 1123*a*.

Simultaneously or thereafter, the front divider flap 1139*a* can be at least partially separated from the front panel 1131*a* and the attachment flap 1136*a* at the respective portions of the cut 1143*a* and folded away therefrom at the fold line 1141*a* so as to extend perpendicularly away from the front panel 1131*a* into the interior 1107 of the construct 1105. The attachment portion 1147*a* of the divider flap 1139*a* can be folded relative to the wall forming portion 1145*a* thereof at the fold line 1149*a* and positioned in at least partial face-to-face contact with the central panel 1121*a* such that at least the wall forming portion 1145*a* of the divider flap 1139*a* extends from the front panel 1131*a* to the central panels 1121*a*, 1121*b* to form a front divider wall 1159 (broadly, "first divider wall" or "second divider wall") in the interior 1107 of the construct 1105.

Similarly, in order to form the back portion 1115 of the construct 1105, according to some embodiments, the back side panels 1123*b*, 1127*b* can be folded at the respective fold lines 1125*b*, 1129*b* into generally perpendicular relation extending away from the back central panel 1121*b*, the back panel 1131*b* can be folded at the fold line 1133*b* into generally perpendicular relation with the side panels 1123*b*, 1127*b* and into spaced and parallel relation with the back central panel 1121*b*, and the attachment flap 1136*b* can be folded at the fold line 1138*b* and positioned in at least partial face-to-face contact with the side panel 1123*b*.

Simultaneously or thereafter, the back divider flap 1139*b* can be at least partially separated from the back panel 1131*b* and the attachment flap 1136*b* at the respective portions of the cut 1143*b* and folded away therefrom at the fold line 1141*b* so as to extend perpendicularly away from the back panel 1131*b* into the interior 1107 of the construct 1105. The attachment portion 1147*b* of the divider flap 1139*b* can be folded relative to the wall forming portion 1145*b* thereof at the fold line 1149*b* and positioned in at least partial face-to-face contact with the central panel 1121*b* such that at least the wall forming portion 1145*b* of the divider flap 1139*b* extends from the back panel 1131*b* to the central panels 1121*a*, 1121*b* to form a back divider wall 1161 (broadly, "first divider wall" or "second divider wall") in the interior 1107 of the construct 1105.

It will be understood that the aforementioned arrangement of the construct 1105 can be at least partially maintained with one or more applications of an adhesive such as glue. In some embodiments, one or more applications of an adhesive can be provided to one or more surfaces of one or more of the panels 1127*a*, 1127*b* and attachment flaps 1136*a*, 1136*b*.

In some embodiments, the front central panel 1121*a* and the back central panel 1121*b* can be a central divider wall that separates the interior 1107 of the construct 1105 into a plurality of front container receiving spaces 1163*a* associated with the front portion 1111 of the construct 1105 and a plurality of back container receiving spaces 1163*b* associated with the back portion 1115 of the construct 1105.

In the illustrated embodiment, each container receiving space 1163*a*, 1163*b* is configured to at least partially receive a portion of a respective container B therethrough and to provide at least partial separation between adjacent containers B in the interior 1107 of the construct 1105.

In some embodiments, a front container receiving space 1163*a* can be at least partially defined between the divider wall 1159, the side panel 1123*a*, and respective portions of the front panel 1131*a* and the central panel 1121*a*. Another front container receiving space 1163*a* can be at least partially defined between the divider wall 1159, the side panel 1127*a*, and respective portions of the front panel 1131*a* and the central panel 1121*a*.

Similarly, in some embodiments, a back container receiving space 1163*b* can be at least partially defined between the divider wall 1161, the side panel 1123*b*, and respective portions of the back panel 1131*b* and the central panel 1121*b*. wall 1161 and respective portions of the back panel 1131*b* and the central panel 1121*b*. Another back container receiving space 1163*b* can be at least partially defined between the divider wall 1161, the side panel 1127*b*, and respective portions of the back panel 1131*b* and the central panel 1121*b*.

In some embodiments, the construct 1105 can be configured and arranged to provide a tightened engagement about a respective portion of a respective container B at least partially received in a respective container receiving space 1163*a*, 1163*b* so as to minimize, inhibit, and/or prevent incidental or unwanted disengagement of a respective container B from the construct 1105/package 1110.

Furthermore, the aforementioned arrangement of the divider features of the blank 1103 and the construct 1105 formed therefrom can provide product viewing openings

1165*a*, 1165*b* at least partially formed in the respective front panel 1131*a*, 1131*b* upon the at least partial separation of the respective divider flaps 1139*a*, 1139*b* therefrom, for example, to provide visibility from the exterior into the interior 1107 of the construct 1105 to allow customers or other viewers to see product information, graphics, to allow for product inspection, etc.

Figure 38:
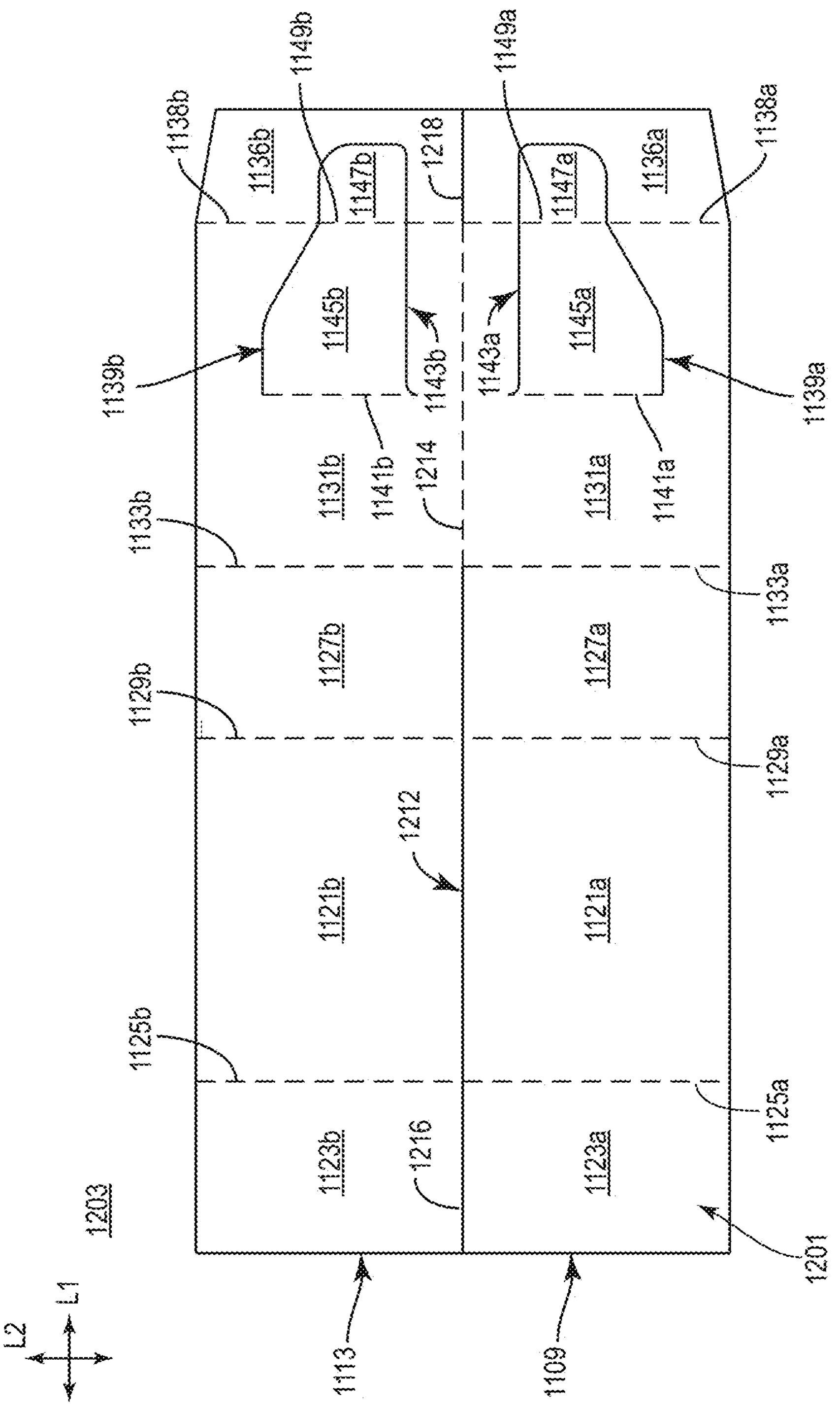
FIG. 38 is a plan view of an exterior surface of a blank for forming a construct according to an eleventh exemplary embodiment of the disclosure.

Turning to FIG. 38, an exterior surface 1201 of a blank 1203 for forming a construct 1105 according to an eleventh exemplary embodiment of the disclosure is illustrated. The blank 1203 and the construct 1205 formed therefrom can have one or more features that are the same or similar to those described above with respect to the blanks 903, 1003, 1103 and constructs 905, 1005, 1105 and like or similar features are designated with like or similar reference numerals. The construct 1205 can be provided with one or more containers B to form a system 1210.

As shown in FIG. 38, the blank 1203 can be generally similar to the blank 1103 described above, but the front portion 1109 of the blank 1203 can be foldably connected to the back portion 1113 of the blank 1203 at a line of weakening 1212 that is arranged such that the panel 1131*a* is foldably connected to the panel 1131*b* at fold line segment 1214 of the line of weakening 1212, and such that the panels 1121*a*, 1123*a*, 1127*a*, and attachment flap 1136*a* are separably connected to the respective panels 1121*b*, 1123*b*, 1127*b*, and attachment flap 1136*b* at respective cut segments 1216, 1218 of the line of weakening 1212 that are interrupted by the fold line segment 1214.

Figure 39:
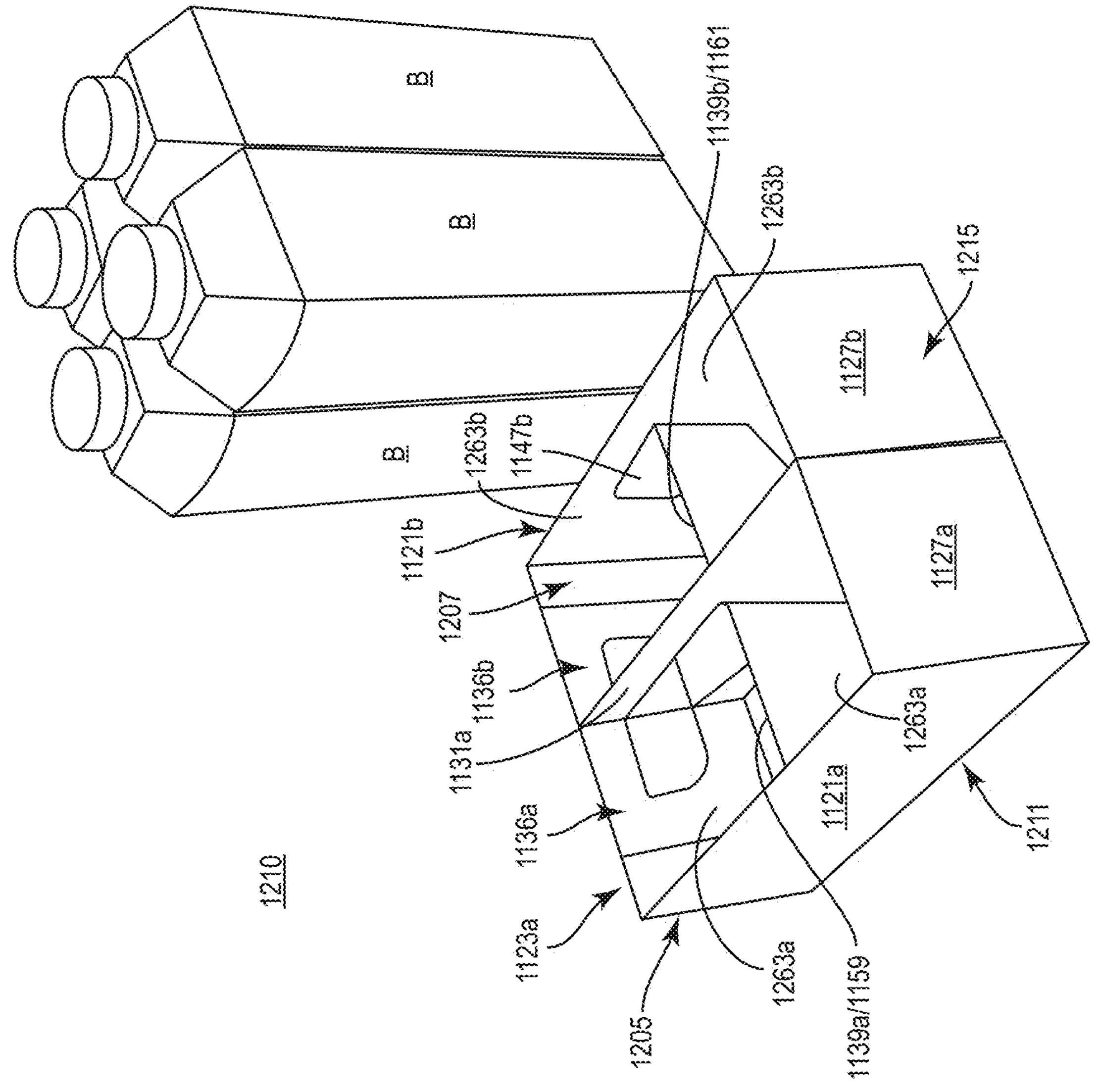
FIG. 39 is a first sequential perspective view of a formation of a system including a construct formed from the blank of FIG. 38 holding a plurality of containers according to the eleventh exemplary embodiment of the disclosure.
Figure 40:
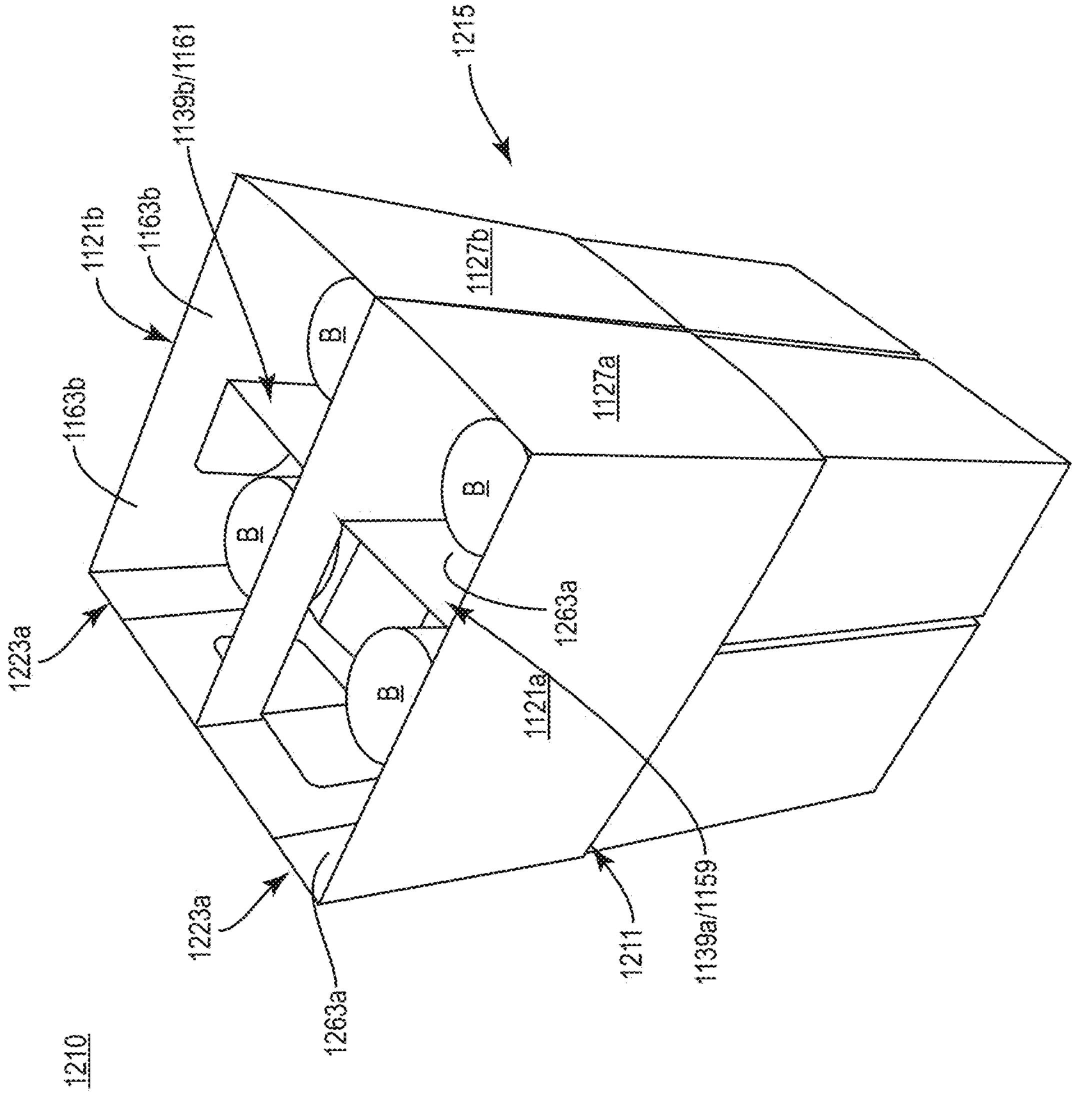
FIG. 40 is a second sequential perspective view of a formation of a system including a construct formed from the blank of FIG. 38 holding a plurality of containers according to the eleventh exemplary embodiment of the disclosure.
Figure 41:
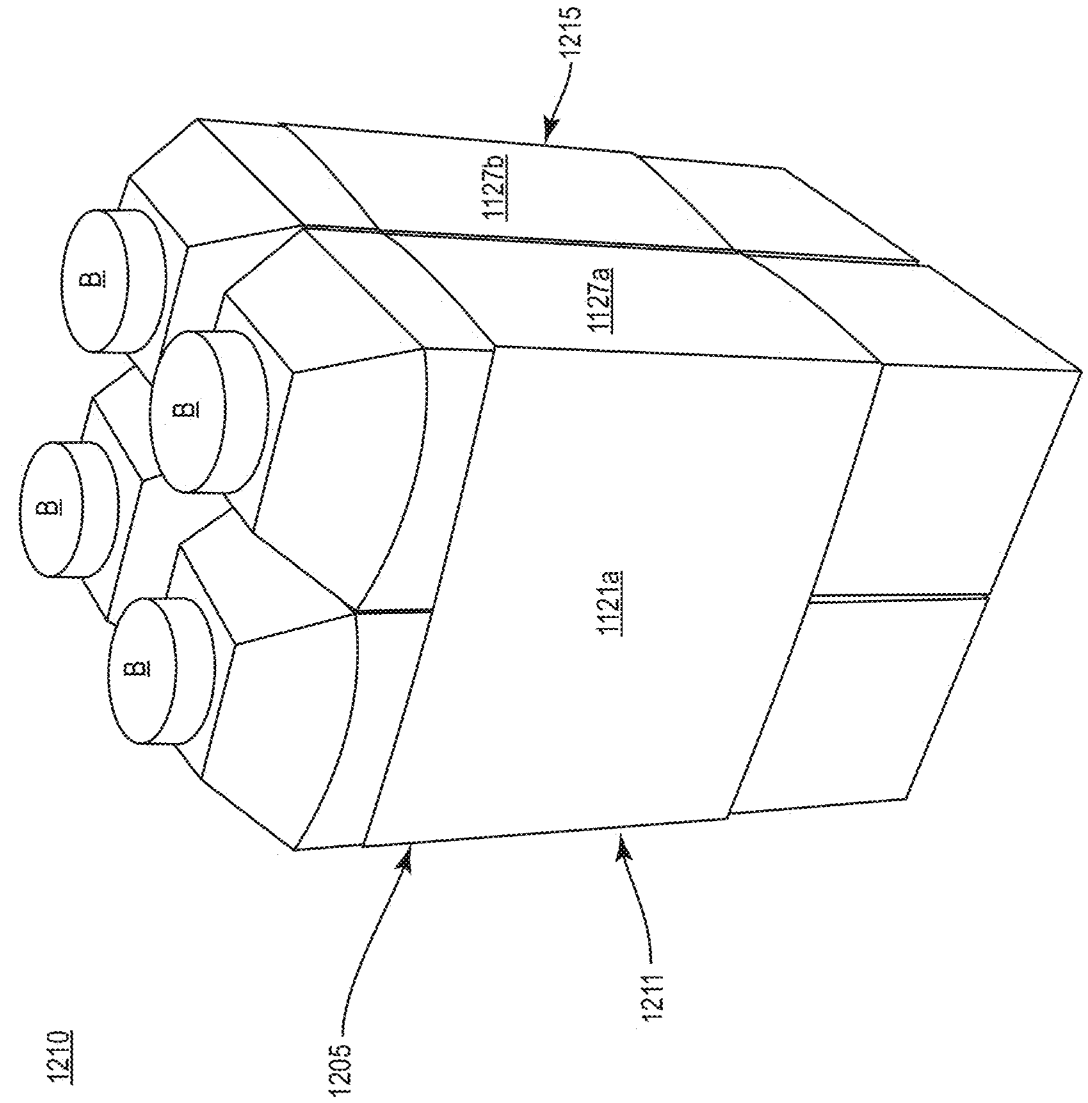
FIG. 41 is a perspective view of a system including a construct formed from the blank of FIG. 38 holding a plurality of containers according to the eleventh exemplary embodiment of the disclosure.

With additional reference to FIGS. 39-41, a construct 1205 and package 1210 can be formed from the blank 1203 in a manner similar to that described above with respect to the formation of the construct 1105 and package 1110 from the blank 1103, with similar advantages and functionality.

In particular, according to some exemplary embodiments, the construct 1105 can be at least partially formed from the blank 1103 by folding the exterior surface of the panel 1131*b* into at least partial face-to-face contact with the exterior surface of the panel 1131*a* at the respective portion of the line of weakening 1212, e.g., the fold line segment 1214. In this regard, the panels 1131*a*, 1131*b* of the blank 1203 and construct 1205 formed therefrom can be a respective front central panel and back central panel thereof. The panels 1123*a*, 1121*a*, 1127*a* and end flap 1136*a* can be at least partially separated from the respective panels 1123*b*, 1121*b*, 1127*b* and end flap 1136*b* at the respective cut segments 1216, 1218.

In order to form the front portion 1211 of the construct 1205, according to some embodiments, the side panel 1127*a* and attachment flap 1136*a* can be folded at the respective fold lines 1133*a*, 1138*a* into generally perpendicular relation extending away from the central panel 1131*a*, the panel 1121*a* can be folded at the fold line 1129*a* into generally perpendicular relation with the side panel 1127*a* and into spaced and parallel relation with the central panel 1131*a*, and the side panel 1123*a* can be folded at the fold line 1125*a* and positioned in at least partial face-to-face contact with the attachment flap 1136*a*. In such an arrangement, the panel 1121*a* can be a front panel of the construct 1205.

Simultaneously or thereafter, the front divider flap 1139*a* can be at least partially separated from the panel 1131*a* and the attachment flap 1136*a* at the respective portions of the cut 1143*a* and folded away therefrom at the fold line 1141*a* so as to extend perpendicularly away from the panel 1131*a* into the interior 1207 of the construct 1205. The attachment portion 1147*a* of the divider flap 1139*a* can be folded relative to the wall forming portion 1145*a* thereof at the fold line 1149*a* and positioned in at least partial face-to-face contact with the panel 1121*a* such that at least the wall forming portion 1145*a* of the divider flap 1139*a* extends from the panel 1131*a* to the panels 1121*a*, 1121*b* to form a front divider wall 1159 in the interior 1207 of the construct 1205 to form the plurality of container receiving spaces 1163*a* therein.

Similarly, in order to form the back portion 1215 of the construct 1205, according to some embodiments, the side panel 1127*b* and attachment flap 1136*b* can be folded at the respective fold lines 1133*b*, 1138*b* into generally perpendicular relation extending away from the central panel 1131*b*, the panel 1121*b* can be folded at the fold line 1129*b* into generally perpendicular relation with the side panel 1127*b* and into spaced and parallel relation with the central panel 1131*b*, and the side panel 1123*b* can be folded at the fold line 1125*b* and positioned in at least partial face-to-face contact with the attachment flap 1136*b*. In such an arrangement, the panel 1121*b* can be a back panel of the construct 1205.

Simultaneously or thereafter, the back divider flap 1139*b* can be at least partially separated from the panel 1131*b* and the attachment flap 1136*b* at the respective portions of the cut 1143*b* and folded away therefrom at the fold line 1141*b* so as to extend perpendicularly away from the panel 1131*b* into the interior 1207 of the construct 1205. The attachment portion 1147*b* of the divider flap 1139*b* can be folded relative to the wall forming portion 1145*b* thereof at the fold line 1149*b* and positioned in at least partial face-to-face contact with the panel 1121*b* such that at least the wall forming portion 1145*b* of the divider flap 1139*b* extends from the panel 1131*b* to the panels 1121*a*, 1121*b* to form a back divider wall 1161 in the interior 1207 of the construct 1205 to form the plurality of container receiving spaces 1163*b* therein.

In this regard, the construct 1205 can generally be an alternative arrangement of the construct 1105 that repositions the product viewing openings 1165*a*, 1165*b* into the interior 1207 of the construct 1205.

In view of the foregoing, various constructs and divider features are provided for containers so as to provide at least partial separation, buffering, etc., therebetween. Such divider features can facilitate loading, shipping, storage, etc., of such containers, and/or can facilitate metering or removal of such containers from a construct or system.

It will be understood that blanks and cartons according to the present disclosure can have a different number, arrangement, and/or configuration of features without departing from the disclosure.

In general, the blanks described herein may be constructed from paperboard having a caliper so that it is heavier and more rigid than ordinary paper. The blanks can also be constructed of other materials, such as cardboard, sheet plastics or any other material having properties suitable for enabling the container to function at least generally as described above. The blanks can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the container embodiments. The term "glue" is intended to encompass all manner of adhesives commonly used to secure container panels in place, and is not intended to exclude heat, chemical, or frequency bonding techniques.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for holding a plurality of containers, the construct comprising:

a plurality of panels comprising a front panel, at least one back panel, and at least one side panel extending at least partially around an interior of the construct; and divider features comprising at least one divider flap foldably connected to a respective panel of the plurality of panels at least partially forming at least one divider wall of the construct and forming a plurality of container receiving spaces in the interior of the construct, the at least one divider flap is foldably connected to the at least one back panel and positioned extending into the interior of the construct, the at least one divider flap comprises a wall forming portion foldably connected to the at least one back panel and an attachment portion foldably connected to the wall forming portion.

2. The construct of claim 1, wherein the at least one side panel is a first side panel foldably connected to the front panel, and the plurality of panels further comprises a second side panel foldably connected to the front panel.

3. The construct of claim 2, wherein the at least one back panel is a first back panel foldably connected to the first side panel, and the plurality of panels further comprises a second back panel foldably connected to the second side panel.

4. The construct of claim 3, wherein the at least one divider flap is a first divider flap foldably connected to the back panel, the at least one divider wall is a first divider wall at least partially formed by the first divider flap, and the divider features further comprise a second divider flap foldably connected to the at least one back panel and at least partially forming a second divider wall in the interior of the construct.

5. The construct of claim 1, wherein the attachment portion of the at least one divider flap is positioned in at least partial face-to-face contact with the front panel.

6. The construct of claim 1, wherein the plurality of panels further comprises at least one central panel, the at least one side panel is at least one front side panel, the plurality of panels further comprises at least one back side panel, the at least one divider flap is a first divider flap foldably connected to the front panel, the at least one divider wall is a first divider wall at least partially formed by the first divider flap, and the divider features further comprise a second divider flap foldably connected to the back panel and at least partially forming a second divider wall in the interior of the construct.

7. The construct of claim 6, wherein the at least one central panel is a front central panel and the plurality of panels further comprises a back central panel in at least partial face-to-face contact with the front central panel.

8. The construct of claim 7, wherein the at least one front side panel is a first front side panel foldably connected to the front central panel and the at least one back side panel is a first back side panel foldably connected to the back central panel, and the plurality of panels further comprises a second front side panel foldably connected to the front central panel and a second back side panel foldably connected to the back central panel.

9. The construct of claim 1, wherein the plurality of panels further comprises a front central panel in at least partial face-to-face contact with a back central panel, the at least one side panel is at least one front side panel, the plurality of panels further comprises at least one back side panel, the at least one divider flap is a first divider flap foldably connected to the front central panel, the at least one divider wall is a first divider wall at least partially formed by the first divider flap and the divider features further comprise a second divider flap foldably connected to the back central panel and at least partially forming a second divider wall in the interior of the construct.

10. The construct of claim 9, wherein the at least one front side panel is a first front side panel foldably connected to the front panel and the at least one back side panel is a first back side panel foldably connected to the at least one back panel, and the plurality of panels further comprises a second front side panel foldably connected to each of the front central panel and the front panel a second back side panel foldably connected to each of the back central panel and the at least one back panel.

11. A blank for forming a construct for holding a plurality of containers, the blank comprising:

a plurality of panels for extending at least partially around an interior of the construct and comprising a front panel, at least one back panel, and at least one side panel; and divider features comprising at least one divider flap foldably connected to a respective panel of the plurality of panels for at least partially forming at least one divider wall of the construct formed from the blank to form a plurality of container receiving spaces in the interior of the construct formed from the blank, the at least one divider flap is foldably connected to the at least one back panel and for being positioned extending into the interior of the construct formed from the blank, the at least one divider flap comprises a wall forming portion foldably connected to the at least one back panel and an attachment portion foldably connected to the wall forming portion.

12. The blank of claim 11, wherein the at least one side panel is a first side panel foldably connected to the front panel, and the plurality of panels further comprises a second side panel foldably connected to the front panel.

13. The blank of claim 12, wherein the at least one back panel is a first back panel foldably connected to the first side panel, and the plurality of panels further comprises a second back panel foldably connected to the second side panel.

14. The blank of claim 13, wherein the at least one divider flap is a first divider flap foldably connected to the back panel, the first divider flap is for at least partially forming the at least one divider wall being a first divider wall when the construct is formed from the blank, and the divider features further comprise a second divider flap foldably connected to the at least one back panel and for at least partially forming a second divider wall in the interior of the construct formed from the blank.

15. The blank of claim 11, wherein the plurality of panels further comprises at least one central panel, the at least one side panel is at least one front side panel, the plurality of panels further comprises at least one back side panel, the at least one divider flap is a first divider flap foldably connected to the front panel, the first divider flap is for at least partially forming the at least one divider wall being a first divider wall when the construct is formed from the blank, and the divider features further comprise a second divider flap foldably connected to the back panel and for at least partially forming a second divider wall in the interior of the construct formed from the blank.

16. The blank of claim 15, wherein the at least one central panel is a front central panel and the plurality of panels further comprises a back central panel for being positioned in at least partial face-to-face contact with the front central panel when the construct is formed from the blank.

17. The blank of claim 16, wherein the at least one front side panel is a first front side panel foldably connected to the front central panel and the at least one back side panel is a first back side panel foldably connected to the back central panel, and the plurality of panels further comprises a second front side panel foldably connected to the front central panel and a second back side panel foldably connected to the back central panel.

18. The blank of claim 11, wherein the plurality of panels further comprises a front central panel for being positioned in at least partial face-to-face contact with a back central panel when the construct is formed from the blank, the at least one side panel is at least one front side panel, the plurality of panels further comprises at least one back side panel, the at least one divider flap is a first divider flap foldably connected to the front central panel, the first divider flap is for at least partially forming the at least one divider wall being a first divider wall when the construct is formed from the blank, and the divider features further comprise a second divider flap foldably connected to the back central panel and for at least partially forming a second divider wall in the interior of the construct formed from the blank.

19. The blank of claim 18, wherein the at least one front side panel is a first front side panel foldably connected to the front panel and the at least one back side panel is a first back side panel foldably connected to the at least one back panel, and the plurality of panels further comprises a second front side panel foldably connected to each of the front central panel and the front panel a second back side panel foldably connected to each of the back central panel and the at least one back panel.

20. A method of forming a construct for holding a plurality of containers, the method comprising:

obtaining a blank, the blank comprising a plurality of panels comprising a front panel, at least one back panel, and at least one side panel, and divider features comprising at least one divider flap foldably connected to a respective panel of the plurality of panels;

positioning the plurality of panels extending at least partially around an interior of the construct; and at least partially forming at least one divider wall from the at least one divider flap to form a plurality of container receiving spaces in the interior of the construct formed from the blank, the at least one divider flap is foldably connected to the at least one back panel and at least partially forming the at least one divider wall comprises positioning the at least one divider flap extending into the interior of the construct, the at least one divider flap comprises a wall forming portion foldably connected to the at least one back panel and an attachment portion foldably connected to the wall forming portion.

21. The method of claim 20, wherein the at least one side panel is a first side panel foldably connected to the front panel, and the plurality of panels further comprises a second side panel foldably connected to the front panel.

22. The method of claim 21, wherein the at least one back panel is a first back panel foldably connected to the first side panel, and the plurality of panels further comprises a second back panel foldably connected to the second side panel.

23. The method of claim 22, wherein the at least one divider flap is a first divider flap foldably connected to the back panel, the at least one divider wall is a first divider wall at least partially formed by the first divider flap, the divider features further comprise a second divider flap foldably connected to the at least one back panel, the method further comprises and at least partially forming a second divider wall from the second divider flap in the interior of the construct.

24. The method of claim 20, wherein at least partially forming the at least one divider wall comprises positioning the attachment portion of the at least one divider flap in at least partial face-to-face contact with the front panel.

25. The method of claim 20, wherein the plurality of panels further comprises at least one central panel, the at least one side panel is at least one front side panel, the plurality of panels further comprises at least one back side panel, the at least one divider flap is a first divider flap foldably connected to the front panel, the at least one divider wall is a first divider wall at least partially formed by the first divider flap, the divider features further comprise a second divider flap foldably connected to the back panel, and the method further comprises at least partially forming a second divider wall from the second divider flap in the interior of the construct.

26. The method of claim 25, wherein the at least one central panel is a front central panel, the plurality of panels further comprises a back central panel, and the method further comprises positioning the front central panel in at least partial face-to-face contact with the front central panel.

27. The method of claim 26, wherein the at least one front side panel is a first front side panel foldably connected to the front central panel and the at least one back side panel is a first back side panel foldably connected to the back central panel, and the plurality of panels further comprises a second front side panel foldably connected to the front central panel and a second back side panel foldably connected to the back central panel.

28. The method of claim 20, wherein the plurality of panels further comprises a front central panel and a back central panel, the at least one side panel is at least one front side panel, the plurality of panels further comprises at least one back side panel, the at least one divider flap is a first divider flap foldably connected to the front central panel, the at least one divider wall is a first divider wall at least partially formed by the first divider flap, the divider features further comprise a second divider flap foldably connected to the back central panel, the method further comprises and at least partially forming a second divider wall from the second divider flap in the interior of the construct and the method further comprises positioning the front central panel in at least partial face-to-face contact with the back central panel.

29. The method of claim 28, wherein the at least one front side panel is a first front side panel foldably connected to the front panel and the at least one back side panel is a first back side panel foldably connected to the at least one back panel, and the plurality of panels further comprises a second front side panel foldably connected to each of the front central panel and the front panel a second back side panel foldably connected to each of the back central panel and the at least one back panel.

30. A system, the system comprising:

a plurality of containers; and a construct holding the plurality of containers, the construct comprising:

a plurality of panels comprising a front panel, at least one back panel, and at least one side panel extending at least partially around an interior of the construct; and divider features comprising at least one divider flap foldably connected to a respective panel of the plurality of panels at least partially forming at least one divider wall of the construct forming a plurality of container receiving spaces in the interior of the construct, the at least one divider flap is foldably connected to the at least one back panel and positioned extending into the interior of the construct, the at least one divider flap comprises a wall forming portion foldably connected to the at least one back panel and an attachment portion foldably connected to the wall forming portion.

31. The system of claim 30, wherein the at least one side panel is a first side panel foldably connected to the front panel, and the plurality of panels further comprises a second side panel foldably connected to the front panel.

32. The system of claim 31, wherein the at least one back panel is a first back panel foldably connected to the first side panel, and the plurality of panels further comprises a second back panel foldably connected to the second side panel.

33. The system of claim 32, wherein the at least one divider flap is a first divider flap foldably connected to the back panel, the at least one divider wall is a first divider wall at least partially formed by the first divider flap, and the divider features further comprise a second divider flap foldably connected to the at least one back panel and at least partially forming a second divider wall in the interior of the construct.

34. The system of claim 30, wherein the attachment portion of the at least one divider flap is positioned in at least partial face-to-face contact with the front panel.

35. The system of claim 30, wherein the plurality of panels further comprises at least one central panel, the at least one side panel is at least one front side panel, the plurality of panels further comprises at least one back side panel, the at least one divider flap is a first divider flap foldably connected to the front panel, the at least one divider wall is a first divider wall at least partially formed by the first divider flap, and the divider features further comprise a second divider flap foldably connected to the back panel and at least partially forming a second divider wall in the interior of the construct.

36. The system of claim 35, wherein the at least one central panel is a front central panel and the plurality of panels further comprises a back central panel in at least partial face-to-face contact with the front central panel.

37. The system of claim 36, wherein the at least one front side panel is a first front side panel foldably connected to the front central panel and the at least one back side panel is a first back side panel foldably connected to the back central panel, and the plurality of panels further comprises a second front side panel foldably connected to the front central panel and a second back side panel foldably connected to the back central panel.

38. The system of claim 30, wherein the plurality of panels further comprises a front central panel in at least partial face-to-face contact with a back central panel, the at least one side panel is at least one front side panel, the plurality of panels further comprises at least one back side panel, the at least one divider flap is a first divider flap foldably connected to the front central panel, the at least one divider wall is a first divider wall at least partially formed by the first divider flap and the divider features further comprise a second divider flap foldably connected to the back central panel and at least partially forming a second divider wall in the interior of the construct.

39. The system of claim 38, wherein the at least one front side panel is a first front side panel foldably connected to the front panel and the at least one back side panel is a first back side panel foldably connected to the at least one back panel, and the plurality of panels further comprises a second front side panel foldably connected to each of the front central panel and the front panel a second back side panel foldably connected to each of the back central panel and the at least one back panel.

* * * * *